(12) United States Patent
Fujita et al.

(10) Patent No.: US 9,496,622 B2
(45) Date of Patent: Nov. 15, 2016

(54) PHOTONIC-CRYSTAL SLAB ABSORBER AND HIGH-FREQUENCY CIRCUIT AND ELECTRONIC COMPONENTS, AND TRANSMITTER, RECEIVER AND PROXIMITY WIRELESS COMMUNICATION SYSTEM

(71) Applicants: ROHM CO., LTD., Kyoto (JP);
OSAKA UNIVERSITY, Osaka (JP)

(72) Inventors: Masayuki Fujita, Osaka (JP); Tadao Nagatsuma, Osaka (JP);
(Continued)

(73) Assignees: ROHM CO., LTD., Kyoto (JP);
OSAKA UNIVERSITY, Osaka (JP)

( * ) Notice: Subject to any disclaimer, the term of this patent is extended or adjusted under 35 U.S.C. 154(b) by 363 days.

(21) Appl. No.: 14/200,671

(22) Filed: Mar. 7, 2014

(65) Prior Publication Data
US 2014/0255040 A1 Sep. 11, 2014

(30) Foreign Application Priority Data

Mar. 8, 2013 (JP) .................................. 2013-046780
Feb. 18, 2014 (JP) .................................. 2014-028821

(51) Int. Cl.
*G02B 1/02* (2006.01)
*H01Q 17/00* (2006.01)
(Continued)

(52) U.S. Cl.
CPC ............... *H01Q 17/00* (2013.01); *B82Y 20/00* (2013.01); *G02B 1/005* (2013.01); *G02B 5/003* (2013.01); *G02B 6/1225* (2013.01); *H01Q 15/006* (2013.01)

(58) Field of Classification Search
None
See application file for complete search history.

(56) References Cited

U.S. PATENT DOCUMENTS 5,689,275 A * 11/1997 Moore ................. H01Q 15/006
343/772
5,923,225 A * 7/1999 De Los Santos ..... H01P 1/2005
330/149
(Continued)

FOREIGN PATENT DOCUMENTS

WO   WO 2011/083693 A1 *  7/2011

OTHER PUBLICATIONS

M. Pu et al. Engineering heavily doped silicon for broadband absorber in the terahertz regime. Optics Express, 20:23:25513-25519, Nov. 2012.*
(Continued)

*Primary Examiner* — Mike Stahl
(74) *Attorney, Agent, or Firm* — Rabin & Berdo, P.C.

(57) ABSTRACT

The photonic-crystal (PC) slab absorber includes: a two-dimensional (2D)-PC slab composed of semiconducting materials; and a lattice point periodically arranged in the 2D-PC slab, the lattice point for forming resonant-state which can capture an electromagnetic waves incident from an outside by resonating an electromagnetic wave in a band edge of a photonic band structure of the 2D-PC slab in the plane of the 2D-PC slab. The 2D-PC slab is doped with impurities and can absorb the captured electromagnetic wave in the band edge resonant frequency of the 2D-PC slab.

20 Claims, 45 Drawing Sheets

(72) Inventors: Ryoma Kakimi, Osaka (JP); Dai Onishi, Kyoto (JP); Eiji Miyai, Kyoto (JP)

(51) Int. Cl.
*G02B 1/00* (2006.01)
*G02B 5/00* (2006.01)
*B82Y 20/00* (2011.01)
*G02B 6/122* (2006.01)
*H01Q 15/00* (2006.01)

(56) References Cited

U.S. PATENT DOCUMENTS

| | | | | |
|---|---|---|---|---|
| 2004/0145533 A1* | 7/2004 | Taubman | H01Q 1/526 | 343/841 |
| 2004/0174223 A1* | 9/2004 | Achyut | H01L 23/5383 | 333/1 |
| 2007/0253660 A1* | 11/2007 | Wang | B82Y 20/00 | 385/5 |
| 2008/0238810 A1* | 10/2008 | Winsor | H01Q 15/08 | 343/911 R |
| 2009/0153433 A1* | 6/2009 | Nagai | H01Q 1/38 | 343/893 |
| 2012/0279553 A1* | 11/2012 | Shigeta | H01L 31/035281 | 136/246 |
| 2012/0322164 A1* | 12/2012 | Lal | B82Y 10/00 | 436/501 |

OTHER PUBLICATIONS

T. Prasad et al. Dependence of guided resonances on the structural parameters of terahertz photonic crystal slabs. Journal of the Optical Society of America B, 25:4:633-644, Apr. 2008.*

J. Tumbleston et al. Absorption and quasiguided mode analysis of organic solar cells with photonic crystal photoactive layers. Optics Express, 17:9:7670-7681, Apr. 2009.*

Tsukasa Ishigaki, Masayuki Fujita and Tadao Nagatsuma,"Investigation of a Photonic-Crystal Slab for Terahertz-Wave Integrated Circuits", Institute of Electronics, Information and Communication Engineers General Conference 2012.

Tsukasa Ishigaki, Masayuki Fujita, Masaya Nagai, Masaaki Ashida and Tadao Nagatsuma, "Photonic-Crystal Slab for Terahertz-Wave Integrated Circuits", IEEE Photonics Conference 2012 (IPC2012), Burlingame, No. ThJ3, Sep. 27, pp. 774-775, 2012.

Tadao Nagatsuma, Masayuki Fujita, Toshikazu Mukai, Kazuisao Tsuruda and Ddai Onishi, "Recent Progress and Future Prospects of Terahertz Communications Using Resonant Tunneling Diodes", National Institute of Information and Communications Technology (NICT) Symposium-Possible Application of Terahertz Wave Technology in Industry, Tokyo, Jan. 16, 2013.

Ryoma Kakimi, Masayuki Fujita, Masaya Nagai, Masaaki Ashida, and Tadao Nagatsuma, "Trapping a Terahertz Wave in a Photonic-Crystal Slab", IEEE Photonics Conference 2012 (IPC2012), Burlingame, No. WQ5, Sep. 26, pp. 562-563, 2012.

* cited by examiner

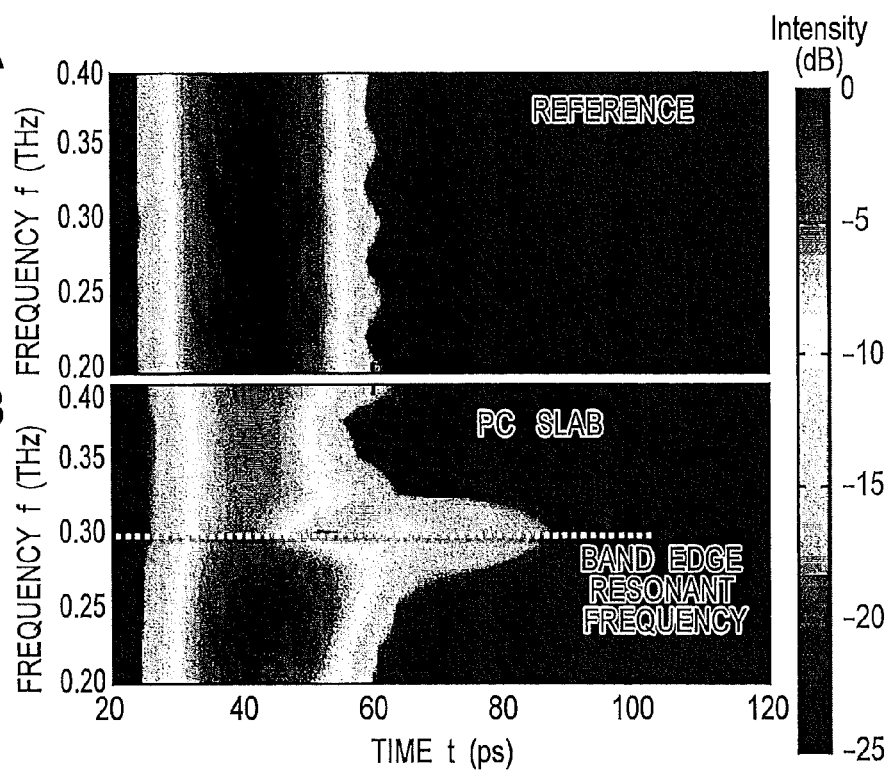

FIG. 15A
FIG. 15B
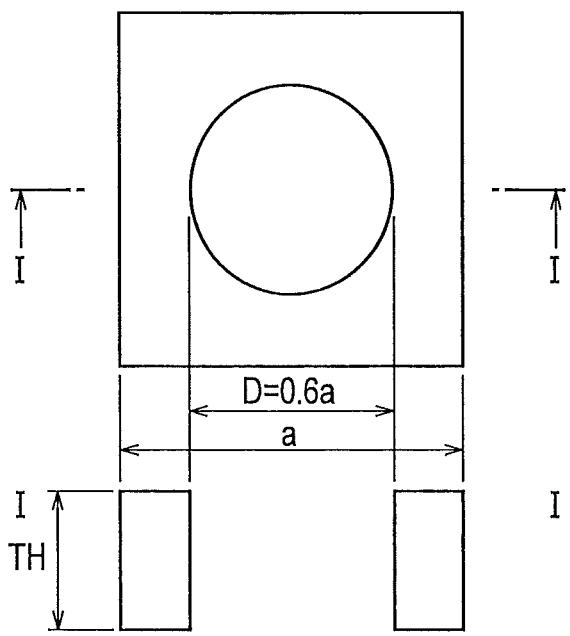
FIG. 16
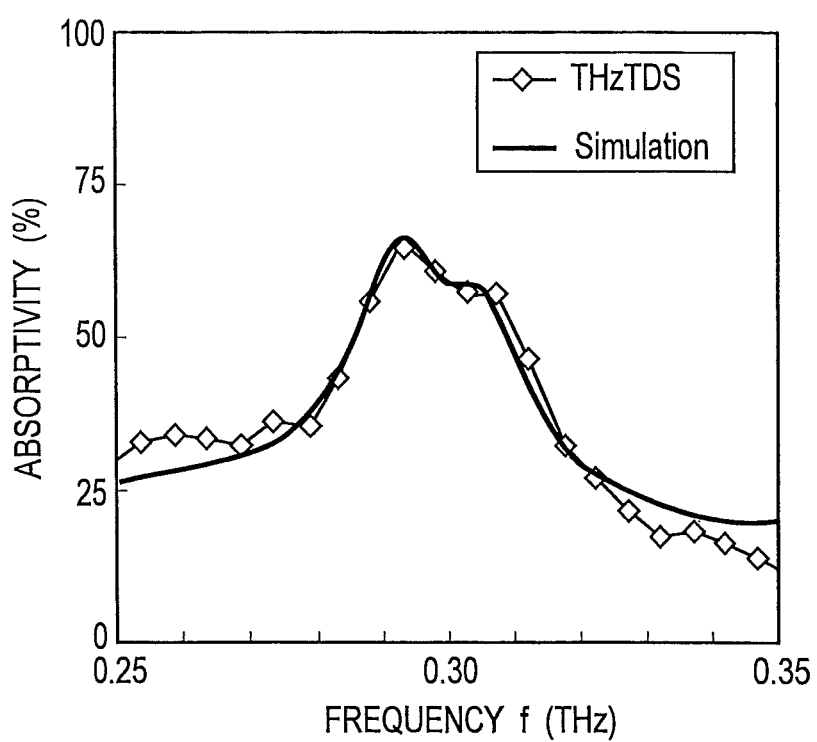

FIG. 17A
FIG. 17B
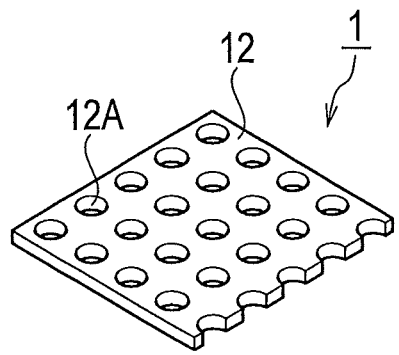
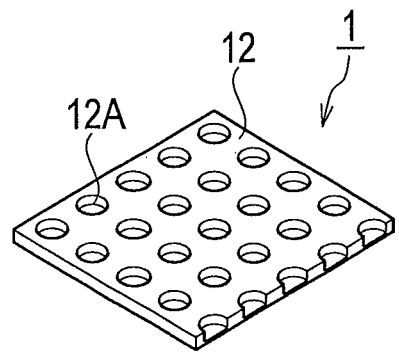
FIG. 18
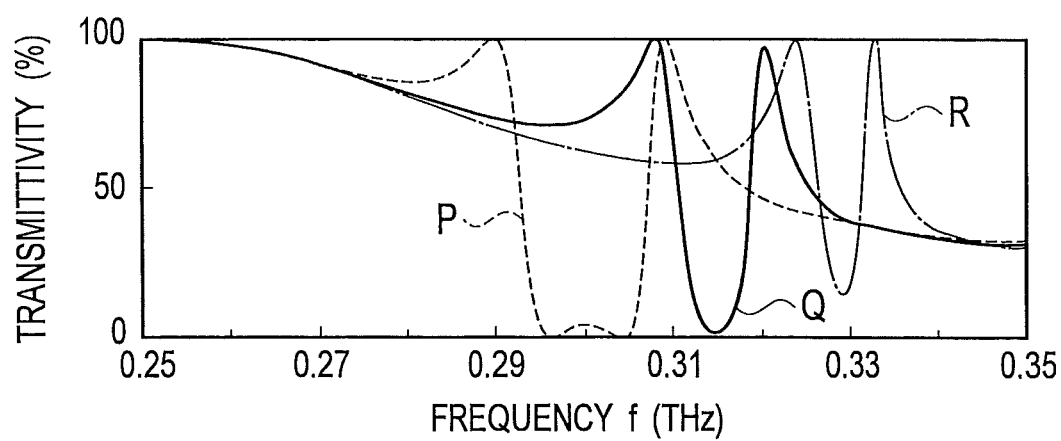

FIG. 40
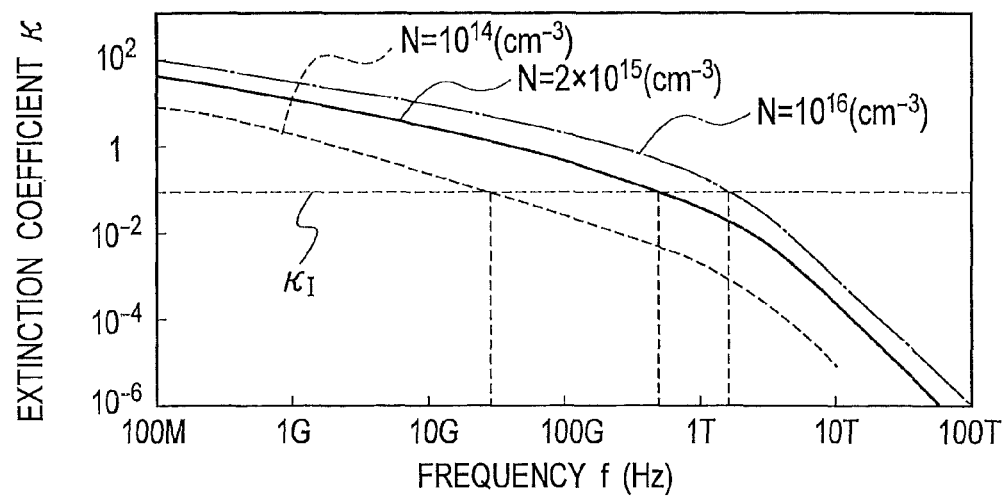
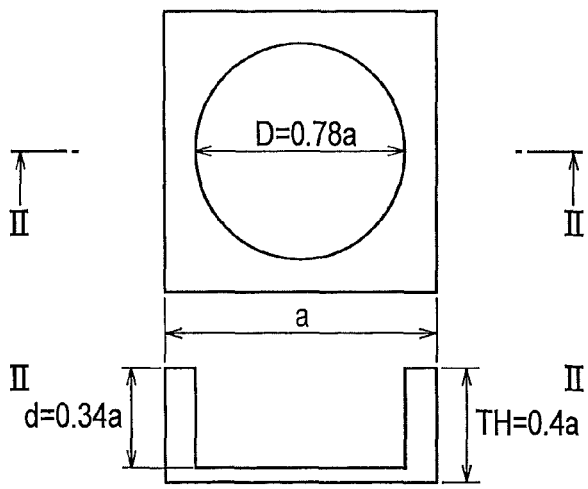
FIG. 41A
FIG. 41B

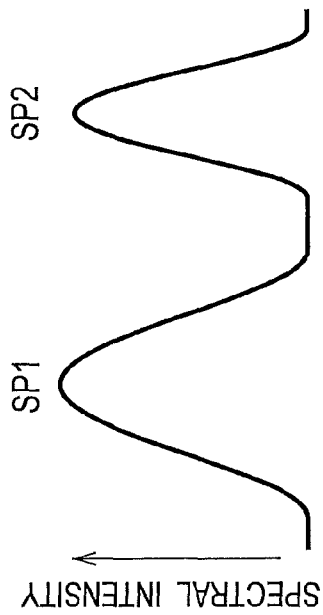
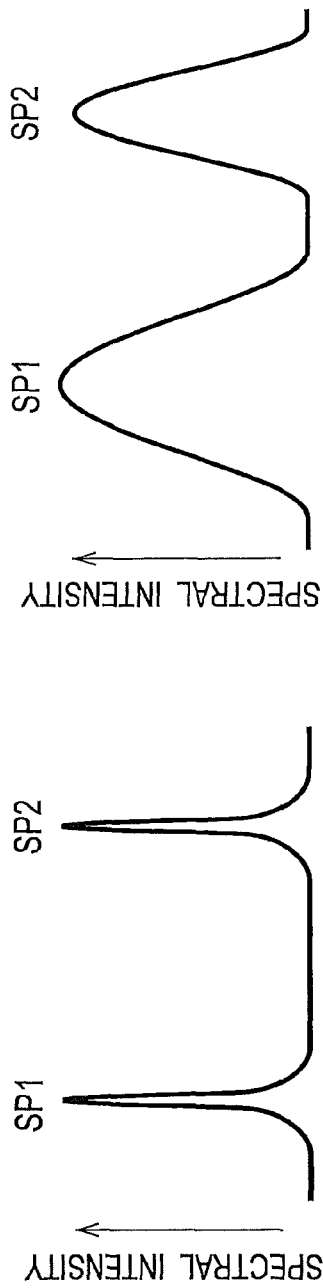
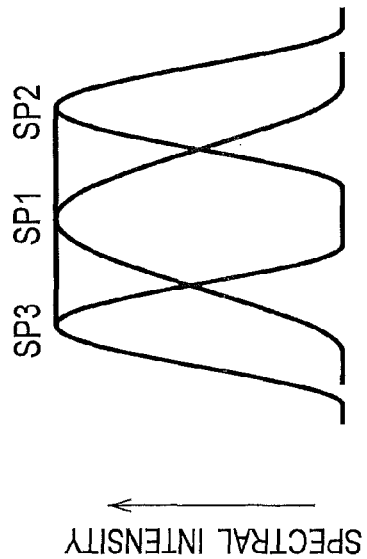

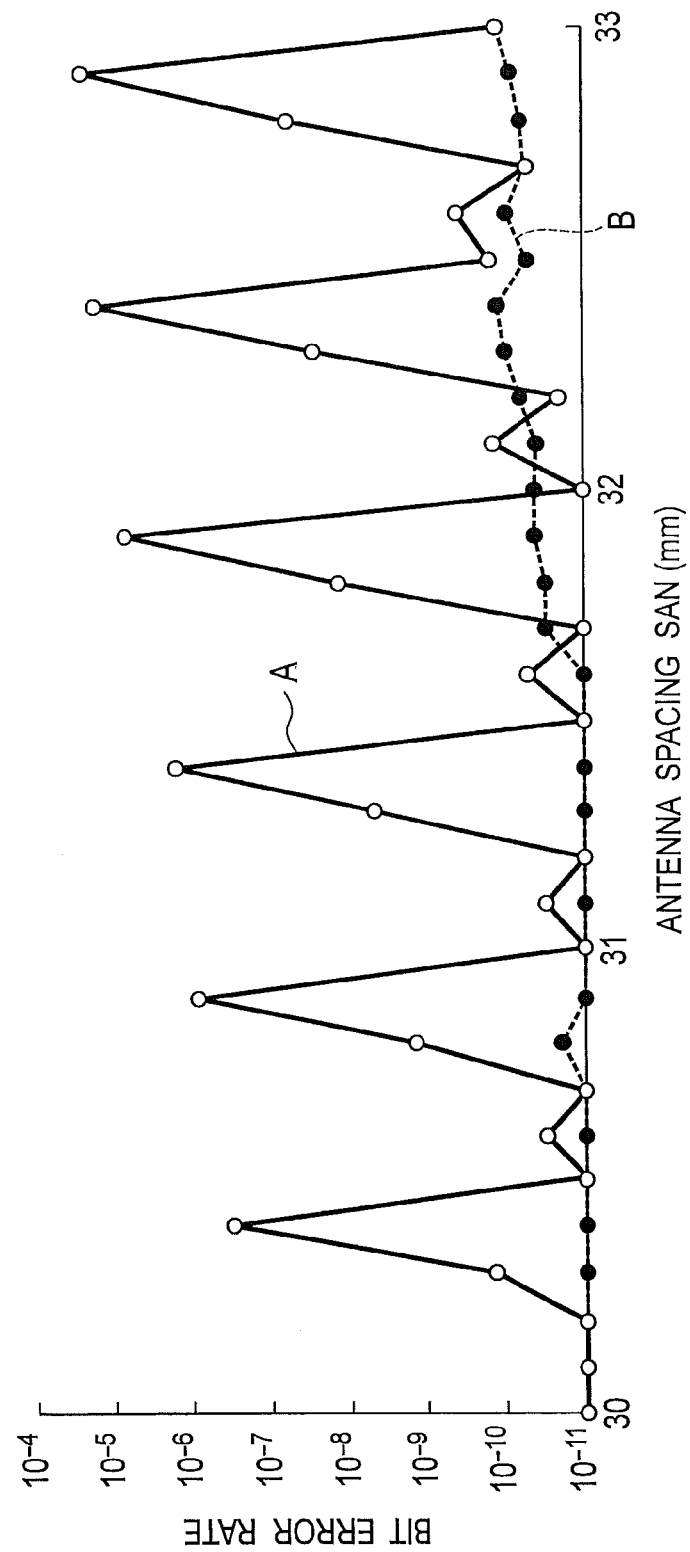

PHOTONIC-CRYSTAL SLAB ABSORBER AND HIGH-FREQUENCY CIRCUIT AND ELECTRONIC COMPONENTS, AND TRANSMITTER, RECEIVER AND PROXIMITY WIRELESS COMMUNICATION SYSTEM

CROSS REFERENCE TO RELATED APPLICATIONS AND INCORPORATION BY REFERENCE

This application is based upon and claims the benefit of priority from prior Japanese Patent Application Nos. P2013-46780 filed on Mar. 8, 2013, and P2014-28821 filed on Feb. 18, 2014, the entire contents of which are incorporated herein by reference.

TECHNICAL FIELD

The present invention relates to a photonic-crystal (PC) slab absorber, a high-frequency circuit, an electronic component, a transmitter, a receiver, and a proximity wireless communication system. In particular, the present invention relates to a thin and flat type PC slab absorber having high capturing and absorption effects and an easy processability, and a high-frequency circuit, an electronic component, and a transmitter, receiver, and a proximity wireless communication system to which such a PC slab absorber is applied.

BACKGROUND ART

In recent years, for THz wave band (0.1 THz to 10 THz) positioned in intermediate frequencies between electromagnetic waves and light waves, studies of applicabilities of ultra high-speed wireless communications, sensing, imaging, etc. have become active, and there has been expected its practical application. However, since THz-wave systems are composed of large-sized and three-dimensional structured components under the current circumstances, large-sized and expensive configurations are required for such THz-wave systems. In order to miniaturize the whole of such systems, implementation of THz-wave integrated circuits (ICs) integrating devices is indispensable.

Utilization of technologies of both of a light wave region and an electric wave region can be considered as fundamental technologies of the THz-wave ICs. However, optical components, e.g. lenses, mirrors, are composed of large-sized and three-dimensional structured components, and therefore are not suitable for the integration. Moreover, it is becoming difficult to produce hollow metal waveguides used in the electric wave region due to its fine three-dimensional structure. Furthermore, a waveguide loss in planar metallic-transmission lines is increased as effect of metallic absorption is increased.

As a fundamental technology of THz-wave ICs, there has been studied applicability of a two dimensional photonic crystal (2D-PC) slab where outstanding progress is seen in the light wave region (e.g., refer to Non Patent Literatures 1-3.).

On the other hand, it is also proved that such a 2D-PC slab can capture THz waves incident from the outside by utilizing an in-plane resonance effect in a 2D-PC photonic band edge (for example, refer Non Patent Literature 4.).

CITATION LIST

Non-Patent Literature 1: Tsukasa ISHIGAKI, Masayuki FUJITA, and Tadao NAGATSUMA, "Investigation of a Photonic-Crystal Slab for Terahertz-Wave Integrated Circuits", Institute of Electronics, Information and Communication Engineers General Conference 2012, Okayama, no. C-14-19, 2012. (Mar. 21, 2012)

Non-Patent Literature 2: Tsukasa ISHIGAKI, Masayuki FUJITA, Masaya NAGAI, Masakaki ASHIDA, and Tadao NAGATSUMA, "Photonic-Crystal Slab for Terahertz-Wave Integrated Circuits", IEEE Photonics Conference 2012 (IPC2012), Burlingame, no. ThJ3, Sep. 27th, pp. 774-775, 2012

Non-Patent Literature 3: Tadao NAGATSUMA, Masayuki FUJITA, Toshikazu MUKAI, Kazuisao TSURUDA, and Dai ONISHI, "Recent Progress and Future Prospects of Terahertz Communications Using Resonant Tunneling Diodes", NICT Meeting Possible Application of Terahertz Wave Technology in Industry (Tokyo) (Jan. 16, 2013)

Non-Patent Literature 4: Ryoma KAKIMI, Masayuki FUJITA, Masaya NAGAI, Masaaki ASHIDA, and Tadao NAGATSUMA, "Trapping a Terahertz Wave in a Photonic-Crystal Slab", IEEE Photonics Conference 2012 (IPC2012), Burlingame, no. WQ5, Sep. 26th, pp. 562-563, 2012

SUMMARY OF THE INVENTION

Technical Problem

Utilization of the THz waves requires development of various components and devices. In particular, a THz-wave absorber for reducing multiple reflections and interferences of the THz waves is required, in order to stably operate THz-wave systems. In order to achieve smart and compact THz-wave systems, a thin and flat type THz wave absorber is indispensable.

Electromagnetic metamaterials using metallic patterns on a substrate have been also widely studied as a candidate of such a THz-wave absorber. However, since electromagnetic metamaterial structure is formed as a complicated and fine structure having a size smaller than that of the wavelengths, it is not easy to be fabricated.

The inventors found out that the absorption effect can be introduced by doping the PC substrate composing the PC slab with proper carrier density.

The object of the present invention is to provide a thin and flat type PC slab absorber having high capturing and absorption effects and an easy processability, and a high-frequency circuit, an electronic component to which such a PC slab absorber is applied.

Moreover, the object of the present invention is to provide a PC slab absorber which can increase an absorptivity and absorption bandwidth by introducing a reflecting mirror into the PC slab absorber, and adjusting a distance between a reflecting mirror and a photonic crystal.

Moreover, the object of the present invention is to provide a transmitter, a receiver, and a proximity wireless communication system to which the PC slab absorber which introduces a reflecting mirror is applied.

Solution to Problem

According to one aspect of the present invention, there is provided a PC slab absorber comprising: a two dimensional photonic crystal slab composed of semiconducting materials; and a lattice point periodically arranged in the two dimensional photonic crystal slab, the lattice point for forming resonant-state which can capture an electromagnetic waves incident from an outside by resonating an electromagnetic wave in a band edge of a photoand structure of the two dimensional photonic crystal slab in the plane of the two dimensional photonic crystal slab, wherein the two dimensional photonic crystal slab is doped with impurities and can absorb the captured electromagnetic wave in the band edge resonant frequency.

According to another aspect of the present invention, there is provided an electronic component comprising the above-mentioned PC slab absorber.

According to still another aspect of the present invention, there is provided a high-frequency circuit comprising the above-mentioned PC slab absorber.

According to still another aspect of the present invention, there is provided a PC slab absorber comprising a reflecting mirror arranged at a back side surface of the above-mentioned two dimensional photonic crystal slab, the reflecting mirror configured to reflect an electromagnetic wave transmitted in the two dimensional photonic crystal slab, wherein the reflected electromagnetic wave can be made incident on a back side surface of the two dimensional photonic crystal slab.

According to still another aspect of the present invention, there is provided a transmitter comprising: the above-mentioned PC slab absorber comprising the above-mentioned reflecting mirror; and an antenna for transmitter disposed so as to pass through the PC slab absorber.

According to still another aspect of the present invention, there is provided a receiver comprising: the above-mentioned PC slab absorber comprising the above-mentioned reflecting mirror; and an antenna for receiver disposed so as to pass through the PC slab absorber.

According to still another aspect of the present invention, there is provided a proximity wireless communication system comprising: the above-mentioned transmitter; and the above-mentioned receiver, wherein the transmitter and the receiver disposed so as to be opposed with each other.

Advantageous Effects of Invention

According to the present invention, there can be provided the thin and flat type PC slab absorber having high capturing and absorption effects and the easy processability, and the high-frequency circuit, the electronic component to which such a PC slab absorber is applied.

Moreover, according to the present invention, there can be provided the PC slab absorber which can increase the absorptivity and absorption bandwidth by introducing the reflecting mirror into the PC slab absorber, and adjusting the distance between the reflecting mirror and the photonic crystal.

Moreover, according to the present invention, there can be provided the transmitter, the receiver, and the proximity wireless communication system to which the PC slab absorber which introduces the reflecting mirror is applied.

BRIEF DESCRIPTION OF DRAWINGS

FIG. 12A shows a comparison of spectrograms of the THz TDS observing simultaneously a capturing effect (time domain) and a band edge effect (frequency domain), showing in particular the spectrogram of the incident THz wave itself (reference without a sample).

FIG. 12B shows a comparison of the spectrograms of the THz TDS observing simultaneously the capturing effect (time domain) and the band edge effect (frequency domain), showing in particular the case where the THz wave is made incident on the PC slab absorber according to the first embodiment.

FIG. 15A is a schematic planar pattern configuration diagram of the lattice point for forming resonant-state of PC slab, in the PC slab absorber according to the first embodiment.

FIG. 15B is a schematic cross-sectional structure diagram taken in the line I-I of FIG. 15A (an example of providing a through-hole in the lattice point for forming resonant-state).

FIG. 16 shows a frequency characteristics example of the absorptivity of the PC slab applicable to the PC slab absorber according to the first embodiment (comparison between a THz TDS measured result and a simulation result).

FIG. 17A is an explanatory diagram of a first method for achieving broader bandwidth by decreasing a Q factor of capturing effect, and shows in particular an embodiment of the PC slab having through-holes in the lattice points for forming resonant-state, in the PC slab absorber according to the first embodiment.

FIG. 17B is an explanatory diagram of the first method for achieving broader bandwidth by decreasing a Q factor of capturing effect, and shows in particular an embodiment of the PC slab having non-through holes in the lattice points for forming resonant-state, in the PC slab absorber according to the first embodiment.

FIG. 18 is an explanatory diagram of a second method for achieving broader bandwidth by moving two adjacent resonant points close to each other, in the PC slab absorber according to the first embodiment (an example of frequency characteristics of transmissivity).

FIG. 40 is a diagram illustrating a developing method to other frequency bands, in the PC slab absorber according to the first embodiment, and shows in particular a theoretical analysis result of a relationship between the extinction coefficient κ and the frequency f (THz) in which the carrier density N is used as a parameter.

FIG. 41A is a diagram illustrating the PC slab absorber according to the first embodiment, and shows in particular a schematic planar pattern configuration diagram of the lattice point for forming resonant-state of the PC slab.

FIG. 41B is a diagram illustrating the PC slab absorber according to the first embodiment, and shows in particular a schematic cross-sectional structure diagram taken in the line II-II of FIG. 41A (an example of providing the non-through hole in the lattice point for forming resonant-state).

FIG. 51A is a spectrum intensity distribution under the initial state to illustrate an aspect that the absorption spectrum is varied by introducing the third Fabry-Perot resonant mode originated from the reflecting mirror and the PC, in addition to an in-plane resonant mode originated from the PC (the even mode, and the odd mode) as a result of introducing the reflecting mirror to the back side of the 2D-PC slab, in the PC slab absorber according to the second embodiment.

FIG. 51B is a spectrum intensity distribution in the state where the diameter dimension of the hole in the lattice point for forming resonant-state is optimized to illustrate an aspect that the absorption spectrum is varied by introducing the third Fabry-Perot resonant mode originated from the reflecting mirror and the PC, in addition to an in-plane resonant mode originated from the PC (the even mode, and the odd mode) as a result of introducing the reflecting mirror to the back side of the 2D-PC slab, in the PC slab absorber according to the second embodiment.

FIG. 51C is a spectrum intensity distribution in the state where the thickness of the 2D-PC slab is also optimized to illustrate an aspect that the absorption spectrum is varied by introducing the third Fabry-Perot resonant mode originated from the reflecting mirror and the PC, in addition to an in-plane resonant mode originated from the PC (the even mode, and the odd mode) as a result of introducing the reflecting mirror to the back side of the 2D-PC slab, in the PC slab absorber according to the second embodiment.

FIG. 51D is a spectrum intensity distribution of a result of introducing the reflecting mirror to the back side of the PC slab to illustrate an aspect that the absorption spectrum is varied by introducing the third Fabry-Perot resonant mode originated from the reflecting mirror and the PC, in addition to an in-plane resonant mode originated from the PC (the even mode, and the odd mode) as a result of introducing the reflecting mirror to the back side of the 2D-PC slab, in the PC slab absorber according to the second embodiment.

FIG. 57 shows a relationship of bit error rates to antennas distance SAN between the transmitter and the receiver to which the PC slab absorber according to the second embodiment is applied (where A: the case of a configuration having only an antenna for transmitter and receiver, and a metallic body (reflecting mirror), as a comparative example; and B: the case of a configuration having an antenna for transmitter and receiver, and a metallic body (reflecting mirror)+the PC slab absorber).

DESCRIPTION OF EMBODIMENTS

Figure 1A:
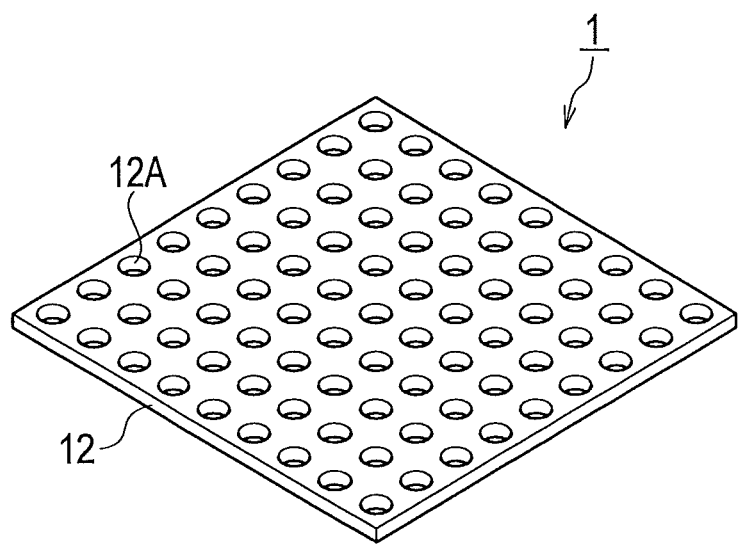
FIG. 1A is a schematic bird's-eye view of a PC slab absorber according to a first embodiment.

There will be described embodiments of the present invention, with reference to the drawings. In the following drawings, same blocks or elements are designated by same reference characters to eliminate redundancy and for simplicity. However, it should be known about that the drawings are schematic and are differ from an actual thing. Of course, the part from which the relation and ratio of a mutual size differ also in mutually drawings is included.

The embodiments to be described hereinafter exemplify the apparatus and method for a technical concept or spirit of the present invention; and do not specify dispositions, etc. of each component part as examples mentioned below. The embodiments of the present invention may be changed without departing from the spirit or scope of claims.

[First Embodiment]

Figure 1B:
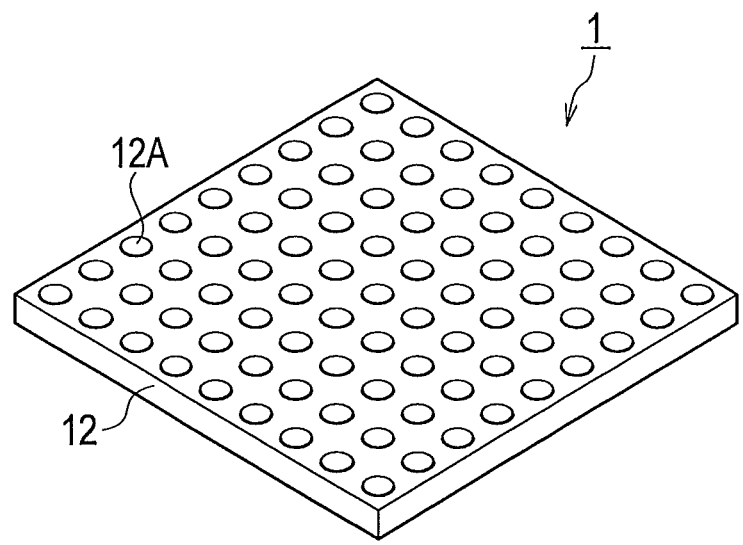
FIG. 1B is an alternative schematic bird's-eye view of the PC slab absorber according to the first embodiment.

FIG. 1A shows a schematic bird's-eye view structure of a PC slab absorber 1 according to a first embodiment, and FIG. 1B shows another schematic bird's-eye view structure.

As shown in FIGS. 1A and 1B, the PC slab absorber 1 according to the first embodiment includes: a 2D-PC slab 12 composed of semiconducting materials; and a lattice point 12A periodically arranged in the 2D-PC slab 12, the lattice point for forming resonant-state (resonant-state-forming lattice) 12A which can capture an electromagnetic wave incident from an outside by resonating an electromagnetic wave in a band edge of a photonic band structure of the 2D-PC slab 12 in the plane of the 2D-PC slab 12. In this case, the 2D-PC slab 12 is doped with impurities and can absorb the captured electromagnetic wave in the band edge resonant frequency.

In the PC slab absorber according 1 to the first embodiment, as shown in FIG. 1A, the lattice point for forming resonant-state 12A may include a vertically symmetric through-hole on a principal surface of the 2D-PC slab 12.

Moreover, as shown in FIG. 1B, in the PC slab absorber 1 according to the first embodiment, the lattice point for forming resonant-state 12A may include a vertically asymmetric non-through hole on the principal surface of the 2D-PC slab 12.

In the PC slab absorber 1 according to the first embodiment, the 2D-PC slab 12 is doped with a predetermined impurity density and can absorb the captured electromagnetic wave in the resonant frequency resonating in the plane of the 2D-PC slab 12. The electromagnetic wave captured with the PC slab 12 can be interacted effectively with a free carrier absorption in the semiconductor, the absorptivity can be increased and the carrier density is optimized, and thereby the absorptivity can be maximized.

Moreover, in the PC slab absorber 1 according to the first embodiment, since the lattice point for forming resonant-state 12A of the 2D-PC slab 12 includes periodic structure of the same degree as the wavelength, the electromagnetic wave incident on the 2D-PC slab 12 causes resonance in a large area in the plane of the 2D-PC slab 12.

The PC slab absorber 1 according to the first embodiment is easy to be fabricated since it has simple structure.

Moreover, the PC slab absorber 1 according to the first embodiment can be formed in not more than ⅕ thickness of the wavelength, thereby achieving flattened structure and thickness reduction.

The PC slab absorber 1 according to the first embodiment is applicable as various electromagnetic wave absorbers, e.g. for electric waves, THz waves, light waves, etc. From a fabrication viewpoint, since the lattice constant a of the lattice point for forming resonant-state 12A may be set up of the same degree as the wavelength, a scaling law according to the wavelength can be applied thereto. Hereinafter, a THz wave band region will be mainly explained.

In the PC slab absorber 1 according to the first embodiment, semiconducting materials in which physical properties can be controlled according to the carrier density are used as materials of the PC slab 12 with a single material or combination of a plurality of the materials.

As the semiconducting materials, the following are applicable. More specifically, silicon (Si), GaAs, InP, GaN, etc. are applicable thereto, and GaInAsP/InP based, GaInAs/GaAs based, GaAlAs/GaAs based or GaInNAs/GaAs based, GaAlInAs/InP based, GaAlInP/GaAs based, GaInN/GaN based materials, SiC, a diamond, etc. are applicable thereto.

In the PC slab absorber 1 according to the first embodiment, it is proved that the material absorption of the THz wave can be achieved in particular by applying Si as materials of the PC slab 12, and controlling the impurity doping density.

As the doping impurities to the 2D-PC slab, there can be applied general materials, e.g., B, P, As, Sb, etc. to Si; Zn, C, Mg, Si, Be, etc. to GaAs; Zn, S, etc. to InP; Mg, Si, etc. to GaN; N, Al, B, etc. to SiC; and P, B, etc to diamond.

In the PC slab absorber 1 according to the first embodiment, since the carrier density may be adjusted so that a suitable absorptivity can be obtained, the PC slab materials and doping impurities can be selected other than the above-mentioned impurities.

In the PC slab absorber 1 according to the first embodiment, the impurity density distribution in a direction perpendicular to the substrate surface of the 2D-PC slab may be uniform over the whole substrate of the 2D-PC slab, or the doping region may be formed on a surface portion of the substrate or a predetermined depth region using the ion implantation or the diffusion technology.

The structure of providing the doping layer near the substrate surface of the 2D-PC slab is applicable since the absorption effect is obtained by the odd mode having an electromagnetic field distribution which is strong electric field distribution on the surface. It is also possible to strengthen the absorption in the internal PC layer due to the interference effect by setting up large amount of impurity doping level of the surface in order to form only the surface as a metallic state.

More specifically, in the PC slab absorber 1 according to the first embodiment, structure of varying the doping concentration for the 2D-PC slab therein is also applicable (metallic state is formed on the surface with the large amount of impurity doping level, states other than the surface are formed with an absorbed amount or gradually varying doping level adiabatically to reduce needless reflection).

Moreover, the lattice point for forming resonant-state 12A may be formed as an air hole, or may be filled up with a semiconductor layer differing in the refractive index therefrom, for example. For example, the lattice point may be formed by a GaAs layer filled up with a GaAlAs layer.

It is possible to adapt as the lattice point for forming resonant-state 12A not only the structure where the hole of air is formed, but the structure where (a part of) the hole is filled up with a low-refractive index (low-dielectric constant) medium. Polymeric materials, e.g. Teflon, fluorine contained resin, a polyimide, acrylic, polyester, an epoxy resin, a liquid crystal, a polyurethane, etc. are applicable to the low-refractive index (low-dielectric constant) medium, for example. Moreover, dielectrics, e.g. $SiO_2$, SiN, SiON, an alumina, a sapphire, etc. are also applicable to the low-refractive index (low-dielectric constant) medium, for example. Moreover, porous bodies, e.g. an aerogel, etc. are also applicable to the low-refractive index (low-dielectric constant) medium.

(Synergistic Effect Between Capturing and Absorption)

Figure 2:
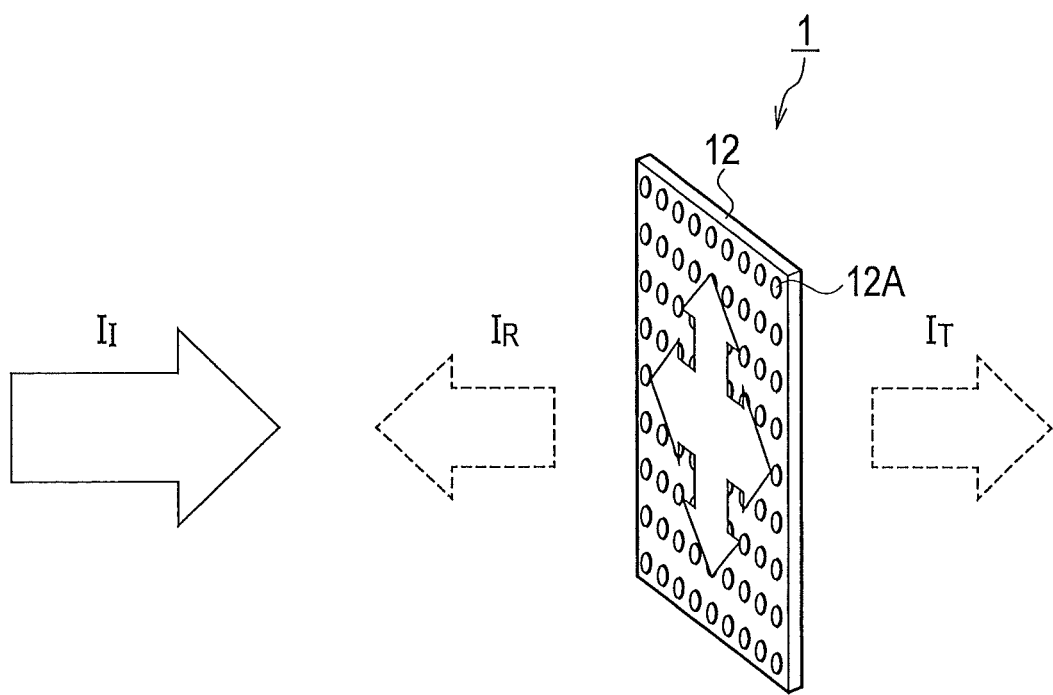
FIG. 2 is a schematic diagram illustrating capturing and absorption effects in the PC slab absorber according to the first embodiment.

FIG. 2 shows a schematic diagram illustrating a synergistic effect between capturing and absorption in the PC slab absorber 1 according to the first embodiment.

The electromagnetic wave $I_I$ incident on the PC slab absorber 1 according to the first embodiment is resonated and captured in the plane of the PC slab 12. Accordingly, there is extremely little electromagnetic wave $I_R$ to be reflected therefrom. Furthermore, there is also extremely little electromagnetic wave IT to be transmitted thereto since the electromagnetic wave II incident on the PC slab absorber 1 according to the first embodiment is absorbed with the materials of the PC slab 12. More specifically, the PC slab absorber 1 according to the first embodiment can increase the absorptive ability due to the synergistic effect between the capturing and the absorption (capturing+absorption).

(Band Edge Effect of PC Slab)

In the photonic band structure of the PC slab 12 applicable to the PC slab absorber 1 according to the first embodiment, a portion of inclination angle being 0 is called a band edge. In the band edge, the photonic crystal functions as a resonator of the electromagnetic wave since a group velocity of the electromagnetic wave becomes 0 and then a standing wave is formed. The periodic structure and the band structure of the lattice point for forming resonant-state 12A will be described below (refer to FIGS. 45, 46, 47 and 48).

Figure 3:
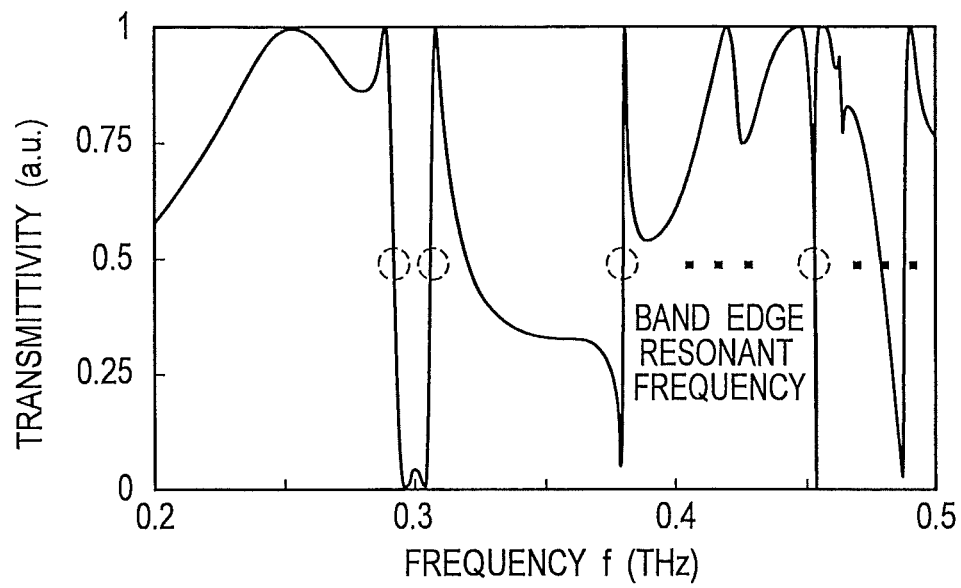
FIG. 3 is an explanatory diagram of a band edge effect of a PC slab applicable to the PC slab absorber according to the first embodiment, and shows in particular a relationship between the transmissivity and the frequency (a display example of band edge resonant frequency).

FIG. 3 shows an explanatory diagram of the band edge effect of the PC slab 12 applicable to the PC slab absorber 1 according to the first embodiment, and shows in particular a relationship between the transmissivity (%) and the frequency f (THz). In FIG. 3, the frequencies corresponding to portions shown with round marks of dashed line show the band edge resonant frequencies. In the band edge, the wavelength in the medium of electromagnetic wave becomes equal to a period of the structure of lattice point for forming resonant-state 12A. Accordingly, a standing wave is generated in the plane of PC slab 12, and it becomes combinable with the mode out of the plane of the PC slab 12. Accordingly, the electromagnetic wave $I_I$ incident on the PC slab absorber 1 according to the first embodiment is resonated and captured in the plane of the PC slab 12.

(Capturing of Electromagnetic Waves Using PC)

Figure 4A:
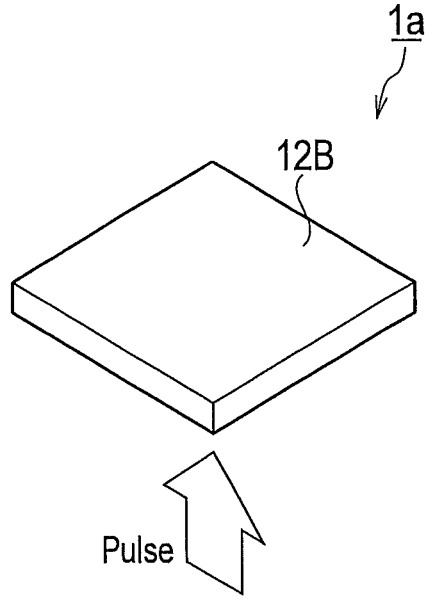
FIG. 4A is an explanatory diagram showing the case where a THz wave is made incident on the PC slab absorber according to a comparative example.
Figure 4B:
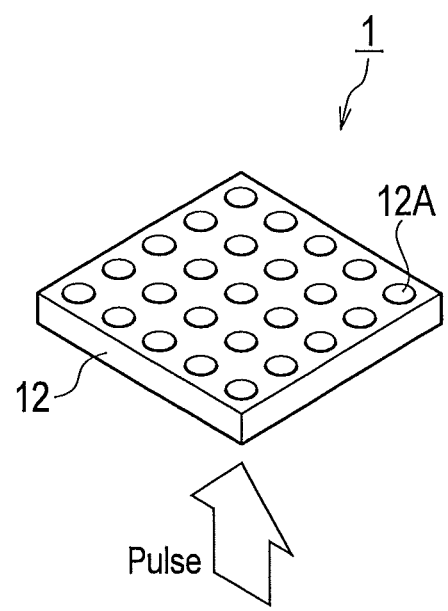
FIG. 4B is an explanatory diagram showing the case where the THz wave is made incident on the PC slab absorber according to the first embodiment.

FIG. 4A shows an explanatory diagram in the case where the THz wave is made incident on the PC slab absorber 1a according to a comparative example. On the other hand, FIG. 4B shows an explanatory diagram in the case where the THz wave is made incident on the PC slab absorber 1 according to the first embodiment.

In the PC slab absorber 1 according to the first embodiment, the THz wave incident on the PC slab 12 having the lattice point for forming resonant-state 12A is combined with the in-plane resonant mode of the PC slab 12, thereby capturing the THz wave.

On the other hand, in the case where the THz wave is made incident on the bulk substrate 12B (without PC structure), the THz wave is reflected or transmitted without being captured by the bulk substrate 12B (without PC structure).

(Demonstration Experiment of Capturing Effect)

A sample of the PC slab absorber 1 according to the first embodiment was fabricated, setting a target frequency as 0.3 THz. Moreover, a sample of the bulk substrate 12B (without PC structure) was also fabricated as a reference.

Figure 5:
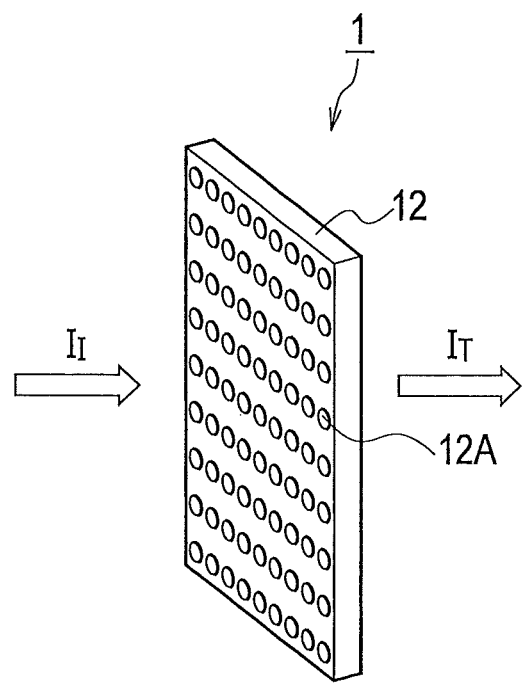
FIG. 5 is a schematic diagram of an experimental system (THz Time-Domain Spectroscopy (THz TDS) for a capturing effect of the PC slab absorber according to the first embodiment (refer to FIG. 43 regarding details configuration).
Figure 43:
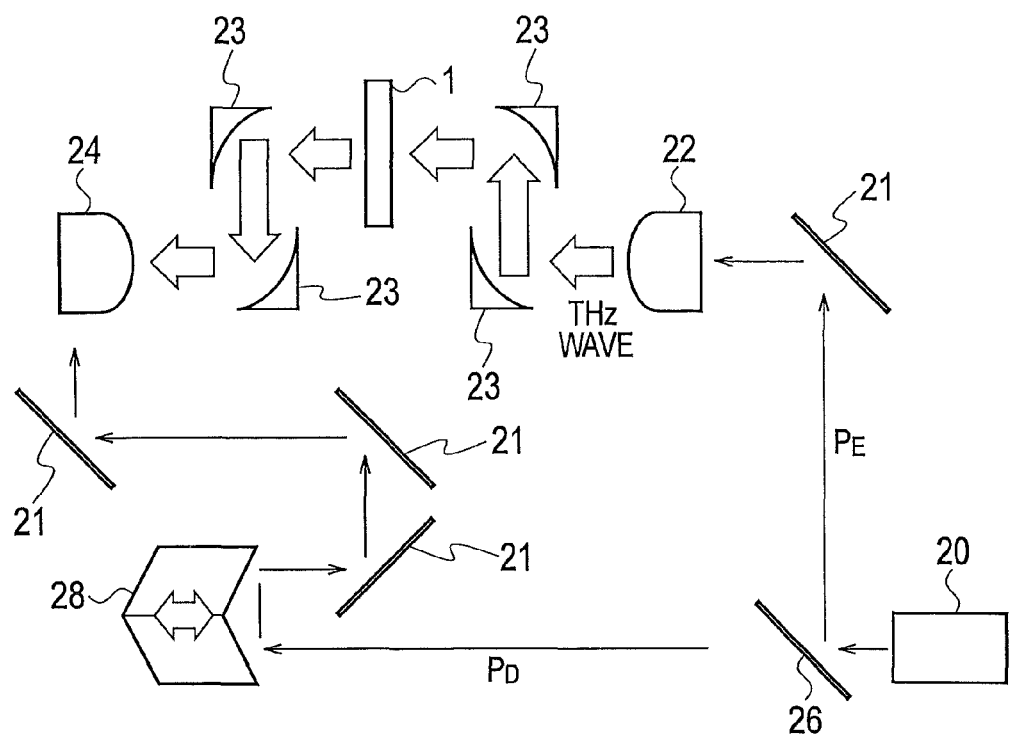
FIG. 43 shows an experimental configuration of the PC slab absorber according to the first embodiment, and shows in particular a schematic block configuration diagram of the THz time-domain spectroscopy (THz TDS).

FIG. 5 shows a schematic diagram of an experimental system (THz Time-Domain Spectroscopy (THz TDS) for a capturing effect of the PC slab absorber according to the first embodiment (refer to FIG. 43 regarding details configuration). In this case, the waveform of the THz wave in the state where there is no sample is used as a reference.

The capturing effect (time domain) and the band edge effect (frequency domain) can be simultaneously observed using the THz TDS by observing the incident electromagnetic wave $I_I$ and the transmitted electromagnetic wave $I_T$ with respect to the sample/reference.

Figure 6:
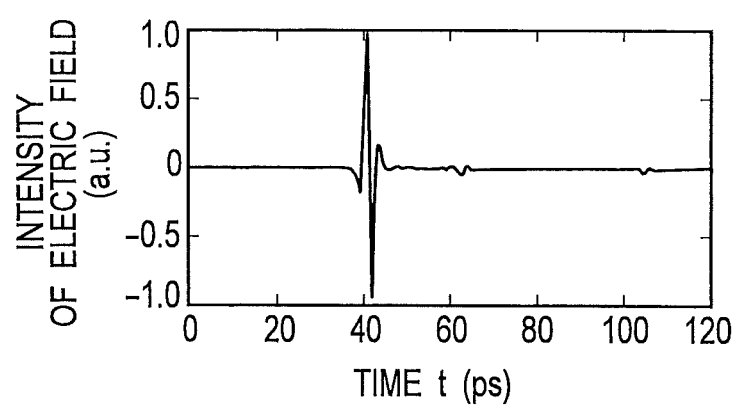
FIG. 6 shows an example of an electric field time waveform of the THz wave used for an incident wave of the THz TDS.
Figure 7:
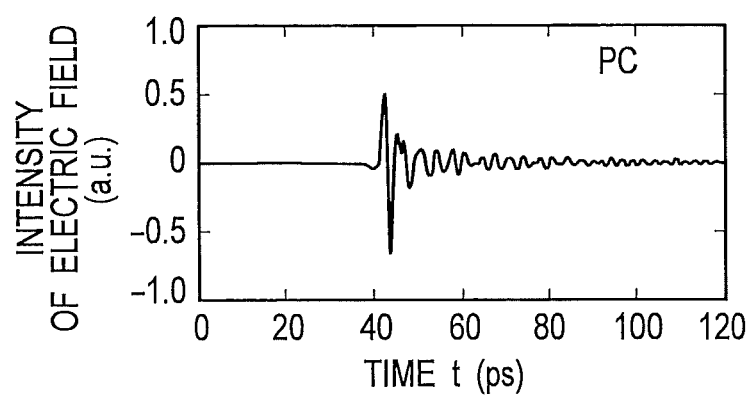
FIG. 7 shows a transmitted electric field time waveform example in the case where the THz wave is made incident on the PC slab absorber according to the first embodiment.

In the THz TDS, FIG. 6 shows a result of a result of observing the transmitted electric field time waveform of the reference, and FIG. 7 shows a result of observing the transmitted electric field time waveform wherein the THz wave is made incident on the PC slab absorber according to the first embodiment.

Figure 8:
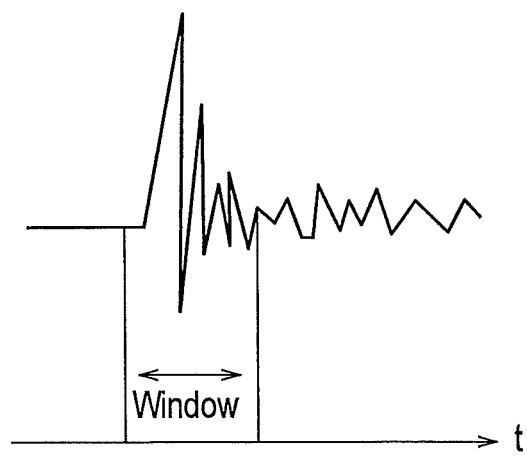
FIG. 8 is an explanatory diagram of a window function W on a transmitted electric field time waveform, in the PC slab absorber according to the first embodiment.
Figure 9:
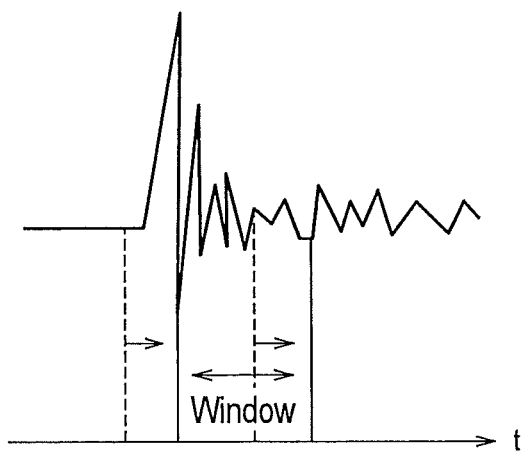
FIG. 9 is an explanatory diagram of a window function W time-shifted on the transmitted electric field time waveform, in the PC slab absorber according to the first embodiment.

In the PC slab absorber according to the first embodiment, FIG. 8 shows a window function W on the transmitted electric field waveform, and FIG. 9 shows a window function W time-shifted on the transmitted electric field waveform. Fourier analysis of the obtained time waveform is executed using the window function W to be time-shifted, and thereby the transmission spectrogram can be obtained.

In this case, Q factor $Q_c$ determined with the resonant frequency and the THz wave capturing effect is evaluated by using Finite-Difference Time-Domain method (FDTD) and Rigorous Coupled Wave Analysis (RCWA) which are methods of electromagnetic field analysis.

(Demonstration Experiment Result of Capturing Effect)

Figure 10:
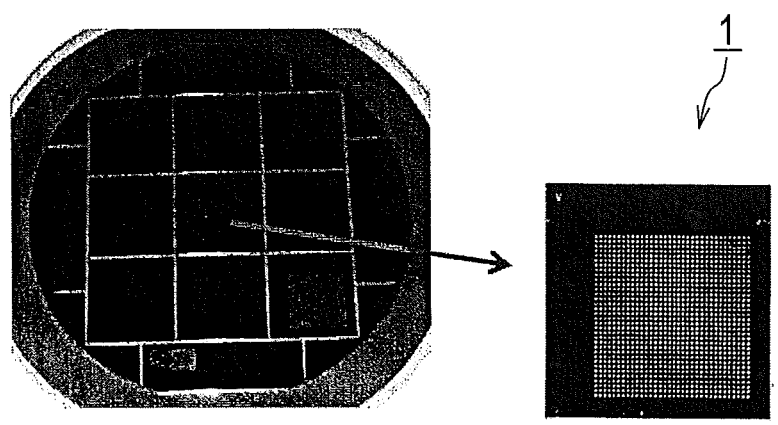
FIG. 10 shows a surface photograph example of the PC slab absorber according to the first embodiment fabricated on a silicon wafer, and a surface photograph example in which one chip is enlarged.

FIG. 10 shows an optical microscope surface photograph example and its enlarged photograph example of the PC slab absorber 1 according to the first embodiment fabricated on a silicon wafer.

Figure 11A:
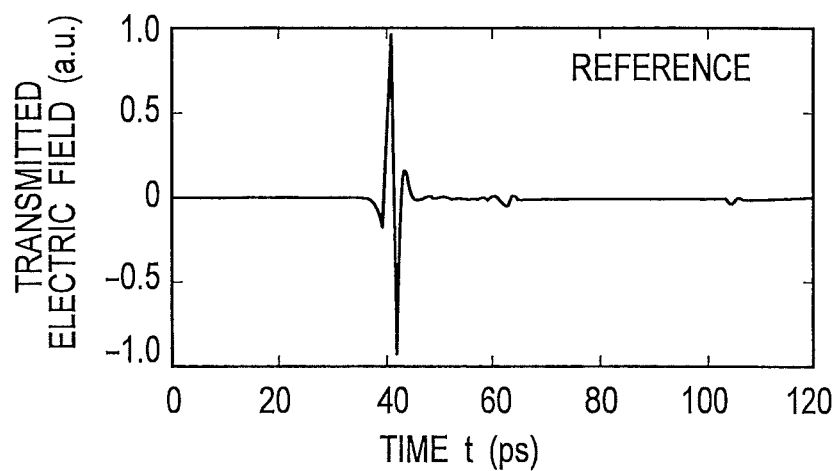
FIG. 11A shows a comparison of the transmitted electric field time waveforms, showing the electric field time waveform of the incident THz wave itself (reference without a sample).
Figure 11B:
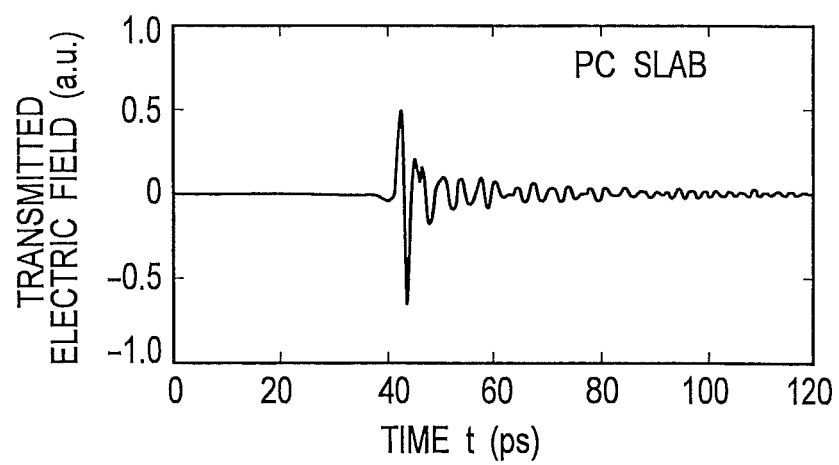
FIG. 11B shows a comparison of the transmitted electric field time waveforms, showing the case where the THz wave is made incident on the PC slab absorber according to the first embodiment.

The spectrograms of the incident THz wave itself (reference), and the transmitted electric field waveforms (corresponds to FIGS. 6 and 7) in the case where the THz wave is made incident on the PC slab absorber are compared as shown in FIGS. 11A and 11B.

The spectrograms of the incident THz wave itself (reference), and the spectrograms of the THz TDS in the case where the THz wave is made incident on the PC slab absorber are compared as shown in FIGS. 12A and 12B. As shown in FIGS. 12A and 12B, the capturing effect (time domain) and the band edge effect (frequency domain) can be simultaneously observed, in the THz TDS. FIGS. 12A and 12B respectively correspond to FIGS. 11A and 11B.

A component captured with the band edge resonant frequency (0.3 THz) is transmitted after some delay. More specifically, as shown in FIGS. 12A and 12B, a time delay component due to the capturing effect (time domain) is observed near the band edge resonant frequency (0.3 THz), in the PC slab absorber 1, as compared with the reference.

A resonant lifetime τr of the PC slab absorber 1 capturing the terahertz (THz) electromagnetic wave is defined with a time period until the intensity of transmitted electric field becomes 1/e. The resonant lifetime τr obtained during the experiment is approximately 30 psec. The Q (Quality Factor) value $Q_c$ determined with the THz wave capturing effect at this time is approximately 60.

(Introduction of Absorption Effect)

The absorption effect of the captured THz wave can be introduced by doping impurities to the 2D-PC slab 12, in the band edge resonant frequency.

Figure 13A:
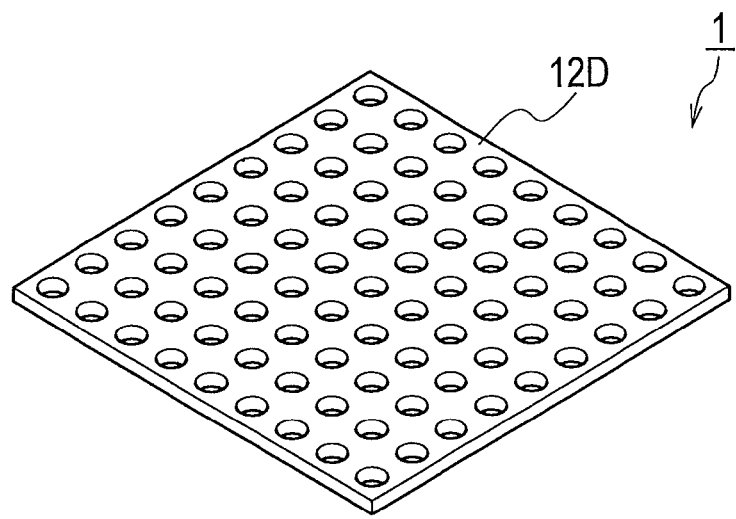
FIG. 13A is a schematic bird's-eye view of the PC slab absorber having through-holes in lattice points for forming resonant-state of PC slab, in which the PC slab is doped with impurities.

FIG. 13A shows a schematic bird's-eye view configuration of the PC slab absorber 1 having through-holes in the lattice points for forming resonant-state 12A, in which the PC slab 12D is doped with impurities.

Figure 13B:
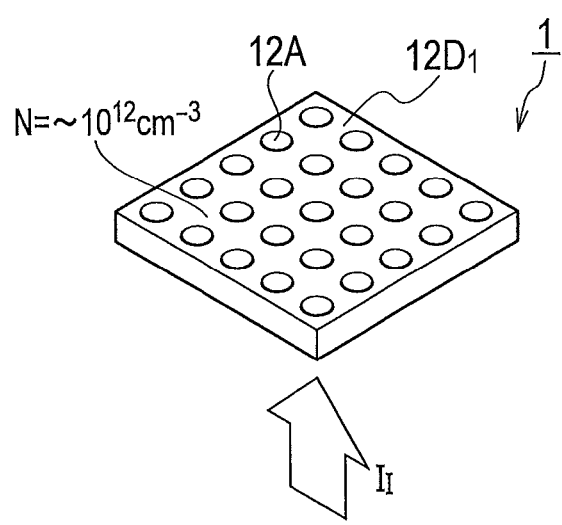
FIG. 13B is a schematic bird's-eye view of the PC slab absorber according to the first embodiment having the through-holes in the lattice points for forming resonant-state of PC slab, in which the PC slab is doped with impurities ($N \sim 10^{12}$ cm$^{-3}$).

FIG. 13B shows a schematic bird's-eye view configuration of the PC slab absorber 1 having through-holes in the lattice points for forming resonant-state 12A, in which the PC slab $12D_1$ is doped with impurities (N~$10^{12}$ cm$^{-3}$). Moreover, FIG. 13C shows a schematic bird's-eye view configuration of the PC slab absorber having through-holes in the lattice points for forming resonant-state 12A, in which the PC slab $12D_2$ is doped with impurities (N~$10^{15}$ cm$^{-3}$).

Figure 13C:
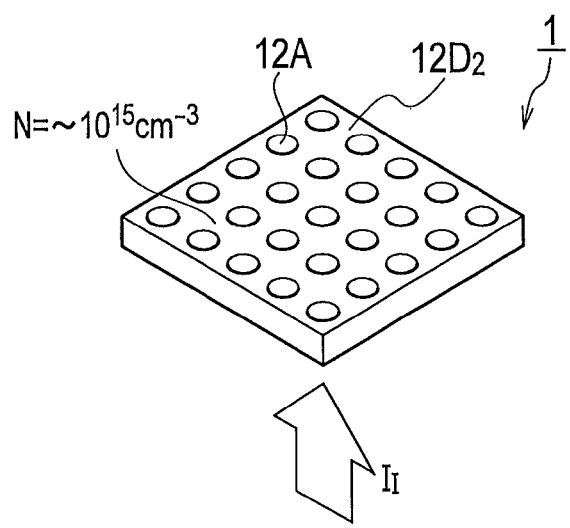
FIG. 13C is a schematic bird's-eye view of the PC slab absorber according to the first embodiment having the through-holes in the lattice points for forming resonant-state of PC slab, in which the PC slab is doped with impurities ($N \sim 10^{15}$ cm$^{-3}$).
Figures 14A, 14B:
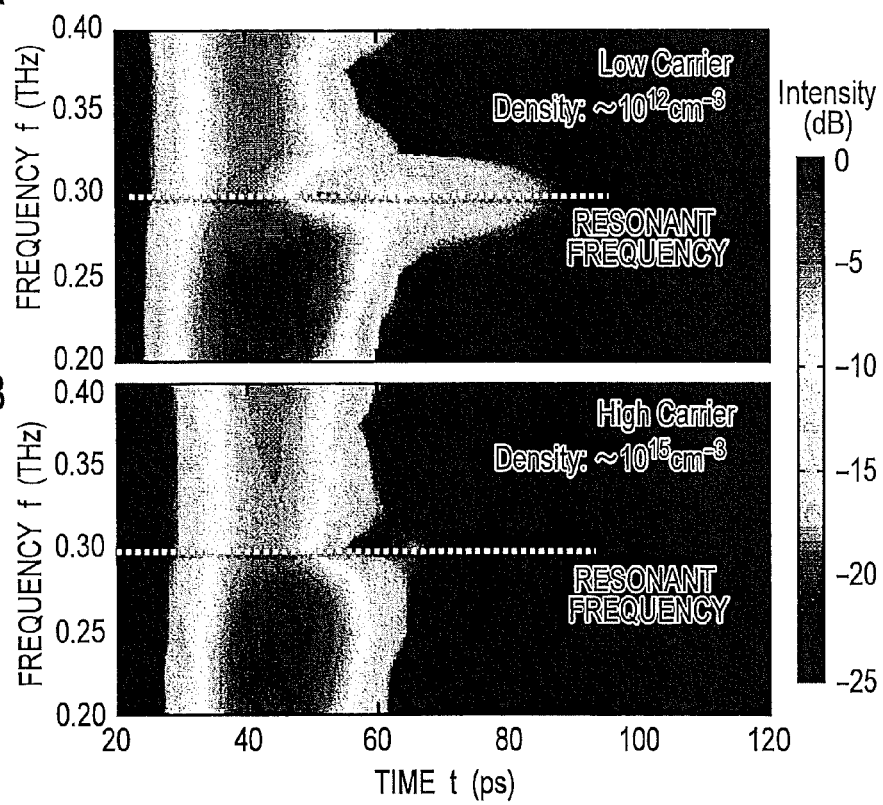
FIG. 14A shows a comparison of spectrograms in the case corresponding to the case of FIG. 13B.
FIG. 14B shows a comparison of the spectrograms in the case corresponding to the case of FIG. 13C.

The spectrograms of the THz TDS in the case where THz electromagnetic wave II is made incident on the PC slab absorber 1 shown in FIGS. 13B and 13C are compared as shown in FIGS. 14A and 14B.

In the sample example shown in FIGS. 13B and 14A in which the impurities (N~$10^{12}$ cm$^{-3}$) is doped with a relatively lower carrier density, the resonant lifetime τr is approximately 30 psec, and the Q factor $Q_c$ determined with the THz wave capturing effect at this time is approximately 60. On the other hand, in the sample example shown in FIGS. 13C and 14B in which the impurities (N~$10^{15}$ cm$^{-3}$) is doped with a relatively higher carrier density, the resonant lifetime τr is approximately 10 psec, and the Q factor Qc determined with the THz wave capturing effect at this time is approximately 20. The resonant lifetime τr is decreased from approximately 30 psec to approximately 10 psec, and the Q factor Qc determined with the THz wave capturing effect is also decreased from approximately 60 to approximately 20.

As the above-mentioned result, the absorption effect of the captured THz wave to be absorbed into materials can be introduced in the band edge resonant frequency by doping the impurities to the 2D-PC slab 12.

(Absorption Spectrum)

In the PC slab absorber according to the first embodiment, FIG. 15A shows a schematic planar pattern configuration example of the lattice point for forming resonant-state 12A of the PC slab, and FIG. 15B shows a schematic cross-sectional structure taken in the line I-I of FIG. 15A. The example shown in FIGS. 15A and 15B corresponds to the example of providing the through-hole in the lattice point for forming resonant-state 12A. In this case, the resistivity of the substrate of PC slab is approximately 10 Ωcm, and the carrier density in the impurities doping is approximately $1.2 \times 10^{15}$ (cm$^{-3}$). Moreover, the period (lattice constant a) is 450 μm, the diameter D of the lattice point for forming resonant-state 12A is 0.6a=270 μm, and the thickness TH of the PC slab 12 (equal to the depth d of the lattice point for forming resonant-state 12A) is 200 μm.

FIG. 16 shows an example of frequency characteristics of the absorptivity in the PC slab applicable to the PC slab absorber according to the first embodiment (comparison between the THz TDS measured result and the simulation result). In the PC slab absorber according to the first embodiment, as shown in FIG. 16, a peak of the absorptivity (%) is obtained near the frequency f being 0.30 THz, and therefore the principle verification of the capturing and absorption effects in the band edge resonant frequency is conducted.

(Achieving Broader Bandwidth: First Method)

FIGS. 17A and 17B show a first method for achieving broader bandwidth in the PC slab absorber 1 according to the first embodiment. Moreover, the first method is a method achieving broader bandwidth by decreasing the Q factor $Q_c$ determined with the THz wave capturing effect.

FIG. 17A shows the PC slab 12 having vertically symmetric through-holes to the principal surface of the PC slab 12 in the lattice points for forming resonant-state 12A, FIG. 17BA shows the PC slab having vertically asymmetric non-through holes therein.

In order to achieve broader bandwidth by decreasing the Q factor $Q_c$ determined with the THz wave capturing effect, it is effective to introduce the asymmetric structure into the lattice point for forming resonant-state 12A.

(Achieving Broader Bandwidth: Second Method)

A second method for achieving broader bandwidth is a method of achieving broader bandwidth by moving two adjacent resonant points close to each other, in the PC slab absorber 1 according to the first embodiment.

The two adjacent resonant points may not only be close to each other, but also be matched to each other.

The frequency f (THz) characteristics of the transmissivity (%) in the case of having different hole shapes of the lattice points for forming resonant-state 12A respectively correspond to the curved lines P, Q, and R, in the PC slab absorber 1 according to the first embodiment.

Figure 19:
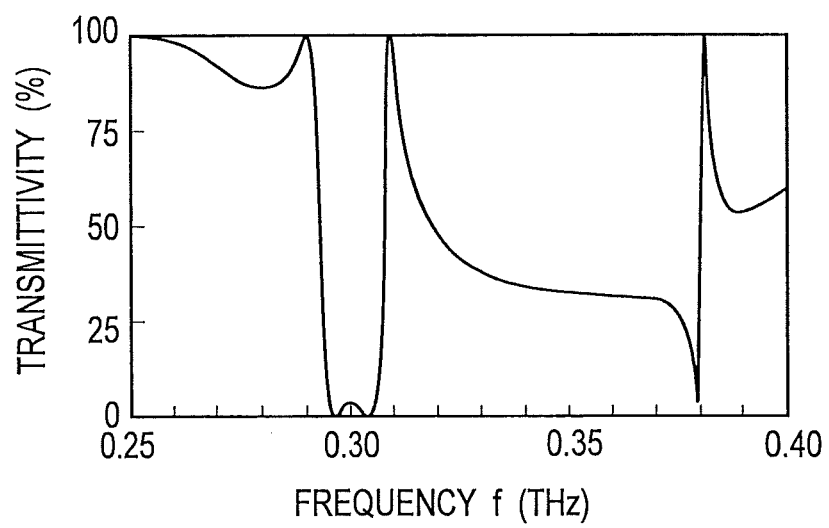
FIG. 19 shows a curved line P of FIG. 18 suitable for achieving the broader bandwidth by moving two adjacent resonant points close to each other, in the PC slab absorber according to the first embodiment (an example of frequency characteristics of transmissivity).

FIG. 19 shows an enlarged drawing of the curved line P shown in FIG. 18 suitable for achieving the broader bandwidth by moving two adjacent resonant points close to each other, in the PC slab absorber according to the first embodiment (example of frequency characteristics of transmissivity). In two adjacent resonant points (near the band edge resonant frequency), the transmissivity is reduced to approximately zero (the absorptivity is increased conversely), as shown in FIG. 19. Accordingly the curved lines of the absorptivity can be superimposed by moving the two adjacent resonant points close to each other, thereby achieving broader bandwidth.

(Type of Resonant Point)

Figure 20:
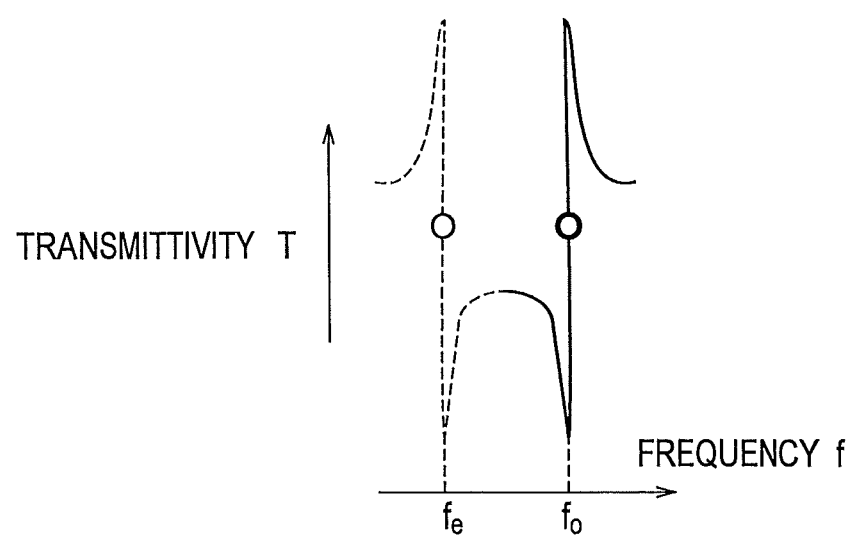
FIG. 20 is an explanatory diagram in the case of achieving the broader bandwidth by moving two adjacent resonant points close to each other, in an even mode mainly having an electric field component in a plane of the PC slab, and an odd mode mainly having a magnetic field component in the plane.

FIG. 20 is an explanatory diagram for achieving the broader bandwidth by moving two adjacent resonant points close to each other, in an even mode mainly having an electric field component in a plane of the PC slab, and an odd mode mainly having a magnetic field component in the plane. The two adjacent resonant frequencies can be expressed with the resonant frequency $f_e$ in the even mode and the resonant frequency $f_o$, in the odd mode in terms of the frequency f characteristics of the transmissivity T. Accordingly, the two adjacent resonant points are close to each other by moving the even mode and the odd mode close to each other, thereby achieving broader bandwidth.

Figure 21A:
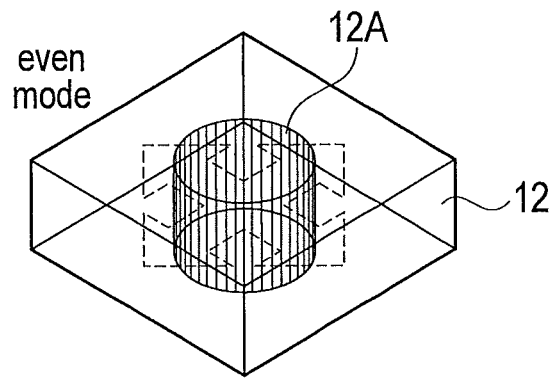
FIG. 21A is an explanatory diagram of the even mode mainly having the electric field component in the plane of the PC slab, and showing in particular a schematic diagram of a resonant direction (dashed arrow direction) in the lattice point for forming resonant-state.
Figure 21B:
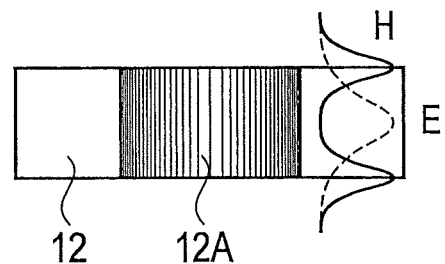
FIG. 21B is an explanatory diagram of the even mode mainly having the electric field component in the plane of the PC slab, and shows in particular a schematic diagram of an electric field distribution (dashed line) and a magnetic field distribution (solid line), in the lattice point for forming resonant-state.

FIG. 21A is an explanatory diagram of the even mode mainly having the electric field component in the plane of the PC slab, and showing in particular a schematic diagram of a resonant direction (dashed arrow direction) in the lattice point for forming resonant-state 12A, and FIG. 21B shows a schematic diagram of an electric field distribution (dashed line) and a magnetic field distribution (solid line), in the lattice point for forming resonant-state 12A.

Figure 22A:
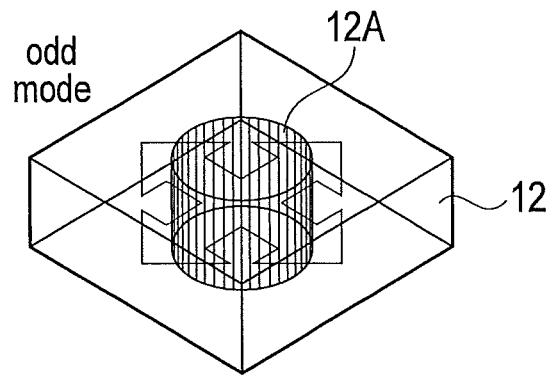
FIG. 22A is an explanatory diagram of the odd mode mainly having the magnetic field component in the plane of the PC slab, and shows in particular a schematic diagram of a resonant direction (solid arrow direction), in the lattice point for forming resonant-state.
Figure 22B:
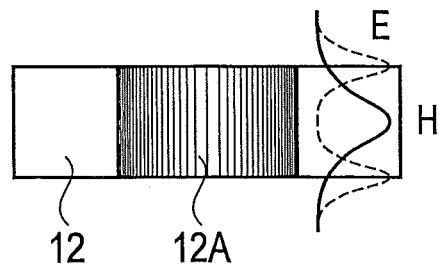
FIG. 22B is an explanatory diagram of the odd mode mainly having the magnetic field component in the plane of the PC slab, and shows in particular a schematic diagram of an electric field distribution (dashed line) and a magnetic field distribution (solid line), in the lattice point for forming resonant-state.

On the other hand, FIG. 22A shows an explanatory diagram of the odd mode mainly having the magnetic field component in the plane of the PC slab, and shows in particular a schematic diagram of a resonant direction (solid arrow direction), in the lattice point for forming resonant-state 12A, and FIG. 22B shows a schematic diagram of an electric field distribution (dashed line) and a magnetic field distribution (solid line), in the lattice point for forming resonant-state 12A.

Parameters for achieving broader bandwidth by moving two adjacent resonant points close to each other include the thickness TH of the PC slab 12, the period a, the hole diameter (the diameter D of hole) and the hole depth d of the lattice point for forming resonant-state 12A, the two adjacent resonant points can be close to each other by adjusting comprehensively these parameters.

(Reduction of Q Factor $Q_c$ Determined with THz Wave Capturing Effect: Asymmetrical (Non-Through Hole) Structure)

Figure 23A:
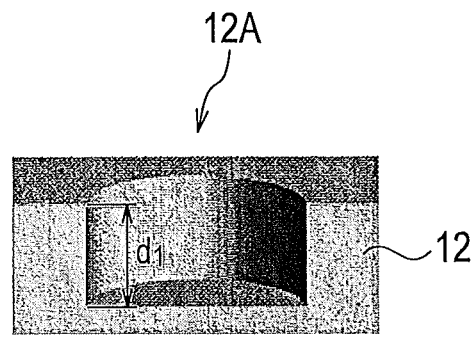
FIG. 23A is a cross-sectional schematic diagram of the lattice point for forming resonant-state of PC slab applicable to the PC slab absorber according to the first embodiment, and shows in particular an example of a depth $d_1$ (80%).
Figure 23B:
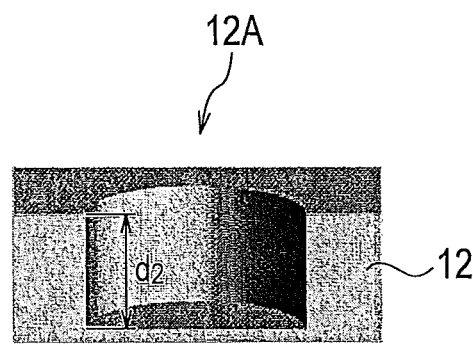
FIG. 23B is a cross-sectional schematic diagram of the lattice point for forming resonant-state of PC slab applicable to the PC slab absorber according to the first embodiment, and shows in particular an example of a depth $d_2$ (90%).
Figure 23C:
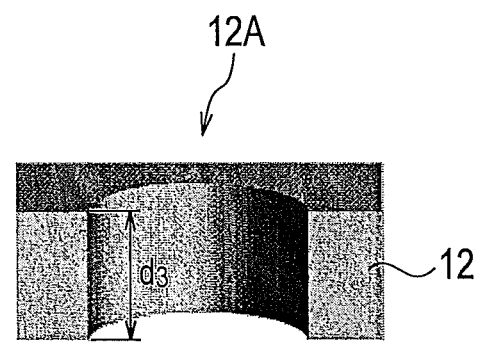
FIG. 23C is a cross-sectional schematic diagram of the lattice point for forming resonant-state of PC slab applicable to the PC slab absorber according to the first embodiment, and shows in particular an example of a depth $d_3$ (100%).

FIGS. 23A-23C show cross-sectional schematic diagrams of the lattice point for forming resonant-state 12A of the PC slab 12 applicable to the PC slab absorber 1 according to the first embodiment. FIG. 23A shows in particular an example of the depth $d_1$ (80%), FIG. 23B shows in particular an example of the depth $d_2$ (90%), and FIG. 23C shows in particular an example of the depth $d_3$ (100%).

Figure 24:
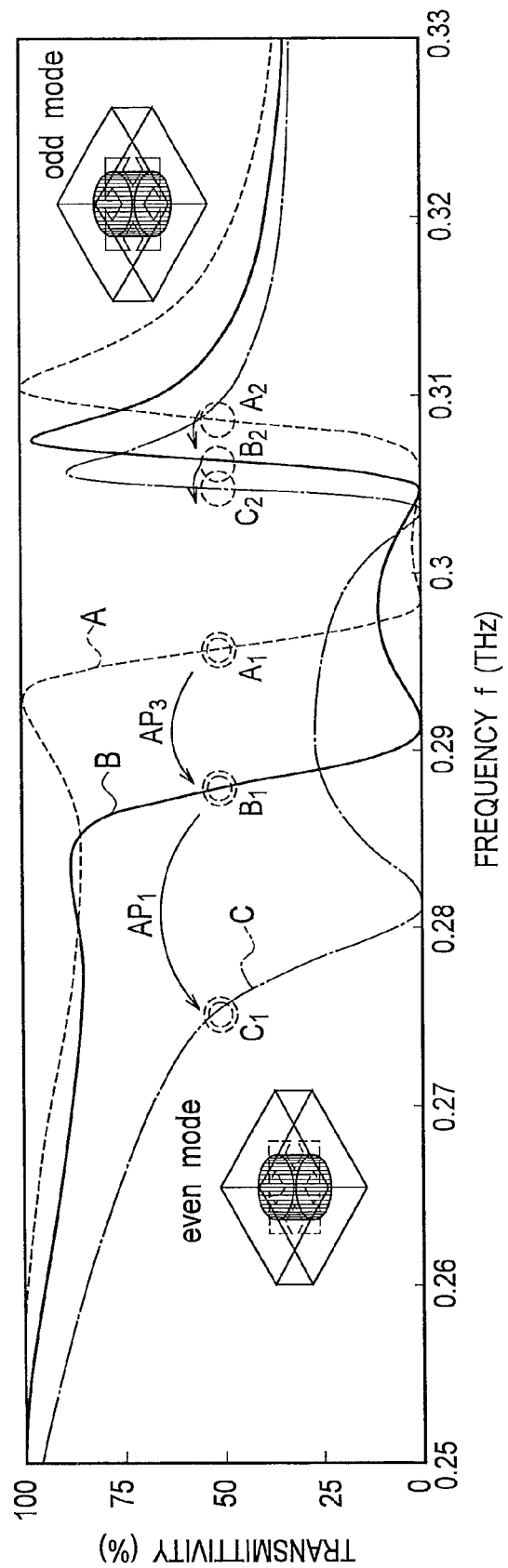
FIG. 24 shows a frequency characteristics example of the transmissivity in the PC slab absorber according to the first embodiment (where A: an example of the depth $d_3$ (100%), B: an example of the depth $d_2$ (90%), and C: an example of the depth $d_1$ (80%)).

FIG. 24 shows an example of frequency characteristics of the transmissivity (%) in the PC slab absorber 1 according to the first embodiment. In FIG. 24, the curved line A corresponds to an example where the lattice point for forming resonant-state 12A shown in FIG. 23A has the depth $d_3$ (100%), the curved line B corresponds to an example where the lattice point for forming resonant-state 12A shown in FIG. 23B has the depth $d_2$ (90%), and the curved line C corresponds to an example where the lattice point for forming resonant-state 12A shown in FIG. 23C has the depth $d_1$ (80%). Moreover, the points $A_1$, $A_2$ on the curved line A denote two adjacent even mode resonant frequency and odd mode resonant frequency. Similarly, the points $B_1$, $B_2$ on the curved line B denote two adjacent even mode resonant frequency and odd mode resonant frequency, and the points $C_1$, $C_2$ on the curved line C denote two adjacent even mode resonant frequency and odd mode resonant frequency.

As shown in FIGS. 23 and 24, the even mode resonant frequency is relatively largely shifted to a lower frequency side in the shift direction $A_1 \rightarrow B_1 \rightarrow C_1$, as shown in arrows $AP_3$ and $AP_1$, by introducing the asymmetrical (non-through hole) structure. On the other hand, the shift amount of the odd mode resonant frequency is relatively smaller, as shown in the shift direction $A_2 \rightarrow B_2 \rightarrow C_2$.

As shown in FIGS. 23 and 24, the Q factor $Q_c$ determined with the THz wave capturing effect of the even mode can be reduced by introducing the asymmetrical (non-through hole) structure, thereby achieving broader bandwidth in terms of the frequency characteristics of the absorptivity as a result.

(Adjusting Hole Diameter D for Moving Resonant Points Close to Each Other)

Figure 25A:
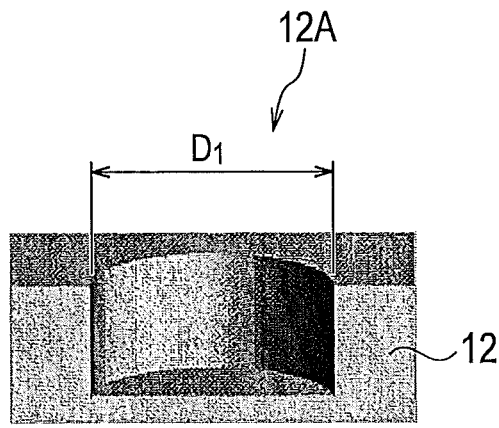
FIG. 25A is a cross-sectional schematic diagram of the lattice point for forming resonant-state of PC slab applicable to the PC slab absorber according to the first embodiment, and shows in particular an example of a diameter $D_1$ (=0.3a).
Figure 25B:
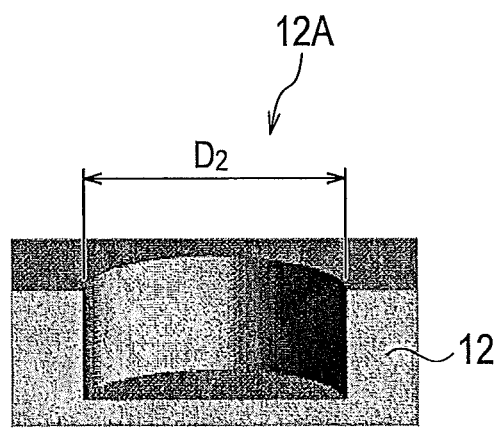
FIG. 25B is a cross-sectional schematic diagram of the lattice point for forming resonant-state of PC slab applicable to the PC slab absorber according to the first embodiment, and shows in particular an example of a diameter $D_2$ (=0.35a).
Figure 25C:
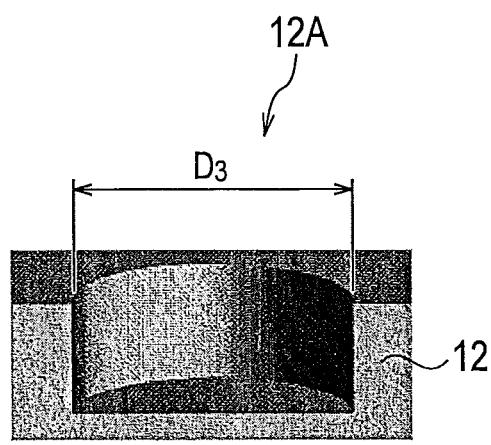
FIG. 25C is a cross-sectional schematic diagram of the lattice point for forming resonant-state of PC slab applicable to the PC slab absorber according to the first embodiment, and shows in particular an example of a diameter $D_3$ (=0.40a).

FIGS. 25A-25C show cross-sectional schematic diagrams of the lattice point for forming resonant-state 12A of the PC slab 12 applicable to the PC slab absorber 1 according to the first embodiment. FIG. 25A shows in particular an example of the diameter $D_1$ (=0.3a), FIG. 25B shows in particular an example of the diameter $D_2$ (=0.35a), and FIG. 25C shows in particular an example of the diameter $D_3$ (=0.40a). In this case, a denotes a period (lattice constant) of the lattice point for forming resonant-state 12A.

Figure 26:
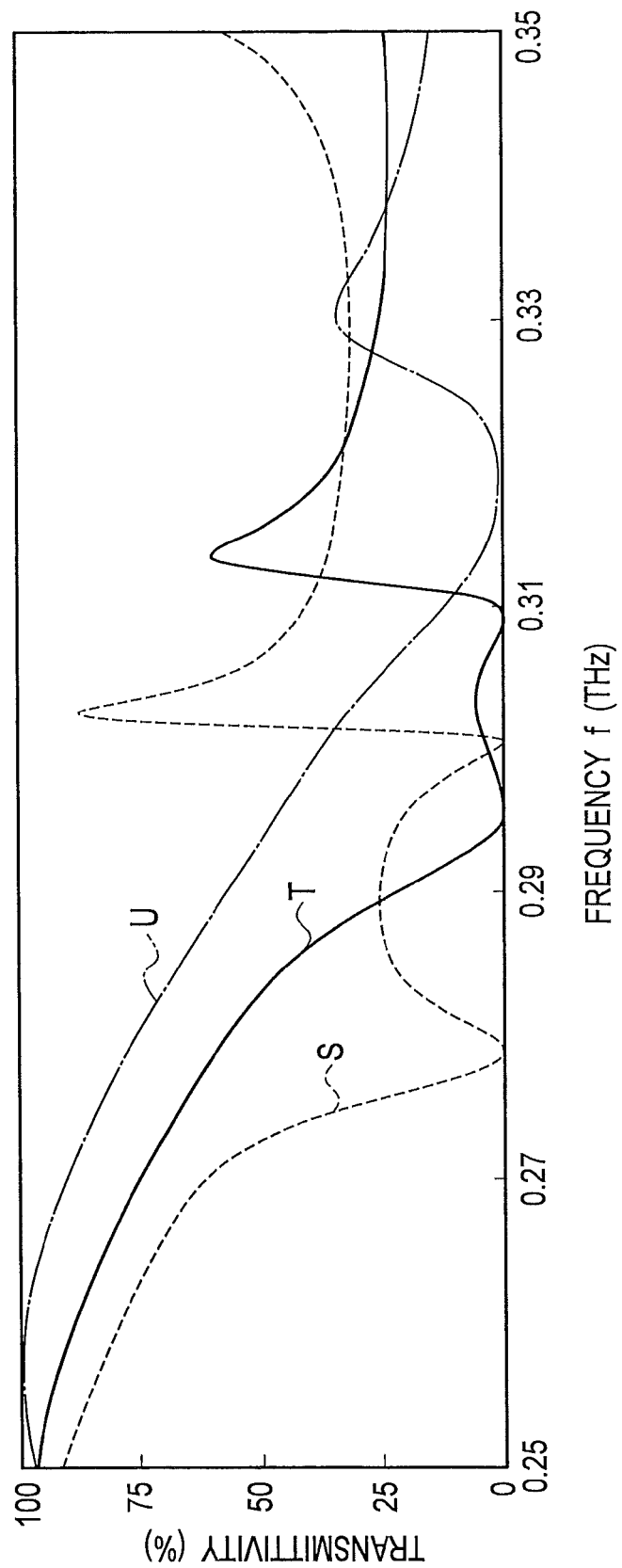
FIG. 26 shows a frequency characteristics example of the transmissivity in the PC slab absorber according to the first embodiment (where S: an example of the diameter $D_1$ (=0.3a), T: an example of the diameter $D_2$ (=0.35a), and U: an example of the diameter $D_3$ (=0.40a)).

FIG. 26 shows an example of frequency characteristics of the transmissivity (%) in the PC slab absorber 1 according to the first embodiment. In FIG. 26, the curved line S corresponds to an example where the lattice point for forming resonant-state 12A shown in FIG. 25A has the diameter $D_1$ (=0.3a), the curved line T corresponds to an example where the lattice point for forming resonant-state 12A shown in FIG. 25B has the diameter $D_2$ (=0.35a), and the curved line U corresponds to an example where the lattice point for forming resonant-state 12A shown in FIG. 25C has the diameter $D_3$ (=0.40a).

As shown in FIGS. 25 and 26, two resonant points, i.e., the even mode resonant frequency and the odd mode resonant frequency, are relatively close to each other, as shown in the curved lines $S \rightarrow T \rightarrow U$, by adjusting the diameter D of the lattice point for forming resonant-state 12A to be relatively largely set as $D_1 \rightarrow D_2 \rightarrow D_3$, thereby achieving broader bandwidth in terms of the frequency characteristics of the absorptivity as a result.

(Adjusting Structure of Hole Diameter D for Reducing Q Factor $Q_c$ Determined with THz Wave Capturing Effect, and for Moving Resonant Point Close to Each Other)

Figure 27:
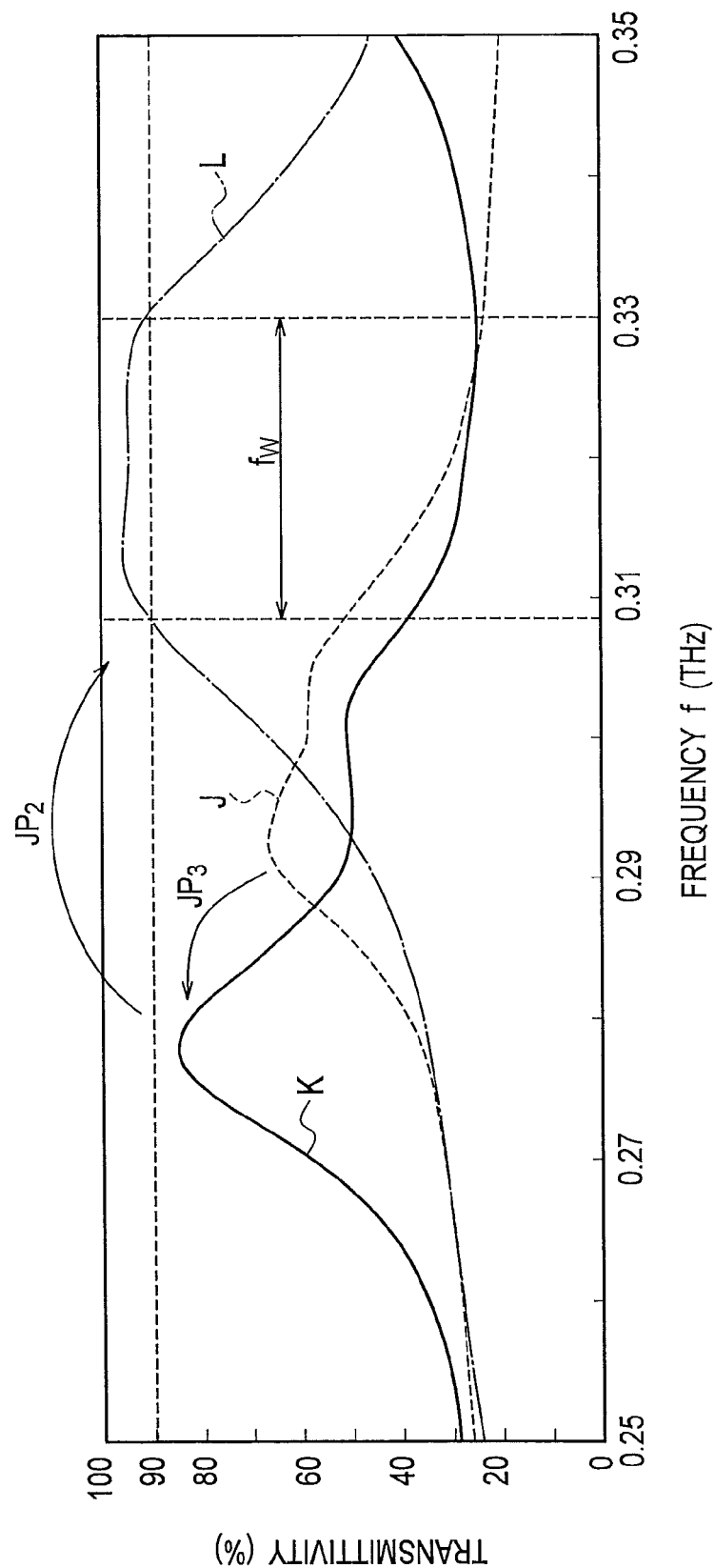
FIG. 27 shows a frequency characteristics example of the transmissivity in the PC slab absorber according to the first embodiment (where J: an example of providing the through-hole shown in FIG. 15, K: an example of providing the non-through hole having asymmetric structure, and L: an example of achieving the broader bandwidth by moving the resonant points close to each other).

FIG. 27 shows an example of frequency characteristics of the transmissivity (%) in the PC slab absorber 1 according to the first embodiment.

In FIG. 27, the curved line J corresponds to an example of providing the through-hole shown in FIG. 15.

On the other hand, a curved line K corresponds to an example of achieving broader bandwidth by reducing the Q factor $Q_c$ determined with the THz wave capturing effect, by adjusting the hole depth H of the lattice point for forming resonant-state 12A to introduce the non-through hole having asymmetric structure.

Furthermore, the curved line L corresponds to an example of achieving broader bandwidth by adjusting the hole diameter D of the lattice point for forming resonant-state 12A to move the adjacent two resonant points close to each other.

In FIG. 27, the arrow $JP_3$ denotes a shift from curved line J to the curved line K (J→K), and the arrow $JP_2$ denotes a shift from the curved line K to the curved line L (K→L).

In the PC slab absorber 1 according to the first embodiment, although a peak shift to the relatively lower-frequency side is observed in the shift from the curved line J to the curved line K (J→K), the Q factor $Q_c$ determined with the THz wave capturing effect is reduced, thereby achieving broader bandwidth and making the absorptivity relatively higher.

Moreover, in the PC slab absorber 1 according to the first embodiment, a peak shift to the relatively higher-frequency side is observed in the shift from the curved line K to the curved line L (K→L), and the relatively higher absorptivity can be obtained in the broader bandwidth by moving the two adjacent resonant points close to each other thereby achieving broader bandwidth. In particular in the curved line L, a higher absorptivity equal to or greater than approximately 90% can be obtained in the broader bandwidth fw ranging from approximately 0.31 THz to approximately 0.33 THz.

(Optimization of Material Absorption)

In the PC slab absorber 1 according to the first embodiment, the material absorption and the carrier density can be optimized by doping with a suitable dose amount of the impurities to the material substrate of PC slab 12.

Figure 28A:
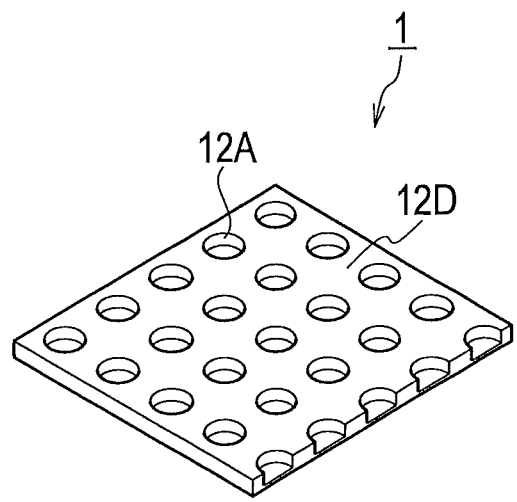
FIG. 28A is a schematic bird's-eye view configuration diagram showing the PC slab absorber according to the first embodiment having the PC slab to which the carrier density is varied in order to introduce the material absorption matching with capturing effect.
Figure 28B:
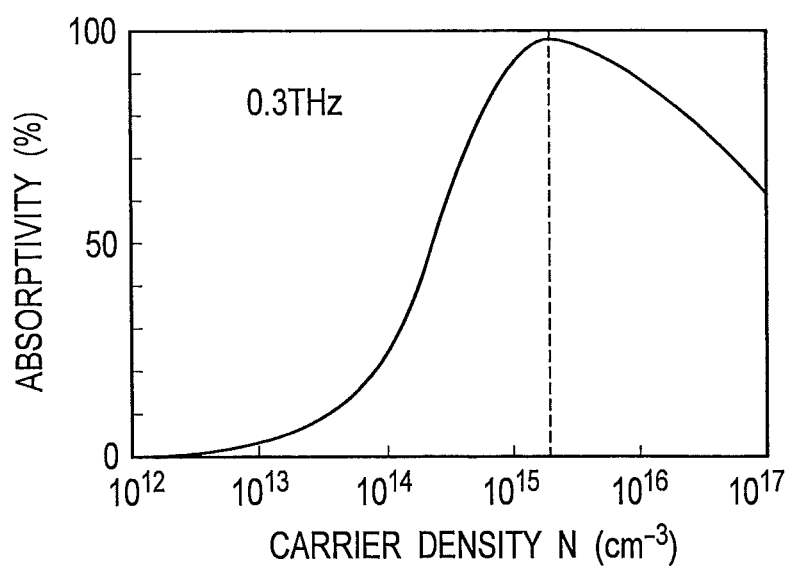
FIG. 28B shows a relationship between the absorptivity (%), and the carrier density N ($cm^{-3}$) obtained by optimizing the imaginary part of dielectric constant of material in a simulation using the Drude Model.

FIG. 28A shows a schematic bird's-eye view configuration showing the PC slab absorber 1 according to the first embodiment having the PC slab 12D to which the carrier density is varied in order to introduce the material absorption matching with capturing effect. FIG. 28B shows a relationship between the absorptivity (%), and the carrier density N (cm$^{-3}$) obtained by optimizing the imaginary part of dielectric constant of material in a simulation using the Drude Model. FIG. 28B shows a result of performing a simulation for the absorptivity of photonic crystal having the resonance effect on a frequency of 0.3 THz using a complex dielectric constant calculated with the Drude Model from the carrier density N (cm$^{-3}$).

As shown in FIG. 28B, the absorptivity became the maximum at the carrier density N of approximately $2 \times 10^{15}$ cm$^{-3}$. Under the above-mentioned conditions, the Q factor $Q_a$ determined with the intrinsic material absorption and the Q factor $Q_c$ determined with the THz wave capturing effect in the structure of PC slab 12D can be matched to each other, the THz wave captured by the PC slab 12D interacts effectively with the free carrier absorption in the semiconductor (Si in this case), and thereby the absorptivity is maximized.

(Fabricated Sample)

A sample of the PC slab absorber according to the first embodiment was fabricated by processing a silicon wafer having the carrier density $N = 2 \times 10^{15}$ (cm$^{-3}$) with photo lithography and plasma etching, on the basis of the obtained design.

Figure 29:
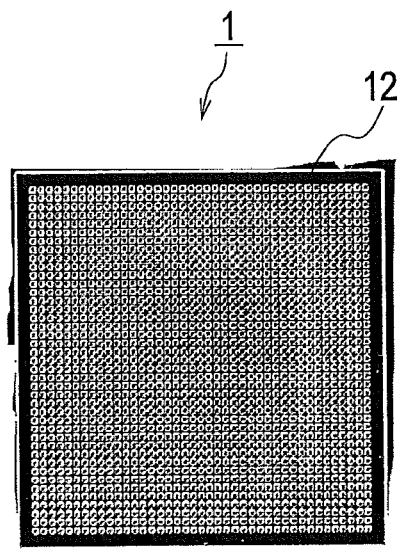
FIG. 29 shows an optical microscope photograph example of a sample surface of the fabricated PC slab absorber according to the first embodiment.
Figure 30:
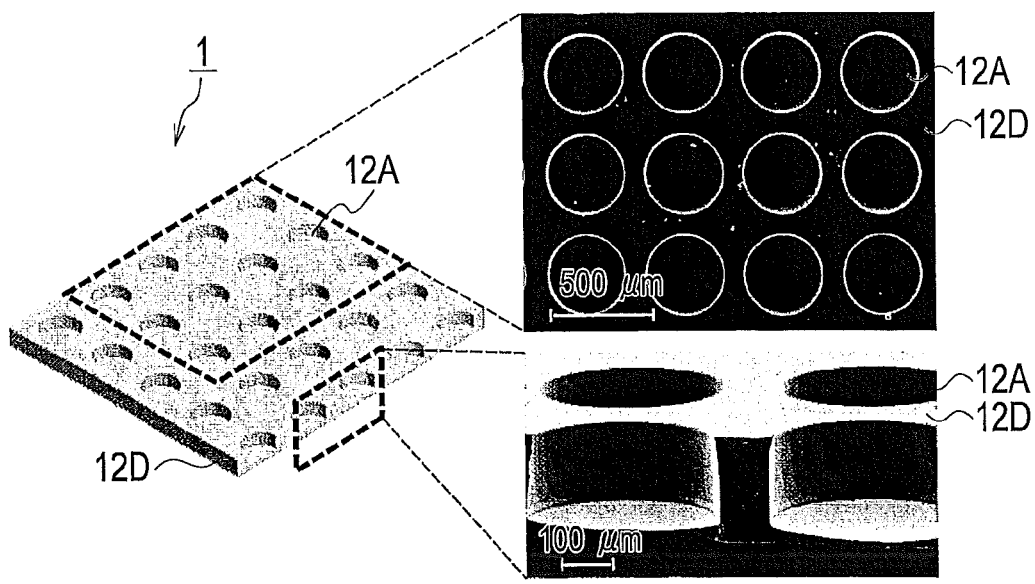
FIG. 30 shows a surface scanning electron micrograph (SEM) example and an edge face SEM example corresponding to a schematic bird's-eye view configuration of the PC slab absorber according to the first embodiment.

FIG. 29 shows an optical microscope photograph example of a surface chip in the sample of the fabricated PC slab absorber 1 according to the first embodiment. Moreover, FIG. 30 shows a schematic bird's-eye view configuration of the PC slab absorber 1 according to the first embodiment, and a surface SEM photograph example and an edge face SEM photograph example corresponding thereto.

(Rate of Absorptivity, Transmissivity and Reflectance)

Figure 31:
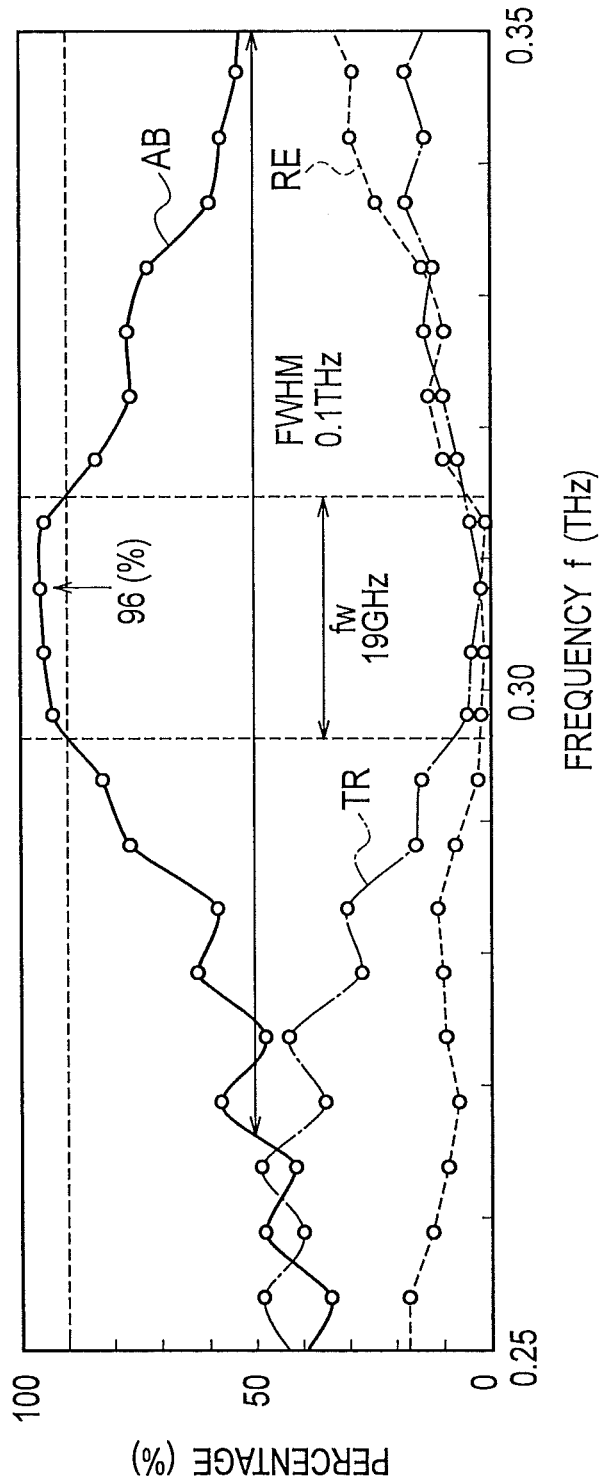
FIG. 31 shows a relationship between a rate (%) of the absorptivity, transmissivity, and reflectance, and the frequency f (THz), obtained in the PC slab absorber according to the first embodiment.

FIG. 31 shows a relationship between a rate (%) of the absorptivity AB, the transmissivity TR and the reflectance RE, obtained with the absorptivity AB=1−(TR+RE) by measuring the transmissivity TR and the reflectance RE with the THz TDS, and the frequency f (THz).

In the PC slab absorber 1 according to the first embodiment, as shown in FIG. 31, there are obtained characteristics having the maximal absorption rate of approximately 96%, 90% absorption bandwidth of approximately 19 GHz, and the Full-Width Half-Maximum (FWHM) of approximately 0.1 THz.

(Extension to Other Frequency Bands)

Figure 32A:
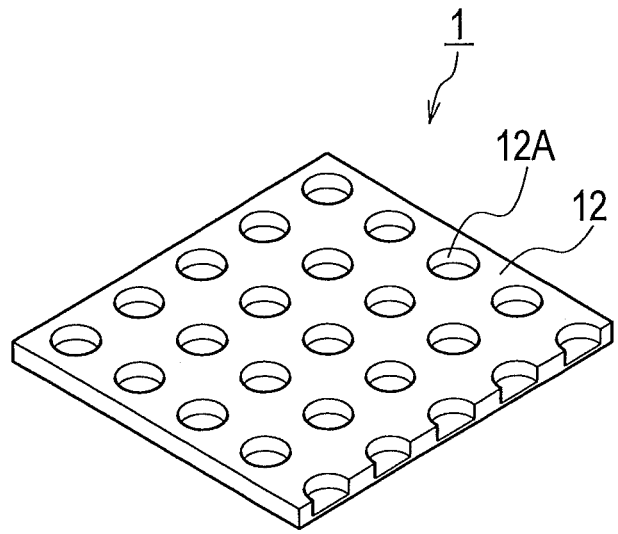
FIG. 32A shows a schematic bird's-eye view configuration for explaining the extensibility to other frequency bands by scaling according to the wavelength in order to obtain the capturing effect, and shows in particular an example in which an electromagnetic wave is applied thereto, in the PC slab absorber according to the first embodiment.
Figure 32B:
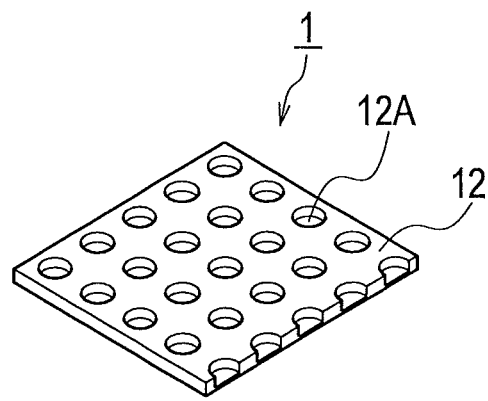
FIG. 32B shows a schematic bird's-eye view configuration for explaining the extensibility to other frequency bands by scaling according to the wavelength in order to obtain the capturing effect, and shows in particular an example in which the THz band is applied thereto, in the PC slab absorber according to the first embodiment.
Figure 32C:
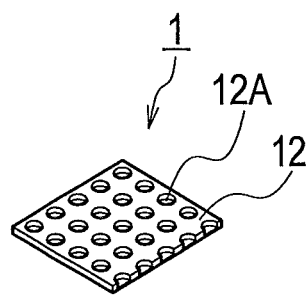
FIG. 32C shows a schematic bird's-eye view configuration for explaining the extensibility to other frequency bands by scaling according to the wavelength in order to obtain the capturing effect, and shows in particular an example in which a light wave region is applied thereto, in the PC slab absorber according to the first embodiment.

FIGS. 32A-32C show a relative schematic bird's-eye view configuration for explaining extensibility to other frequency bands by scaling according to the wavelength in order to obtain the capturing effect, in the PC slab absorber 1 according to the first embodiment. FIG. 32A shows in particular an example in which the electromagnetic wave is applied thereto, FIG. 32B shows in particular an example in which the THz band is applied thereto, and FIG. 32C shows in particular an example in which the light wave region is applied thereto. In each figure in FIGS. 32A to 32C, the period of the lattice point for forming resonant-state 12A is equal to approximately the wavelength in the medium.

The PC slab absorber according to the first embodiment can support to electromagnetic wave ranging from approximately 100 MHz to approximately 100 THz, by using a scaling law of the photonic crystal, and doping technologies of semiconductor.

Figure 33:
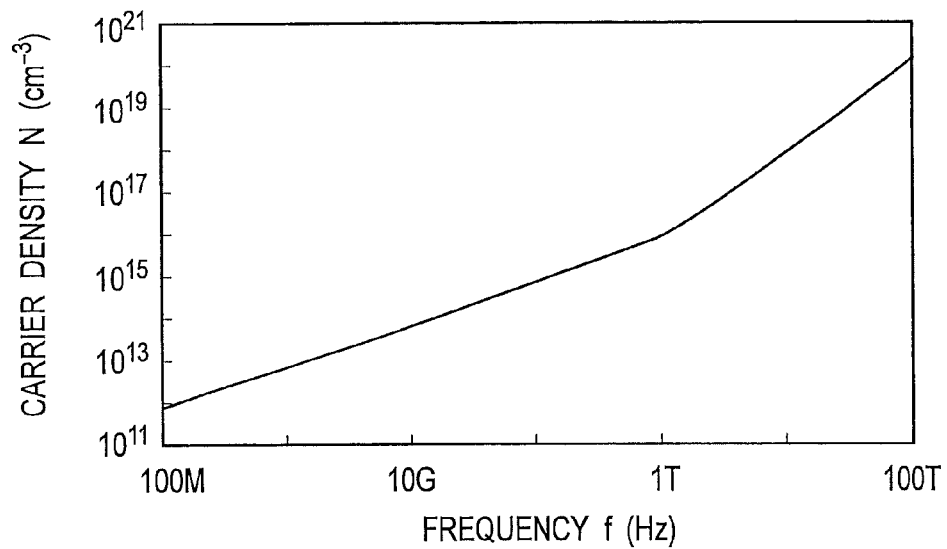
FIG. 33 shows a theoretical analysis result obtained using the Drude Model of a relationship between the carrier density N and the frequency f (THz) doped in order to obtain an absorption effect ($cm^{-3}$), in the PC slab absorber according to the first embodiment.

In the PC slab absorber 1 according to the first embodiment, FIG. 33 shows A relationship between the carrier density N (cm$^{-3}$) and the frequency f (THz) (theoretical analysis result obtained using the Drude Model) obtained by doping with impurities to the PC slab 12 in order to obtain the absorption effect. The carrier density N (cm$^{-3}$) to be doped is adjusted so as to obtain the same imaginary part of dielectric constant.

(Drude Model)

Regarding the Drude Model for describing the absorption with the carrier doping, a frequency dispersion relation of the complex dielectric constant $\in(\omega)$ is expressed with the following equation:

$$\in(\omega) = \in_{r\infty}[1 - \omega_p^2/(\omega^2 + i\omega\tau)] = \in_1(\omega) - i\in_2(\omega) \quad (1)$$

where $\omega p$ denotes the plasma frequency, $\tau$ denotes the relaxation time, $\in_{r\infty}$ denotes the dielectric constant in the optical region (high frequency), $\in_1(\omega)$ denotes the real part of dielectric constant, and $\in_2(\omega)$ denotes the imaginary part of dielectric constant.

The plasma frequency $\omega_p$ and the relaxation time $\tau$ are determined with the carrier density N of free carrier, and are expressed with the following equation:

$$\tau(N) = \mu(N) \times m^*/q \quad (2)$$

$$\omega(N) = [Nq^2/(\tau_{r\infty}\in_0 m^*)]^{1/2} \quad (3)$$

where $\mu$ denotes the carrier mobility, $m^*$ denotes the effective mass, q denotes the elementary electric charge, N denotes the carrier density, and $\in_0$ denotes the dielectric constant in a vacuum.

The complex refractive index n can be calculated using the complex dielectric constant $\in(\omega) = \in_1(\omega) - i\in_2(\omega)$, with the following equation:

$$n = [\{\in_1 + (\in_1^2 + \in_2^2)^{1/2}\}/2]^{1/2} - i[\{-\in_1 + (\in_1^2 + \in_2^2)^{1/2}\}/2]^{1/2} = n_r - i\kappa \quad (4)$$

where $n_r$ denotes the real part of refractive index, and $\kappa$ denotes the imaginary part of refractive index (extinction coefficient).

(Carrier Density and Extinction Coefficient)

The extinction coefficient (imaginary part of the complex refractive index) $\kappa$ denotes an absorption loss due to materials. The intensity of electric field E in electromagnetic wave oscillated with the angular frequency $\omega$ and propagated in the direction z is expressed using the amplitude $E_0$, the complex refractive index n, and the light velocity c, with the following equation:

$$E = E_0 \exp[i\omega(t - n/c \cdot z)] = E_0 \exp[-\omega\kappa/c \cdot z] \cdot \exp[i\omega(t - n_r/c \cdot z)] \quad (5)$$

where $\exp[-\omega\kappa/c \cdot z]$ denotes the attenuation term.

Parameters of the Drude Model are dependent on the carrier density N. Accordingly, the extinction coefficient κ can be adjusted by varying the value of carrier density N.

Figure 34:
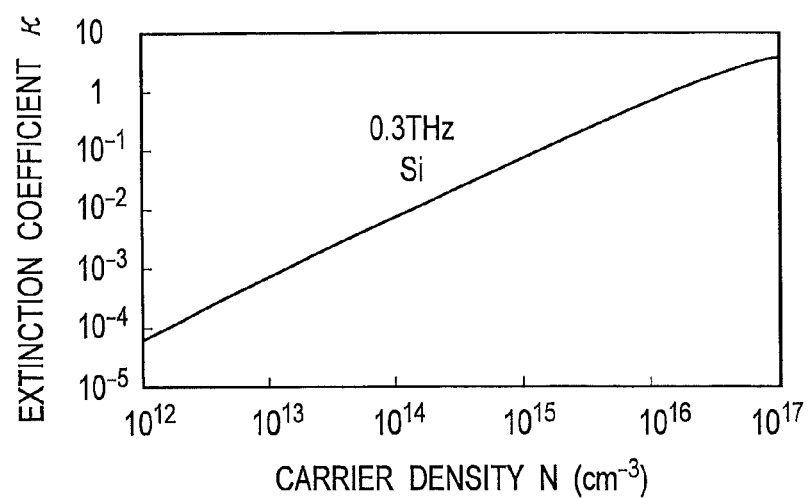
FIG. 34 shows a theoretical analysis result obtained using the Drude Model of the relationship between the carrier density N ($cm^{-3}$) and the extinction coefficient κ doped in order to obtain the absorption effect, in the PC slab absorber according to the first embodiment.

FIG. 34 shows a theoretical analysis result obtained using the Drude Model of the relationship between the carrier density N (cm$^{-3}$) and the extinction coefficient κ, in the PC slab absorber 1 according to the first embodiment. In FIG. 34, silicon is applied as the PC slab 12D, and the resonant frequency is set to 0.3 THz. As shown in FIG. 34, as the carrier density N is increased, the extinction coefficient κ will be increased. Accordingly, the absorption loss can be introduced to semiconducting materials by doping the impurities to the PC slab 12D.

In the PC slab absorber 1 according to the first embodiment, the Q factor $Q_a$ determined with the intrinsic material absorption is matched to the Q factor $Q_c$ determined with the structure of PC slab 12D, i.e., the THz wave capturing effect, the THz wave captured by the PC slab 12D interacts effectively with the free carrier absorption in the semiconductor (Si in this case), and thereby the absorptivity is maximized.

(Resonance in Resonant Frequency and Carrier Absorption Effect)

Figure 35A:
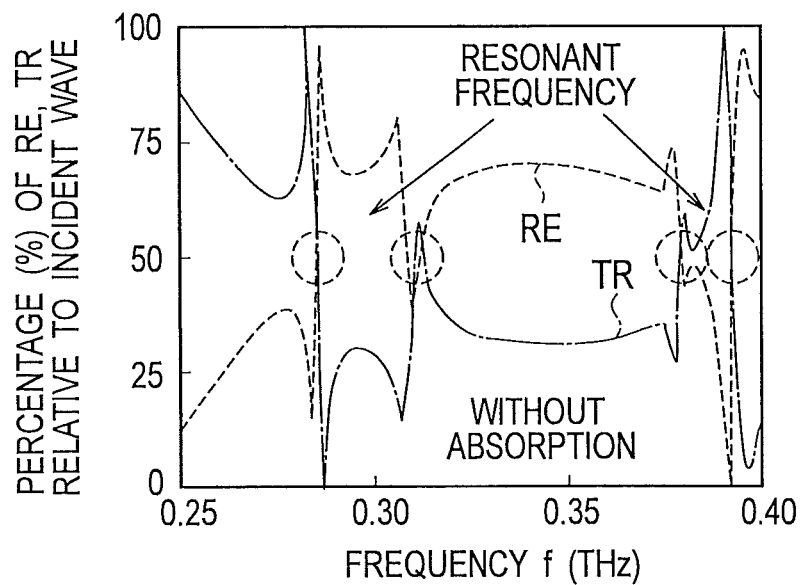
FIG. 35A shows a relationship between the rate (%) of the reflectance RE and the transmissivity TR to the incident wave, and the frequency f (THz), in the PC slab absorber according to the first embodiment (in the case where there is no carrier absorption effect).
Figure 35B:
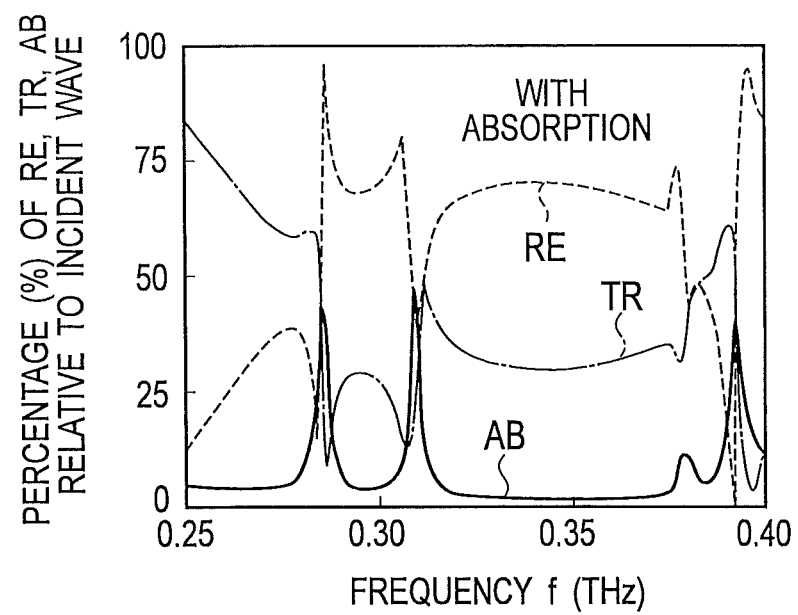
FIG. 35B shows the relationship between the rate (%) of the reflectance RE, the transmissivity TR and the absorptivity AB to the incident wave, and the frequency f (THz), in the PC slab absorber according to the first embodiment (in the case where impurities doping is subjected to PC slab materials, and carrier absorption effect is introduced thereto).

In the PC slab absorber 1 according to the first embodiment, FIG. 35A shows a relationship between the rate (%) of reflectance RE and the transmissivity TR, and the frequency f (THz) with respect to the incident wave in the case where there is no carrier absorption effect. FIG. 35B shows the relationship between the rate (%) of the reflectance RE, the transmissivity TR and the absorptivity AB to the incident wave, and the frequency f (THz), in the case where impurities doping is subjected to PC slab materials, and carrier absorption effect is introduced thereto.

If the PC slab materials are doped with impurities, and the carrier absorption effect is introduced thereto, a peak of the absorptivity appears in the resonant frequency, as shown with the curved line of the absorptivity AB in FIG. 35B.

(Capturing Effect and Carrier Absorption Effect)

Figure 36A:
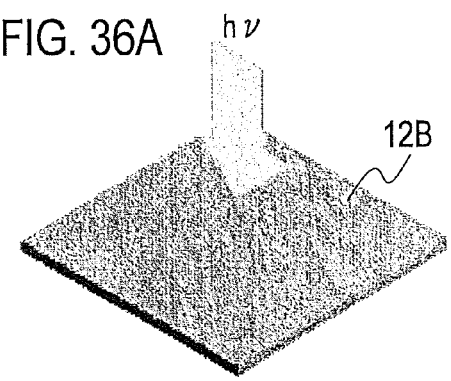
FIG. 36A is a schematic bird's-eye view illustrating the capturing effect and the carrier absorption effect in the PC slab absorber according to the first embodiment, and shows in particular a comparative example in which the THz wave is made incident on a bulk substrate (without PC structure).
Figure 36B:
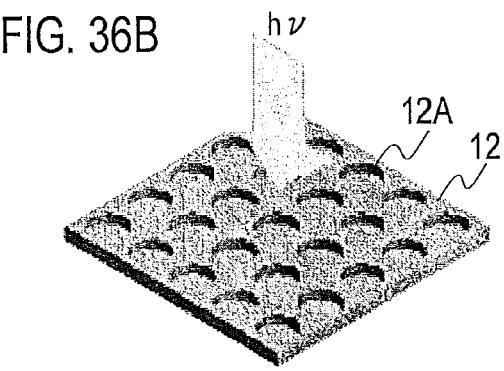
FIG. 36B is a schematic bird's-eye view illustrating the capturing effect and the carrier absorption effect in the PC slab absorber according to the first embodiment, and shows in particular an embodiment in which the THz wave is made incident on the PC slab 12.

FIG. 36A shows a comparative example in which the THz wave hv is made incident on the bulk substrate (without PC structure) 12B, and FIG. 36B shows an embodiment in which the THz wave by is made incident on the PC slab 12.

Figure 36C:
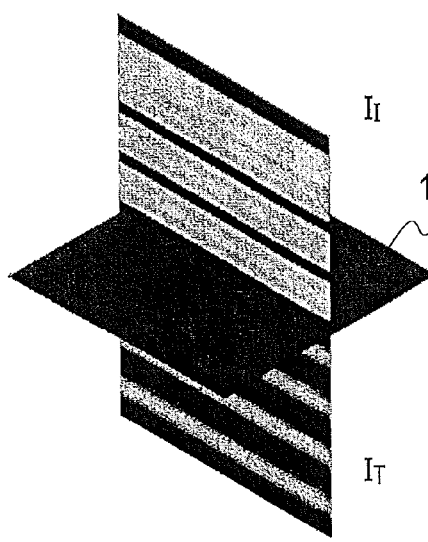
FIG. 36C is a schematic bird's-eye view illustrating the capturing effect and the carrier absorption effect in the PC slab absorber according to the first embodiment, and shows in particular the case where the THz wave is made incident (without any capturing effect: and without any carrier absorption effect) on a bulk substrate (without PC structure).

If the THz wave is made incident on the bulk substrate (without PC structure) 12B, the incident electromagnetic wave $I_I$ is transmitted through the bulk substrate (without PC structure) 12B, and then the transmitted electromagnetic wave $I_T$ is observed, as shown in FIG. 36C. In this case, there is no capturing effect and no carrier absorption effect.

Figure 36D:
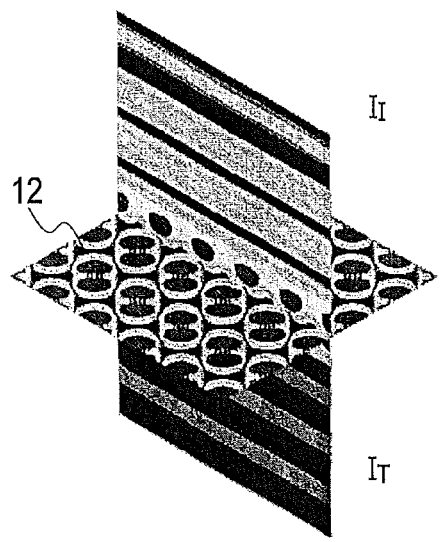
FIG. 36D is a schematic bird's-eye view illustrating the capturing effect and the carrier absorption effect in the PC slab absorber according to the first embodiment, and shows in particular the case where the THz wave is made incident (with the capturing effect: and without any carrier absorption effect) on the PC slab.

If the THz wave is made incident on the PC slab 12, the incident electromagnetic wave $I_I$ is captured by the PC slab 12, but the transmitted electromagnetic wave $I_T$ is observed since the carrier absorption effect does not exist, as shown in FIG. 36D.

Figure 36E:
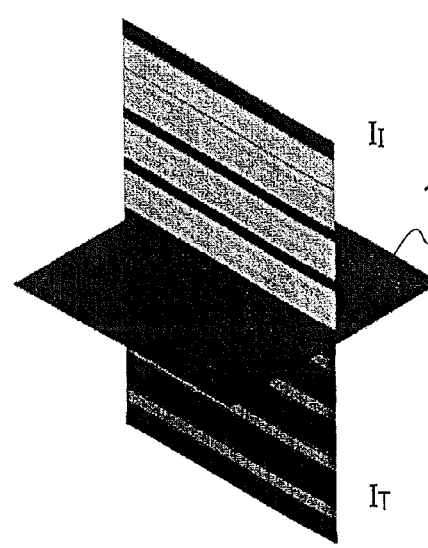
FIG. 36E is a schematic bird's-eye view illustrating the capturing effect and the carrier absorption effect in the PC slab absorber according to the first embodiment, and shows in particular the case where the THz wave is made incident (without any capturing effect: and with the carrier absorption effect) on a bulk substrate (without PC structure) to which the impurities doping is subjected, and the carrier absorption effect is introduced.

If the doping is made with the impurities, and the THz wave is made incident on the bulk substrate (without PC structure) to which the carrier absorption effect is introduced, the transmitted electromagnetic wave $I_T$ is observed since the carrier absorption effect of the incident electromagnetic wave $I_I$ exists, but the capturing effect does not exist, as shown in FIG. 36E.

Figure 36F:
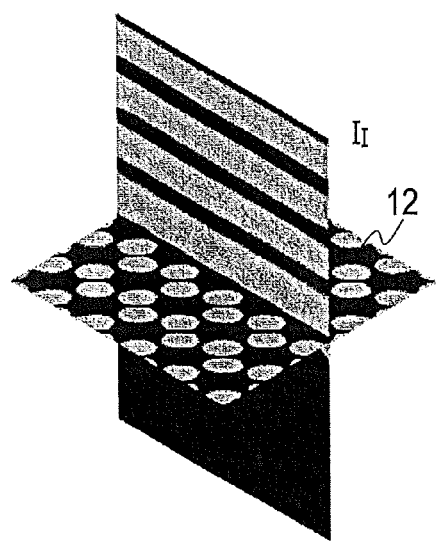
FIG. 36F is a schematic bird's-eye view illustrating the capturing effect and the carrier absorption effect in the PC slab absorber according to the first embodiment, and shows in particular the case where the THz wave is made incident (with the capturing effect: and with the carrier absorption effect) on the PC slab to which the impurities doping is subjected, and the carrier absorption effect is introduced.

If the doping is made with the impurities, and the THz wave is made incident on the PC slab to which the carrier absorption effect is introduced, the transmitted electromagnetic wave $I_T$ is not observed since the incident electromagnetic wave $I_I$ is captured by the PC slab 12 and the carrier absorption effect also exists, as shown in FIG. 36F. Moreover, no reflected electromagnetic wave $I_R$ is observed.

(Optimal Absorption Effect)

Figure 37A:
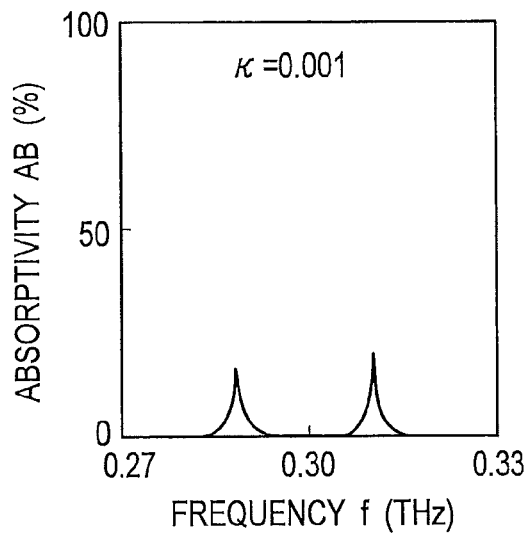
FIG. 37A is an explanatory diagram for obtaining the optimal absorption effect, and shows a relationship between the absorptivity AB (%) and the frequency f (THz) in the case of the extinction coefficient κ=0.001, in the PC slab absorber according to the first embodiment.
Figure 37B:
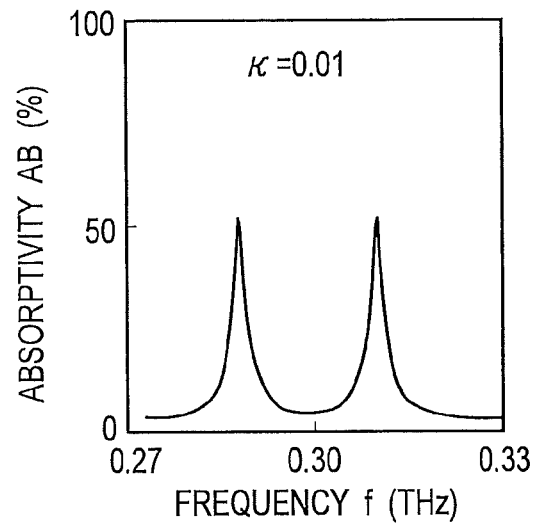
FIG. 37B is an explanatory diagram for obtaining the optimal absorption effect, and shows the relationship between the absorptivity AB (%) and the frequency f (THz) in the case of the extinction coefficient κ=0.01, in the PC slab absorber according to the first embodiment.
Figure 37C:
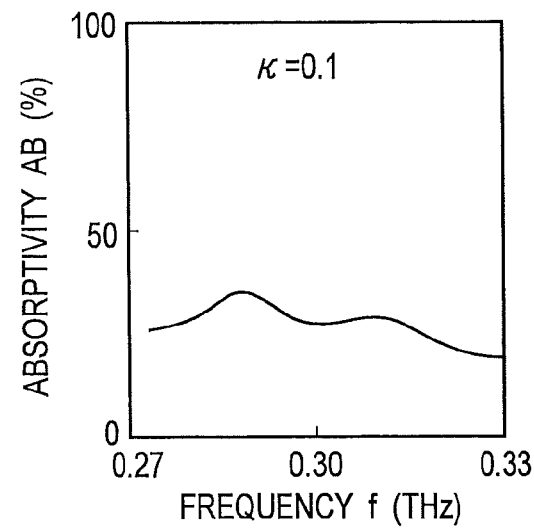
FIG. 37C is an explanatory diagram for obtaining the optimal absorption effect, and shows the relationship between the absorptivity AB (%) and the frequency f (THz) in the case of the extinction coefficient κ=0.1, in the PC slab absorber according to the first embodiment.

In explanatory diagrams for explaining obtaining of the optimal absorption effect, in the PC slab absorber according to the first embodiment, FIG. 37A shows a relationship between the absorptivity AB and the frequency f (THz) in the case of the extinction coefficient κ=0.001(%), FIG. 37B shows a relationship between the absorptivity AB and the frequency f (THz) in the case of the extinction coefficient κ=0.01(%), and FIG. 37C shows a relationship between the absorptivity AB and the frequency f (THz) in the case of the extinction coefficient κ=0.1(%).

In the case of the extinction coefficient κ=0.001, the number of free carriers is relatively small, since the carrier density N of the PC slab 12 is relatively low. Accordingly, a peak value of the absorptivity AB (%) is relatively small.

On the other hand, in the case of the extinction coefficient κ=0.01, since the carrier density N of the PC slab 12 reaches to an appropriate value, the number of free carriers becomes a proper value. Accordingly, the peak value of the absorptivity AB (%) becomes relatively high.

Furthermore, in the case of the extinction coefficient κ=0.1, the number of the free carriers is increased too much relatively, and the PC slab 12 becomes metallic since the carrier density N of the PC slab 12 becomes relatively high. Accordingly, the reflected component increases, and the peak value of the absorptivity AB (%) is relatively reduced as being broader.

In the case where the value of the extinction coefficient κ is varied by varying the carrier density N of the PC slab 12, an optimum value is included in the peak value of the absorptivity AB (%).

Figure 38:
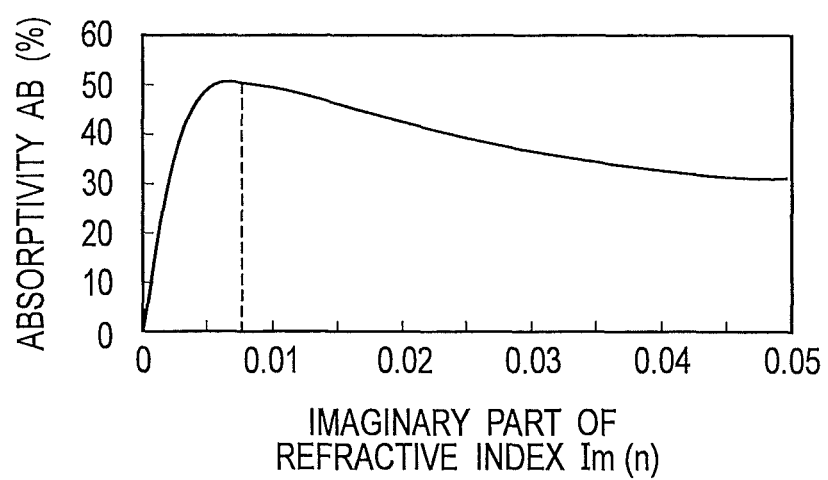
FIG. 38 shows a theoretical analysis result of a relationship between the absorptivity AB (%) and the imaginary part of refractive index (extinction coefficient κ), in the PC slab absorber according to the first embodiment.

FIG. 38 shows a theoretical analysis result of a relationship between the absorptivity AB (%) and the imaginary part of refractive index (extinction coefficient κ), in the PC slab absorber 1 according to the first embodiment. As shown in FIG. 38, in order to obtain the peak value of the absorptivity AB (%), an optimum value included in the imaginary part of refractive index (extinction coefficient κ), and the maximal absorption rate of approximately 50% in the single resonant point is obtained in the extinction coefficient κ near in approximately 0.008.

(Method of Achieving High Absorptivity and Broader Bandwidth)

Figure 39A:
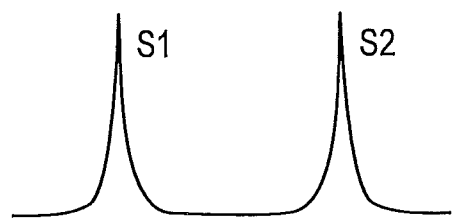
FIG. 39A is an explanatory diagram of a method of achieving high absorptivity and broader bandwidth, and shows in particular a schematic diagram of an absorption spectrum of the PC slab providing the lattice points for forming resonant-state with vertically symmetric through-holes, in the PC slab absorber according to the first embodiment.

FIG. 39A schematically shows absorption spectra S1, S2 of the PC slab which provides the lattice points for forming resonant-state with vertically symmetric through-holes, in an explanatory diagram of a method of achieving high absorptivity and broader bandwidth, in the PC slab absorber according to the first embodiment.

Figure 39B:
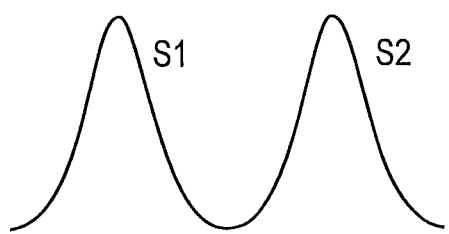
FIG. 39B is an explanatory diagram of a method of achieving high absorptivity and broader bandwidth, and shows in particular a schematic diagram of an absorption spectrum of the PC slab providing the lattice points for forming resonant-state with vertically asymmetric through-holes, and decreasing the Q factor of resonance of the PC by extending the diameter of the hole, in the PC slab absorber according to the first embodiment.

On the other hand, FIG. 39B schematically shows absorption spectra S1, S2 of the PC slab which provided the lattice points for forming resonant-state with vertically asymmetric non-through holes, and the Q factor for resonance of photonic crystal (Q factor $Q_c$ determined with the THz wave capturing effect) is decreased by increasing the diameter D of the holes.

Figure 39C:
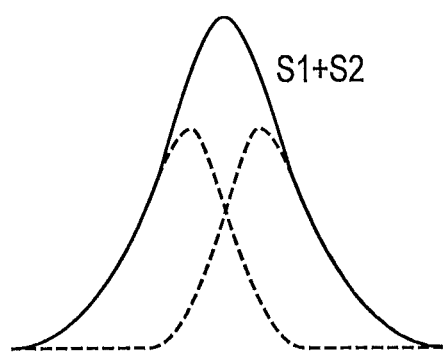
FIG. 39C is an explanatory diagram of the method of achieving high absorptivity and broader bandwidth, in the PC slab absorber according to the first embodiment, and shows in particular a schematic diagram of an absorption spectrum of the PC slab in the case of moving the adjacent resonant points close to each other by adjusting comprehensively the thickness d of the PC slab, the period of the lattice point for forming resonant-state (lattice constant a), the hole diameter D, and the hole depth H.

Furthermore, as schematically shown in FIG. 39C, the absorption spectrum of the PC slab 12 is expressed with the absorption spectra S1+S2 on which the absorption spectra S1, S2 are superimposed, wherein the adjacent resonant points are close to each other by comprehensively adjusting the thickness TH of the PC slab 12, the period (lattice constant a) of the lattice point for forming resonant-state 12A, the hole diameter D, and the hole depth d.

Furthermore, the carrier density N at the time of being doped to the PC slab 12 is optimized, and the imaginary part of refractive index (extinction coefficient κ) is optimized, thereby obtaining the PC slab absorber having the maximal absorption rate of approximately 96%, the 90% absorption bandwidth of approximately 19 GHz, and the half-power bandwidth of 0.1 THz, as shown in FIG. 31.

More specifically, in the PC slab absorber 1 according to the first embodiment, the asymmetric structure is introduced to the lattice point for forming resonant-state 12A, the adjacent resonant points are close to or matched with each other, the carrier density N at the time of being doped to the PC slab 12 is optimized, and the imaginary part of refractive index (extinction coefficient κ) is optimized, and thereby a high absorptivity exceeding 50% can be obtained in the broader bandwidth, as shown in FIGS. 27 and 31.

(Developing Method to Other Frequency Bands: Free Carrier Effect)

In the PC slab absorber 1 according to the first embodiment, FIG. 40 shows a theoretical analysis result of a relationship between the extinction coefficient κ and the frequency f (THz) using the carrier density N as a parameter, in a diagram illustrating a developing method to other frequency bands.

As the frequency f (THz) varies, the value of the extinction coefficient κ obtained with the same carrier density N ($cm^{-3}$) also varies. Accordingly, in order to obtain the same imaginary part of refractive index (extinction coefficient $κ_I$) also in other frequencies, it is necessary to change the carrier density N, as shown in FIG. 40.

(Developing Method to Other Frequency Bands: Capturing Effect)

In the PC slab absorber 1 according to the first embodiment, FIG. 41A shows a schematic planar pattern configuration of the lattice point for forming resonant-state 12A of the PC slab 12, and FIG. 41B shows a schematic cross-sectional structure taken in the line II-II of FIG. 41A. FIGS. 41A and 41B show an example of a non-through hole formed in the lattice point for forming resonant-state 12A. In the structural example shown in FIGS. 41A and 41B, the diameter D of the lattice point for forming resonant-state 12A is equal to 0.78a, the thickness TH of the PC slab 12 is equal to 0.4a, and the depth d of the lattice point for forming resonant-state 12A is equal to 0.34a.

As shown in FIGS. 41A and 41B, if the ratio of the diameter D of the lattice point for forming resonant-state 12A, the thickness TH of the PC slab 12, the depth d of the lattice point for forming resonant-state 12A is set up with respect to the lattice constant a, the similar characteristics can be obtained also in other frequency bands since the ability of the scaling law can be applied thereto.

Figure 42:
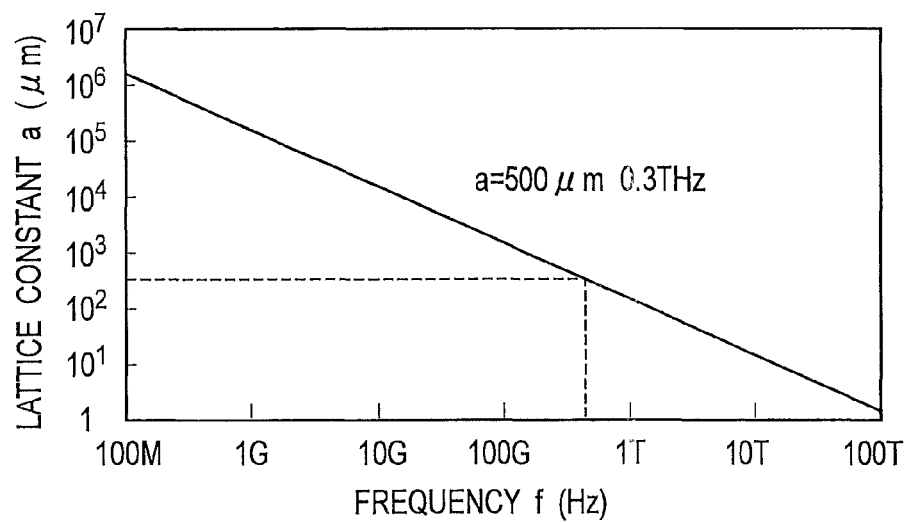
FIG. 42 is a diagram illustrating the developing method to other frequency bands, in the PC slab absorber according to the first embodiment, and shows in particular a theoretical analysis result of a relationship between the lattice constant a (μm) and the frequency f (THz).

FIG. 42 is a diagram illustrating the developing method to other frequency bands, in the PC slab absorber 1 according to the first embodiment, and shows in particular a theoretical analysis result of a relationship between the lattice constant a (μm) and the frequency f (THz). In FIG. 42, the frequency f=0.3 (THz) is obtained in the lattice constant of a=500 μm as a numerical example.

(THz Time-Domain Spectroscopy (TDS))

As shown in FIG. 43, an experimental configuration for the PC slab absorber 1 according to the first embodiment, which is a THz Time-Domain Spectroscopy (THz TDS) includes: a pulse laser 20; a beam splitter 26; a plurality of mirrors 21; a Terahertz (THz) pulse emitter 22; a plurality of parabolic reflectors 23; a delay stage 28; and a detector 24.

A laser beam from the pulse laser 20 is divided into a detected pulse $P_D$ and an excited pulse $P_E$ in the beam splitter 26.

The excited pulse $P_E$ excites the THz pulse emitter 22 by the mirror 21.

The THz wave emitted from the THz pulse emitter 22 is reflected by the plurality of the parabolic reflectors 23, and then is made incident on the PC slab absorber 1.

The THz wave transmitted in the PC slab absorber 1 is reflected by the plurality of the parabolic reflectors 23, and then reaches the detector 24.

The detected pulse $P_D$ is input into the delay stage 28.

The delayed detected pulse $P_D$ is reflected by the plurality of the mirrors 21, and then reaches the detector 24.

The timing with which the detected pulse $P_D$ and the excited pulse $P_E$ encounter becomes gradually later, associated with the moving of the delay stage 28. The detector 24 detects an electric current flowing according to the intensity at the time when the detected pulse $P_D$ and the excited pulse $P_E$ encounter with each other, thereby obtaining a time waveform of transmitted wave.

The obtained time waveform is subjected to the Fourier analysis, and thereby the transmission spectrum is obtained.

(High-Frequency Circuit)

The PC slab absorber 1 according to the first embodiment is applicable to a high-frequency circuit 2.

Figure 44A:
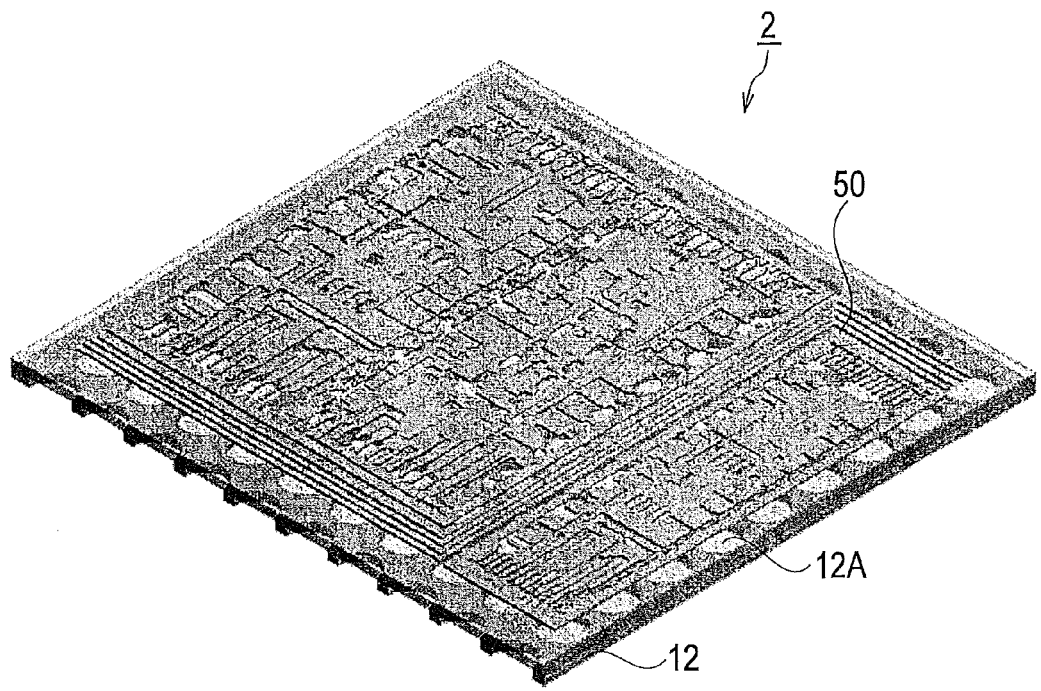
FIG. 44A shows a schematic bird's-eye view configuration diagram of a high-frequency circuit to which the PC slab absorber according to the first embodiment is applied.
Figure 44B:
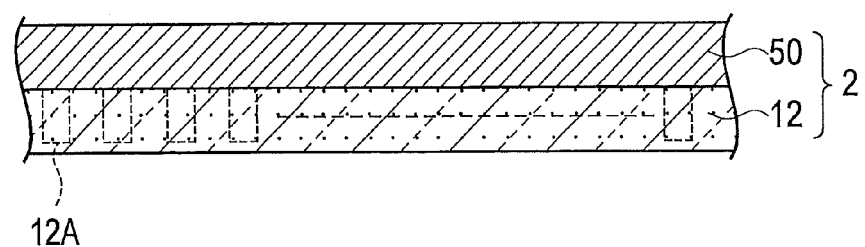
FIG. 44B shows a schematic cross-sectional structure diagram of layered structure in which the high-frequency circuit is disposed on the PC slab absorber according to the first embodiment.
Figure 45A:
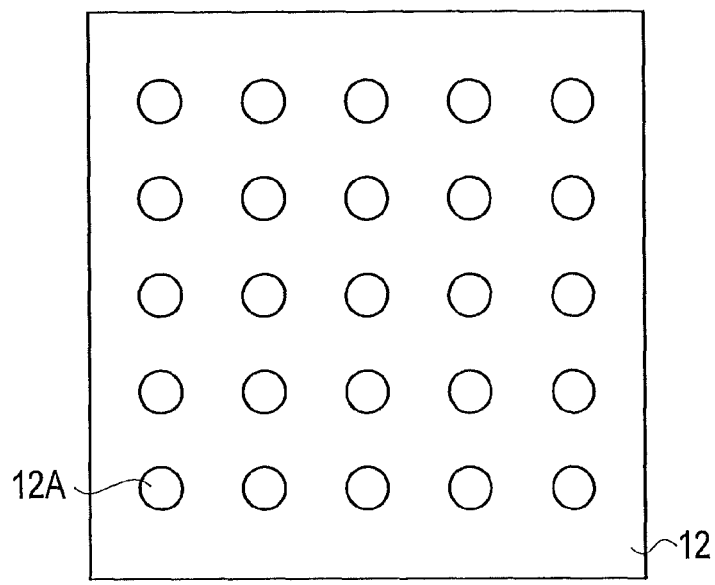
FIG. 45A shows periodic structure of the lattice point for forming resonant-state, in the 2D-PC slab applicable to the PC slab absorber according to the first embodiment, and shows in particular an example of arrangement of a square lattice.
Figure 45B:
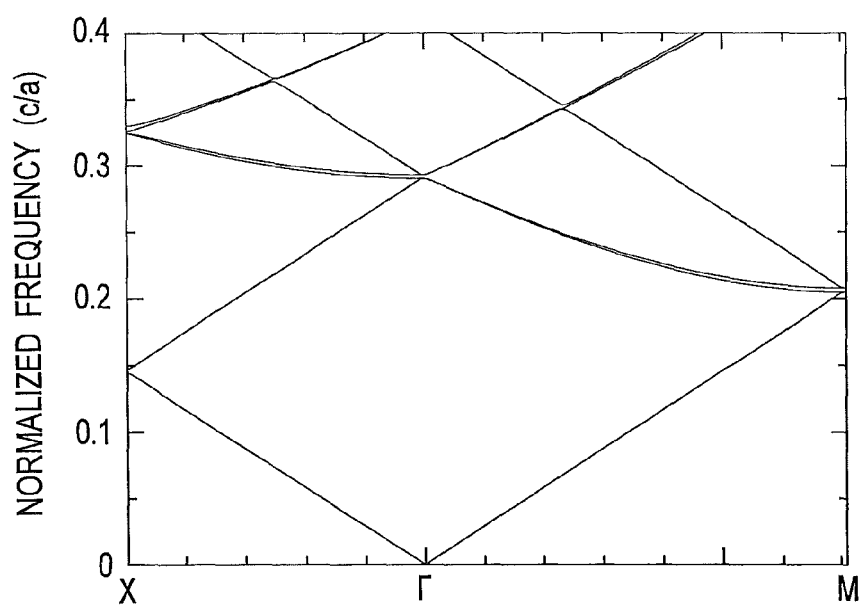
FIG. 45B shows a band structure diagram of the 2D-PC slab corresponding to FIG. 45A.
Figure 46A:
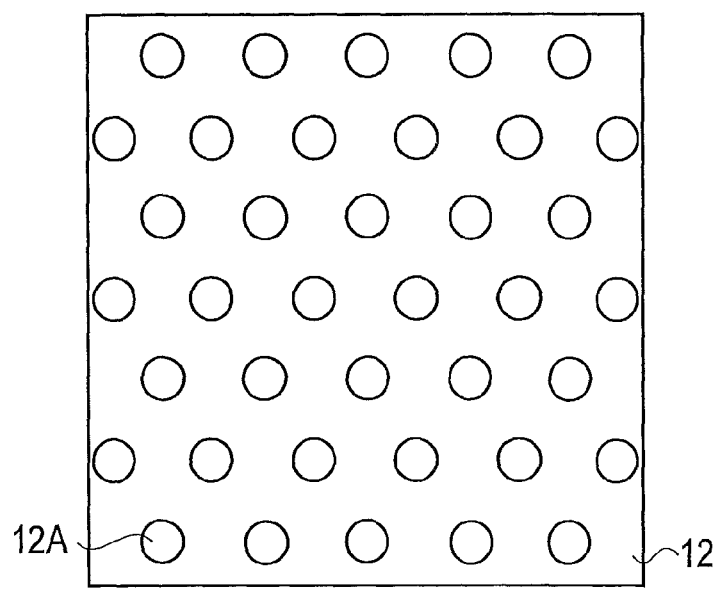
FIG. 46A shows periodic structure of the lattice point for forming resonant-state, in the 2D-PC slab applicable to the PC slab absorber according to the first embodiment, and shows in particular an example of arrangement of a triangular lattice.
Figure 46B:
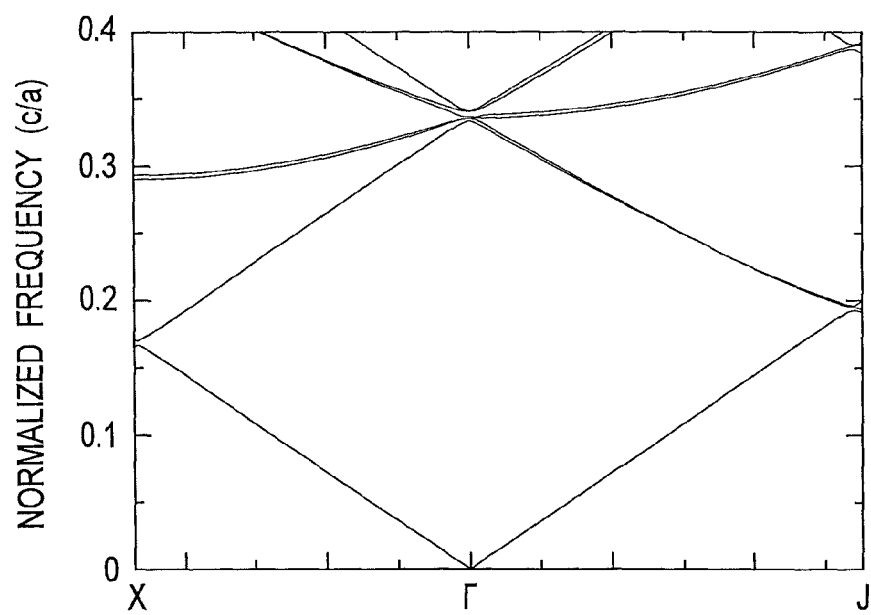
FIG. 46B shows a band structure diagram of the 2D-PC slab corresponding to FIG. 46A.
Figure 47A:
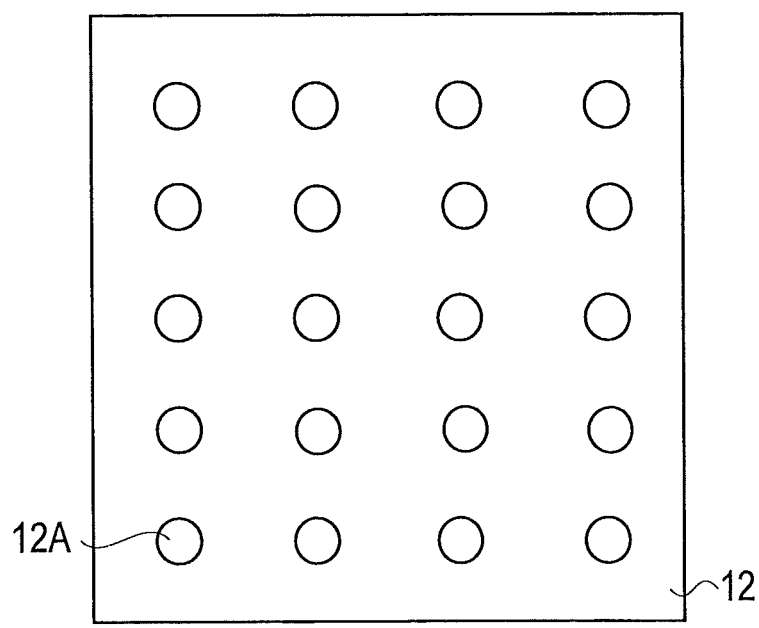
FIG. 47A shows periodic structure of the lattice point for forming resonant-state, in the 2D-PC slab applicable to the PC slab absorber according to the first embodiment, and shows in particular an example of arrangement of a rectangular lattice.
Figure 47B:
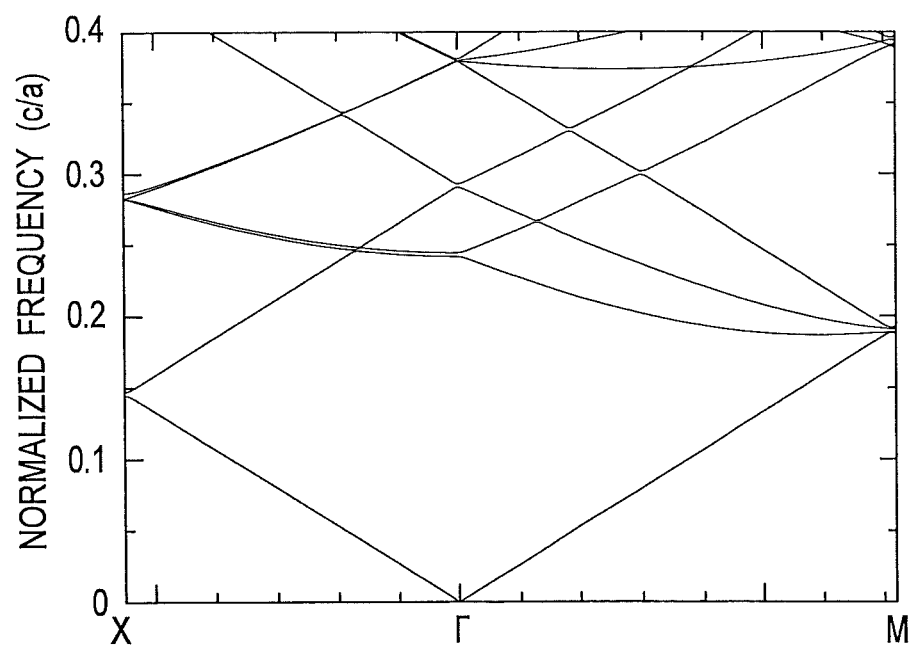
FIG. 47B shows a band structure diagram of the 2D-PC slab corresponding to FIG. 47A.
Figure 48A:
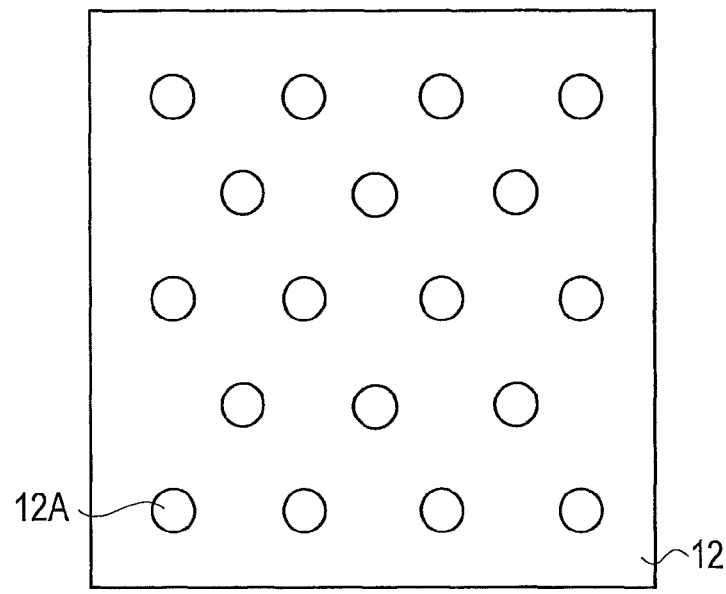
FIG. 48A shows periodic structure of the lattice point for forming resonant-state, in the 2D-PC slab applicable to the PC slab absorber according to the first embodiment, and shows in particular an example of arrangement of a rhombic lattice.
Figure 48B:
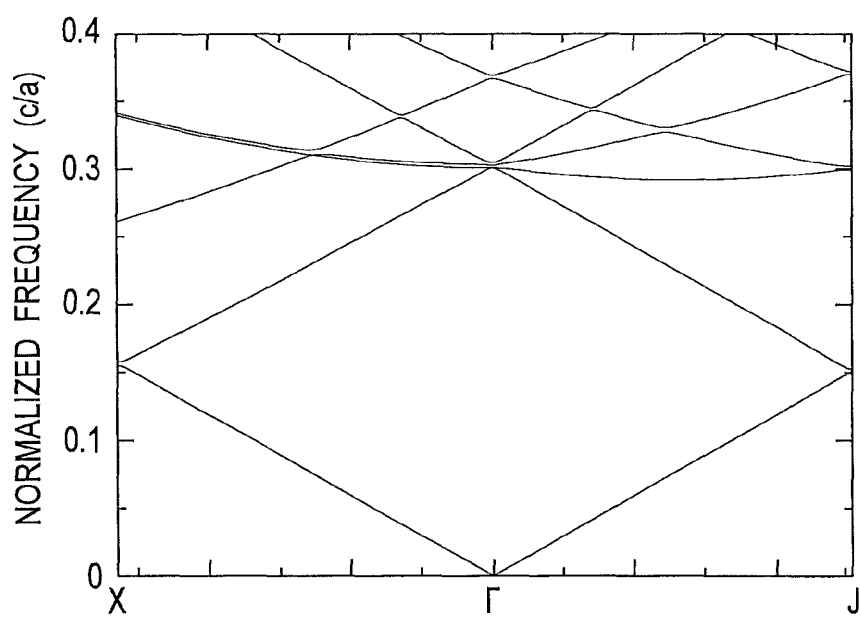
FIG. 48B shows a band structure diagram of the 2D-PC slab corresponding to FIG. 48A.

FIG. 44A shows a schematic bird's-eye view configuration of the high-frequency circuit 2 to which the PC slab absorber 1 according to the first embodiment is applied, and FIG. 44B shows a schematic cross-sectional structure of the layered structure arranging metal wiring 50 on the PC slab absorber 1 according to the first embodiment.

An undesired mode (radiation) which occurs in the circuit can be reduced by using the PC slab absorber 1 according to the first embodiment for the substrate in the high-frequency circuit 2.

(Electronic Component)

The PC slab absorber 1 according to the first embodiment is applicable to various electronic components. The PC slab absorber 1 according to the first embodiment is applicable to thin and flat type THz wave electromagnetic wave absorbers, THz-wave filters which can be flexibly designed, THz-wave modulators, THz-wave delay lines, input/output interfaces to the THz-wave IC, highly sensitive THz-wave detectors, etc., for example.

(Periodic Structure and Band Structure of Lattice Point for Forming Resonant-State)

In a periodic structure of the lattice point for forming resonant-state 12A of the 2D-PC slab 12 applicable to the PC slab absorber 1 according to the first embodiment, arrangement examples of a square lattice, a triangular lattice, a rectangular lattice, and a rhombic lattice (face-centered rectangle lattice) are respectively illustrated schematically as shown in FIGS. 45A, 46A, 47A and 48A, and band structures of 2D-PC slab 12 corresponding thereto are respectively illustrated as shown in FIGS. 45B, 46B, 47B and 48B.

The lattice point for forming resonant-state 12A may be arranged in any one selected from the group consisting of a square lattice, a rectangular lattice, a face-centered rectangle lattice, and a triangular lattice.

Moreover, the lattice point for forming resonant-state 12A is arranged in a square lattice or a rectangular lattice, and can resonate the electromagnetic wave in a Γ point, an X point, or an M point in the photonic band structure of the photonic crystal layer in the PC slab plane.

Moreover, the lattice point for forming resonant-state 12A is arranged in a face-centered rectangle lattice or a triangular lattice, and can resonate the electromagnetic wave in a Γ point, an X point, or an J point in the photonic band structure of the photonic crystal layer in the PC slab plane.

Moreover, the lattice point for forming resonant-state 12A may be provided with any one of the polygonal shape, circular shape, oval shape, or ellipse shape.

According to the PC slab absorber according to the first embodiment, there can be provided the thin and flat type electromagnetic wave absorber having the easy processability can be provided by using the electromagnetic wave capturing effect of the photonic crystal.

According to the PC slab absorber according to the first embodiment, the Q factor of the resonant mode is decreased and the resonant frequencies are close to or matched with each other, thereby providing the electromagnetic wave absorber having the absorptivity equal to or greater than 90% in the broader bandwidth.

The PC slab absorber according to the first embodiment can support to electromagnetic wave ranging from approximately 100 MHz to approximately 100 THz, by using a scaling law of the photonic crystal, and doping technologies of semiconductor.

According to the first embodiment, there can be provided the thin and flat type PC slab absorber having high capturing and absorption effects and the easy processability, and the high-frequency circuit, the electronic component to which such a PC slab absorber is applied.

[Second Embodiment]

Figure 49:
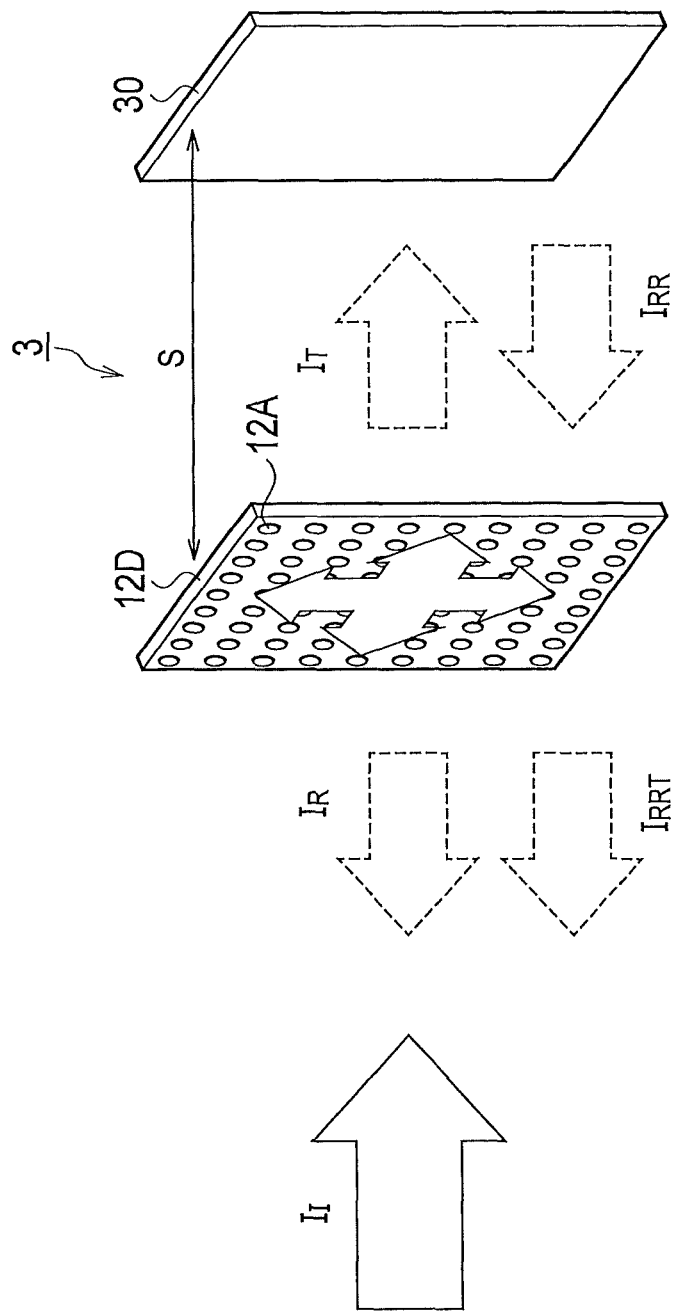
FIG. 49 shows a PC slab absorber according to a second embodiment, and shows in particular a schematic diagram illustrating the capturing and absorption effects in the PC slab absorber in which a reflecting mirror is introduced to a back side of the 2D-PC slab.

FIG. 49 shows a PC slab absorber according to a second embodiment, and shows in particular a schematic diagram illustrating the capturing and absorption effects in the PC slab absorber 3 in which a reflecting mirror 30 is introduced to a back side of the 2D-PC slab 12D.

As shown in FIG. 49, also in the PC slab absorber 3 according to the second embodiment, the incident electromagnetic wave $I_I$ is resonated and captured in the plane of the 2D-PC slab 12D, in the same manner as the first embodiment. Moreover, the incident electromagnetic wave $I_I$ is absorbed with materials of the 2D-PC slab 12D. More specifically, the PC slab absorber 3 according to the second embodiment also can increase the absorptive ability due to the synergistic effect between the capturing and the absorption (capturing+absorption).

Furthermore, the PC slab absorber 3 according to the second embodiment reflects the transmitted electromagnetic wave $I_T$ by introducing the reflecting mirror 30 onto the back side of the 2D-PC slab 12D, as shown in FIG. 49. This reflected electromagnetic wave $I_{RR}$ is made incident on the back side surface of the 2D-PC slab 12D, and is absorbed due to the synergistic effect of capturing and absorption (capturing+absorption). As a result, the intensity of the reflected electromagnetic wave $I_{RRT}$ becomes equal to or less than approximately 0.014% of the intensity of the incident electromagnetic wave $I_I$, for example. More specifically, the PC slab absorber 3 according to the second embodiment can further increase the absorptive ability due to the synergistic effect between the capturing, the absorption, the capturing, and the absorption (capturing+absorption+capturing+absorption).

Figure 50:
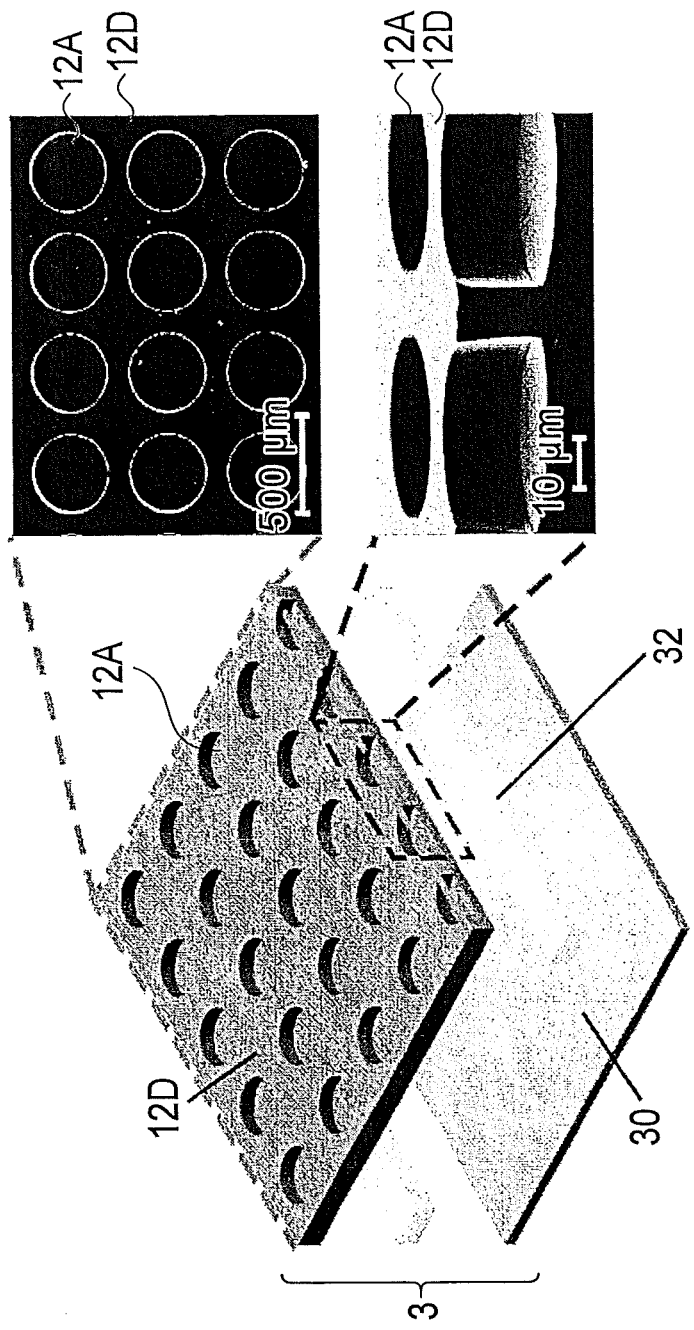
FIG. 50 shows the PC slab absorber according to the second embodiment, and shows in particular a schematic bird's-eye view configuration, a surface SEM example, and an edge face SEM example of the PC slab absorber which the reflecting mirror is introduced to the back side of the 2D-PC slab.

In the PC slab absorber according to the second embodiment, FIG. 50 shows a schematic bird's-eye view configuration, a surface SEM example, and an edge face SEM example of the PC slab absorber 3 which introduces the reflecting mirror 30 onto the back side of the 2D-PC slab 12D via a spacer 32. The surface SEM example and the edge face SEM example shown in FIG. 50 are the same as those of the PC slab absorber 1 according to the first embodiment shown in FIG. 30. Moreover, the 2D-PC slab 12D in the PC slab absorber 3 according to the second embodiment can also adapt the similar configuration applied to the 2D-PC slab 12D in the PC slab absorber 1 according to the first embodiment. Accordingly, the duplicated description is omitted.

As shown in FIGS. 49 and 50, the PC slab absorber 3 according to the second embodiment includes: a 2D-PC slab 12D composed of semiconducting materials; a lattice point 12A periodically arranged in the 2D-PC slab 12D, the lattice point for forming resonant-state 12A which can capture an electromagnetic wave $I_I$ incident from an outside by resonating an electromagnetic wave in a band edge of a photonic band structure of the 2D-PC slab 12D in the plane of the 2D-PC slab 12D; and a reflecting mirror 30 arranged at the back side surface of the 2D-PC slab 12D, the reflecting mirror 30 reflecting an electromagnetic wave $I_T$ transmitted in the 2D-PC slab 12D. In this case, the 2D-PC slab 12D is doped with impurities and can absorb the captured electromagnetic wave in the band edge resonant frequency. Moreover, the reflected electromagnetic wave $I_{RR}$ can be made incident on the back side surface of the 2D-PC slab 12D.

The reflecting mirror 30 can be formed of anyone of a metal plate, a substrate on which a metallic thin film is formed, a dielectric multilayer, or a photonic crystal.

Moreover, the 2D-PC slab 12D and the reflecting mirror 30 are arranged so as to be distanced from each other.

The optimum value SA is included in the separation distance S between the 2D-PC slab 12D and the reflecting mirror 30, and it is preferable that the value SA is equal to wavelength/4 plus or minus wavelength/8 with respect to the wavelength of the electromagnetic wave, for example.

In the PC slab absorber 3 according to the second embodiment, as a result of introducing the reflecting mirror 30 onto the back side of the 2D-PC slab 12D, a third Fabry-Perot resonant mode originated from the reflecting mirror and the photonic crystal is introduced, in addition to the in-plane resonant mode originated from the photonic crystal (even mode and odd mode), thereby improving the absorptivity and the absorption bandwidth. Here, an aspect that the absorption spectrum varies is explained.

A spectrum intensity distribution of an initial state is illustrated as shown in FIG. 51A. In the initial state, there are resonance spectrum SP1 in the even mode and resonance spectrum SP2 in the odd mode.

Next, the spectrum intensity distribution in the state where the hole diameter dimension of the lattice point for forming resonant-state 12A is optimized is illustrated as shown in FIG. 51B. The broader bandwidth of the resonance spectrum SP1 in the even mode and the resonance spectrum SP2 in the odd mode can be achieved by optimizing the hole diameter dimension of the lattice point for forming resonant-state 12A.

Furthermore, a spectrum intensity distribution in the state where the thickness of the 2D-PC slab 12D is optimized is illustrated as shown in FIG. 51C. By optimizing the thickness of the 2D-PC slab 12D, the resonant points in the even mode and the odd mode are close to each other to superimpose the resonance spectrum SP1 in the even mode and the resonance spectrum SP2 in the odd mode on each other, thereby achieving broader bandwidth.

Furthermore, a spectrum intensity distribution as a result of introducing the reflecting mirror 30 onto the back side of the 2D-PC slab 12D is illustrated as shown in FIG. 51D. As a result of introducing the reflecting mirror 30 onto the back side of the 2D-PC slab 12D, a third Fabry-Perot resonant mode originated from the reflecting mirror 30 and the photonic crystal is introduced, in addition to the in-plane resonant mode originated from the photonic crystal (even mode and odd mode). The resonance spectrum SP3 in the third Fabry-Perot resonant mode is applied, in addition to the resonance spectrum SP1 in the even mode and the resonance spectrum SP2 in the odd mode, thereby achieving further broader bandwidth.

In the PC slab absorber 3 according to the second embodiment, the performance (highest absorptivity, absorption bandwidth) of the absorber can be improved by adjusting the separation distance S between the reflecting mirror 30 and the 2D-PC slab 12D.

In the PC slab absorber 3 according to the second embodiment, the higher reflectance is preferable for the reflecting mirror 30.

As the reflecting mirror 30, there are applicable metals, e.g., gold (Au), silver (Ag), and an aluminum (Al), and substrates, e.g. glasses, semiconductors, plastics, and polymer, etc., on which their metallic thin films are formed, or dielectric multi-layers composed of $SiO_2$, SiN, SiON, SiC, MgO, $ZrO_2$, $TiO_2$, etc. Furthermore, photonic crystals etc. designed to have a multi-layering configuration and have high reflectance are applicable as the reflecting mirror 30.
(Adjusting Distance Between Reflecting Mirror and PC)

Figure 52:
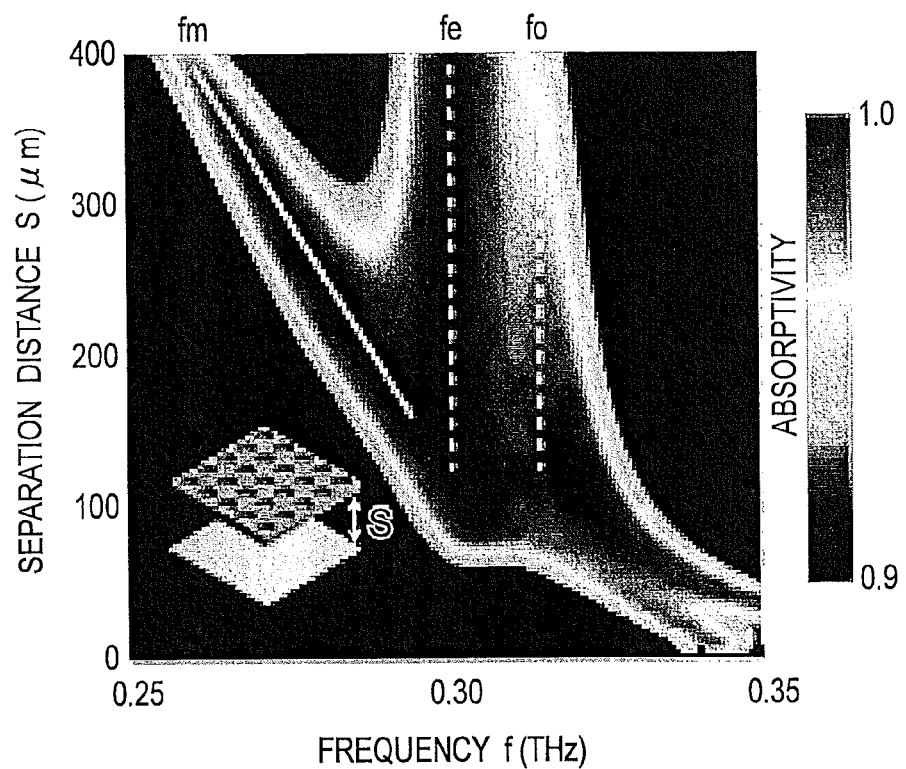
FIG. 52 shows a simulation result of the absorptivity in a relationship between the frequency f and the separation distance S between the reflecting mirror introduced into the back side of the 2D-PC slab and the PC, in the PC slab absorber according to the second embodiment (where fe: the even mode, fo: the odd mode, and fm: Fabry-Perot mode).

In the PC slab absorber 3 according to the second embodiment, FIG. 52 shows a simulation result (fe: an even mode, fo: odd mode, fm: Fabry-Perot mode) near the frequency f=0.3 THz of the absorptivity (wavelength λ=1 mm) in a relationship between the separation distance S between the 2D-PC slab 12D and the reflecting mirror 30, and the frequency f.

The optimum value SA is included in the separation distance S between the 2D-PC slab 12D and the reflecting mirror 30. If the separation distance S between the 2D-PC slab 12D and the reflecting mirror 30 becomes shorter, the mode of the PC will be disturbed. On the other hand, if the separation distance S is too large, it becomes impossible to contribute to improve the band or the maximal absorption rate, failing to synthesize with the mode originated from the PC. Accordingly, as a separation distance S, a size of approximately wavelength/4 plus or minus wavelength/8 is preferable for the wavelength of the electromagnetic wave. In FIG. 52, fe corresponds to the even mode originated from the PC, fo corresponds to the odd mode, and fm corresponds to the Fabry-Perot mode newly generated. Certainly, if the separation distance S equal to or greater than 100 µm, fe and fo is a constant without being affected by the reflecting mirror 30. On the other hand, fm varies according to the separation distance S.
(Result of Experiment 1: Spectrogram)

Figure 53A:
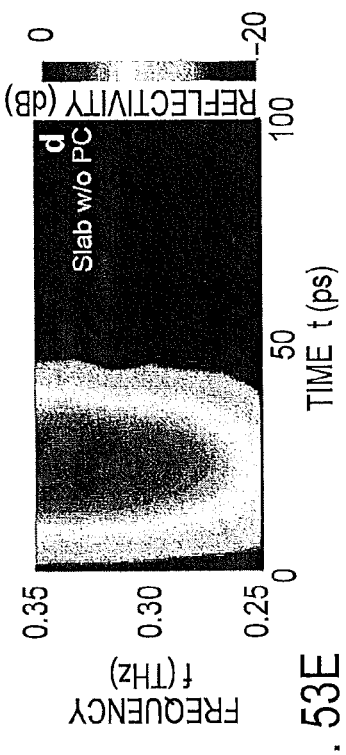
FIG. 53A shows a comparison of spectrograms of the THz TDS observing simultaneously between the capturing effect (time domain) and the band edge effect (frequency domain), in the PC slab absorber according to the second embodiment, and shows in particular an example of a high resistivity slab without the photonic crystal and without the absorption.
Figure 53B:
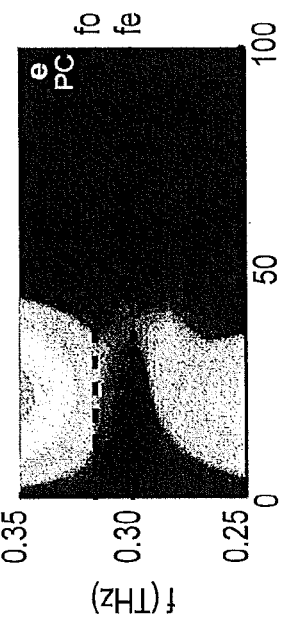
FIG. 53B shows a comparison of the spectrograms of the THz TDS observing simultaneously between the capturing effect (time domain) and the band edge effect (frequency domain), in the PC slab absorber according to the second embodiment, and shows in particular an example of a high resistivity slab with the photonic crystal but without the absorption.
Figure 53C:
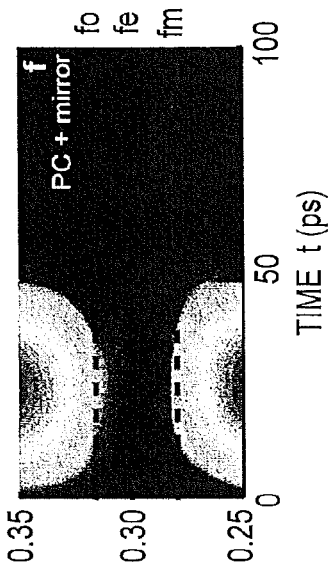
FIG. 53C shows a comparison of the spectrograms of the THz TDS observing simultaneously between the capturing effect (time domain) and the band edge effect (frequency domain), in the PC slab absorber according to the second embodiment, and shows in particular an example of a high resistivity slab with the photonic crystal and the reflecting mirror but without absorption.
Figure 53D:
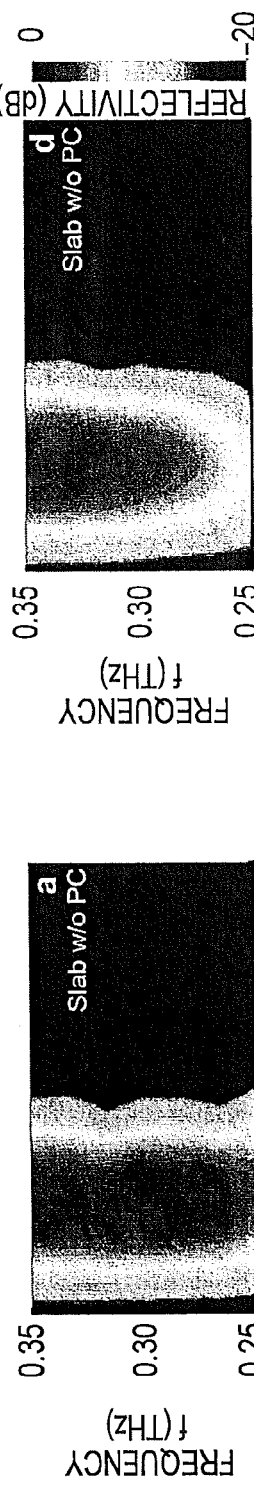
FIG. 53D shows a comparison of the spectrograms of the THz TDS observing simultaneously between the capturing effect (time domain) and the band edge effect (frequency domain), in the PC slab absorber according to the second embodiment, and shows in particular an example of a low resistance slab without the photonic crystal but with the absorption.
Figure 53E:
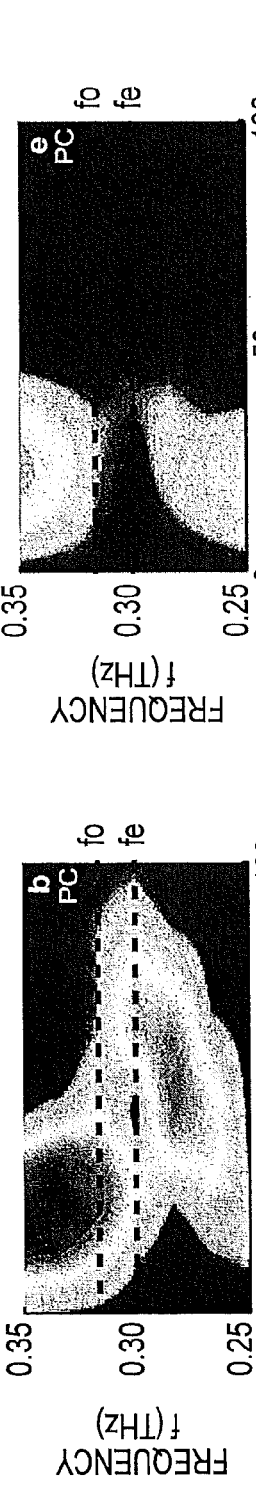
FIG. 53E shows a comparison of the spectrograms of the THz TDS observing simultaneously between the capturing effect (time domain) and the band edge effect (frequency domain), in the PC slab absorber according to the second embodiment, and shows in particular an example of a low resistance slab with the photonic crystal and with the absorption.
Figure 53F:
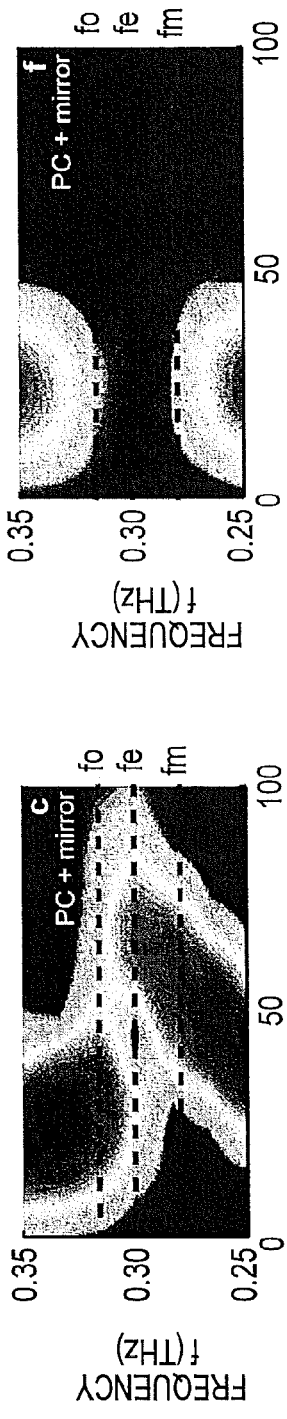
FIG. 53$f$ shows a comparison of the spectrograms of the THz TDS observing simultaneously between the capturing effect (time domain) and the band edge effect (frequency domain), in the PC slab absorber according to the second embodiment, and shows in particular an example of a low resistivity slab with the photonic crystal and the reflecting mirror and with the absorption.

FIG. 53A shows a comparison of spectrograms of the THz TDS observing simultaneously between the capturing effect (time domain) and the band edge effect (frequency domain), in the PC slab absorber according to the second embodiment, and shows in particular an example of a high resistivity slab without the PC and without the absorption. FIG. 53B shows in particular an example of a high resistivity slab with the PC and without the absorption. FIG. 53C shows in particular an example of a high resistivity slab with the PC slab and the reflecting mirror, and without the absorption. FIG. 53D shows in particular an example of a low resistance slab without the PC and with the absorption. FIG. 53E shows in particular an example of a low resistance slab with the PC and with the absorption. FIG. 53F shows in particular an example of a low resistance slab with the PC slab and the reflecting mirror, and with the absorption.

In the present embodiment, the period of the lattice point for forming resonant-state 12A of the 2D-PC slab 12D used for the experiment is 500 µm, the hole diameter is 390 µm, and the hole depth is 170 µm. The thickness of the 2D-PC slab 12 is 190 µm. Moreover, the separation distance S between the 2D-PC slab 12D and the reflecting mirror 30 is 220 µm. Moreover, the resistivity of Si substrate of the 2D-PC slab 12D in the case of having the absorption is approximately 6 Ωcm, and the carrier density is approximately $1.8 \times 10^{15}$ $cm^{-3}$. Moreover, the substrate resistivity of the 2D-PC slab 12D in the case of having no absorption is approximately 10000 Ωcm.

FIGS. 53A to 53F correspond to spectrograms which time developments of reflection property are plotted with regard to the frequency. In the case of no absorption in the 2D-PC slab 12D, an aspect that components delayed in time are captured with the capturing effect of the PC is observed, as shown in FIGS. 53A, 53B and 53C. As shown in FIG. 53C, the captured components of the PC are certainly increased by introducing the reflecting mirror 30.

Furthermore, if the 2D-PC slab 12D has the absorption, it is observed that the reflected component in the frequency of capturing effect is not included therein by introducing the absorption effect due to free carrier, and the electromagnetic wave is substantially absorbed by the PC slab absorber 3, as shown in FIGS. 53D, 53E and 53F.
(Result of Experiment 2: Absorption Spectrum)

Figure 54A:
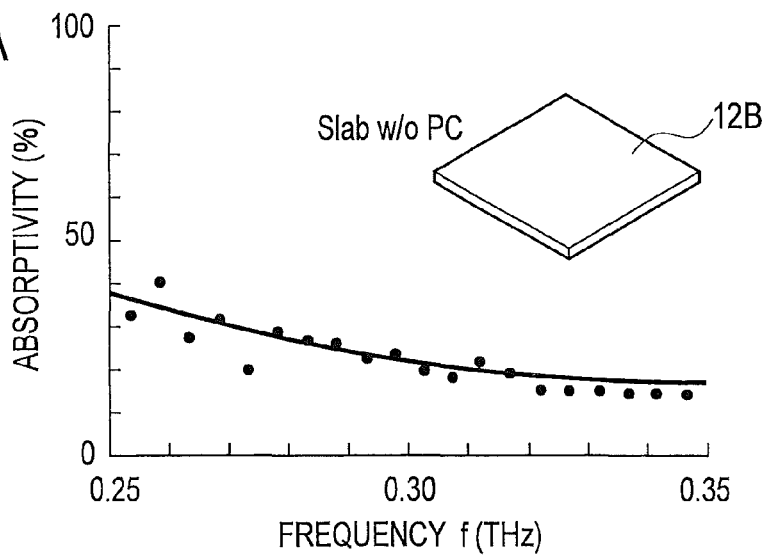
FIG. 54A shows a relationship between the absorptivity and the frequency f, and shows in particular the case of a slab without the photonic crystal as a comparative example.
Figure 54B:
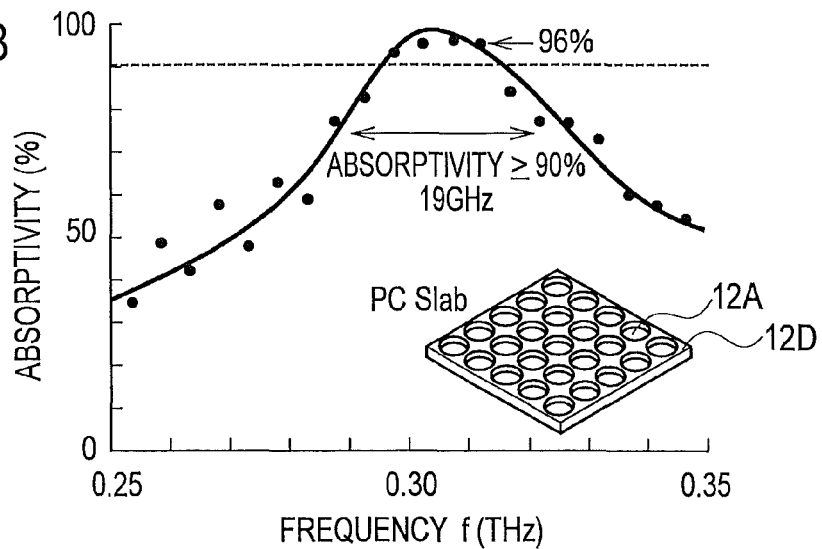
FIG. 54B shows the relationship between the absorptivity and the frequency f, and shows in particular the case of the 2D-PC slab as a comparative example.
Figure 54C:
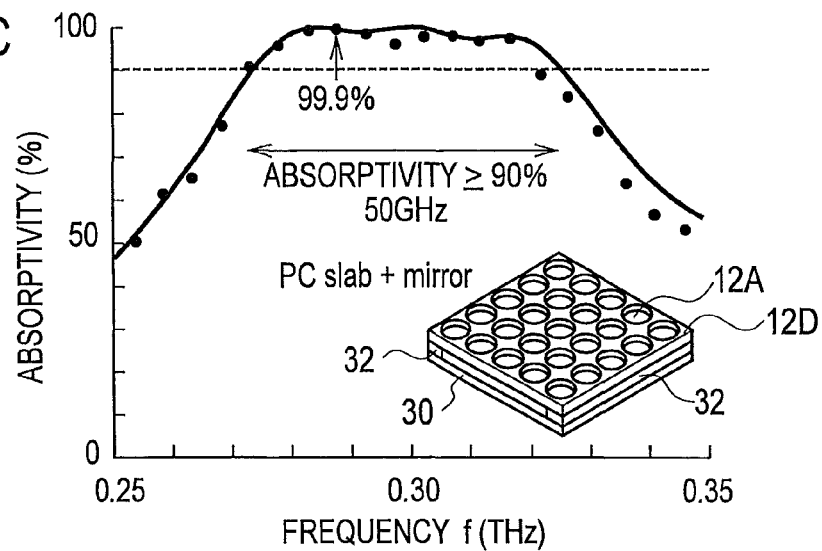
FIG. 54C shows the relationship between the absorptivity and the frequency f, and shows in particular the case of the PC slab absorber according to the second embodiment.

FIG. 54A shows a relationship between the absorptivity and the frequency f in the case of the bulk substrate 12B which does not have the PC (without PC structure), as a comparative example, FIG. 54B shows a relationship between the absorptivity and the frequency f in the case of the PC slab, as the comparative example, and FIG. 54C shows a relationship between the absorptivity and the frequency f in the case of the PC slab absorber 3 according to the second embodiment. In this case, the solid lines denote the simulation result, and the plots denote the experiment result. The period of the lattice point for forming resonant-state 12A of the 2D-PC slab 12D used for the experiment is approximately 500 µm, the hole diameter is approximately 390 µm, and the hole depth is approximately 170 µm, for example. The thickness of the 2D-PC slab 12D is approximately 190 µm. Moreover, the separation distance S between the 2D-PC slab 12D and the reflecting mirror 30 is approximately 220 µm, for example. Moreover, the resistivity of Si substrate of the 2D-PC slab 12D is approximately 6 Ωcm, and the carrier density is approximately $1.8 \times 10^{15}$ $cm^{-3}$, for example.

As compared with the absorptivity of 90%, the bandwidth is approximately 19 GHz in the case of the PC slab, as shown in FIG. 54B. On the other hand, the bandwidth becomes approximately 50 GHz in the case of the PC slab absorber 3 according to the second embodiment, as shown in FIG. 54C. Furthermore, as shown in FIG. 54B, the maximal absorption rate is approximately 96% in the case of the PC slab. Moreover, the 90% band is approximately 6.3% of the center frequency. On the other hand, as shown in FIG. 54C, the maximal absorption rate is approximately 99.9% in the case of the PC slab absorber 3 according to the second embodiment. The 90% band is also widened to approximately 16.7% of the center frequency. More specifically, the absorptivity is also higher, and the band is wider, in the case of the PC slab absorber 3 according to the second embodiment provided with both the PC and the reflecting mirror.

According to the PC slab absorber according to the second embodiment, the absorptivity and the absorption bandwidth can be improved by introducing the reflecting mirror onto the back side surface of the PC slab, and adjusting the distance between the reflecting mirror and the PC.

(Result of Experiment 3: Proximity Wireless Communication System)

Figure 55A:
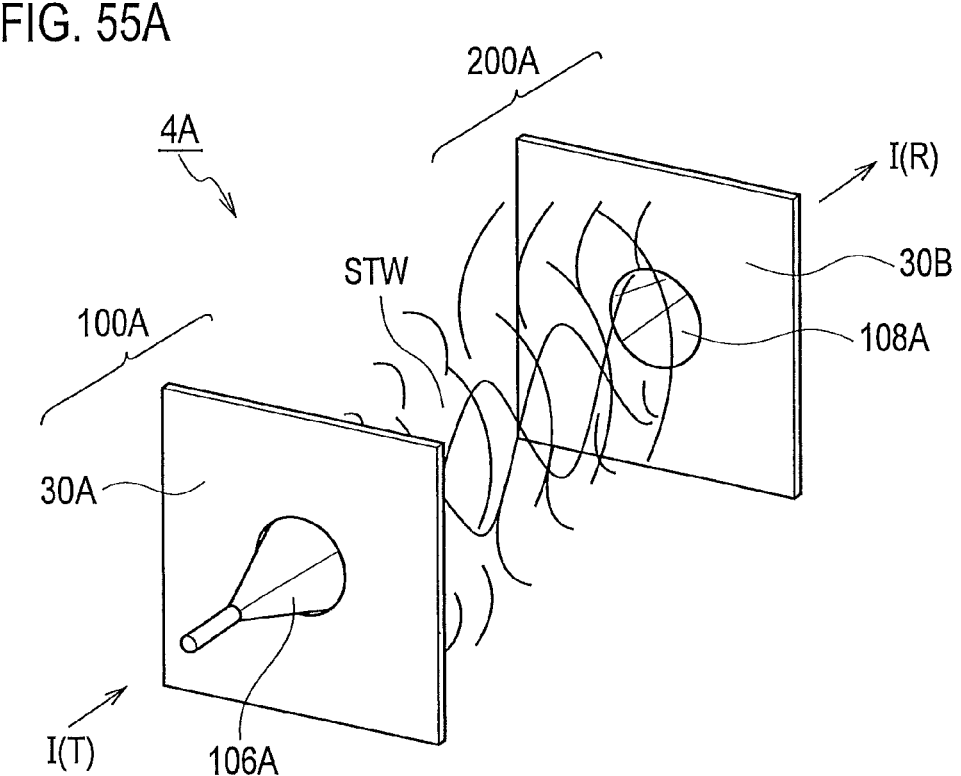
FIG. 55A shows a schematic bird's-eye view configuration diagram of a proximity wireless communication system between a transmitter and a receiver, as a comparative example.
Figure 55B:
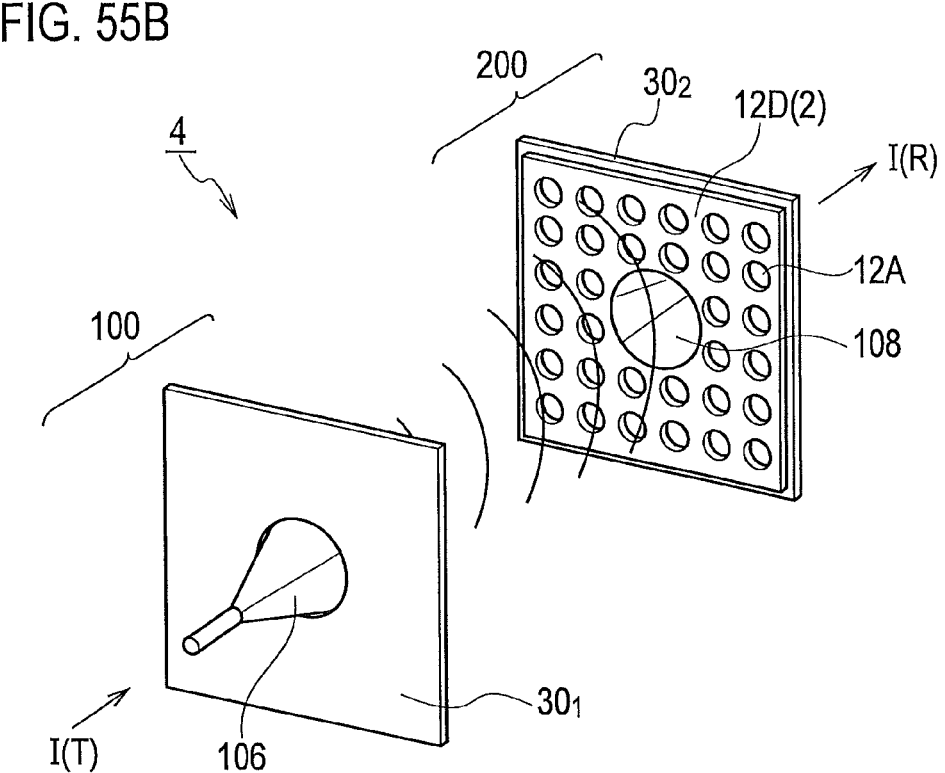
FIG. 55B shows a schematic block configuration diagram of the proximity wireless communication system between the transmitter and the receiver to which the PC slab absorber according to the second embodiment is applied.

FIG. 55A shows a schematic bird's-eye view configuration of a proximity wireless communication system 4A between a transmitter 100A and a receiver 200A, as a comparative example, and FIG. 55B shows a schematic bird's-eye view configuration of a proximity wireless communication system 4 between a transmitter 100 and a receiver 200 to which the PC slab absorber 3 according to the second embodiment is applied.

Figure 56:
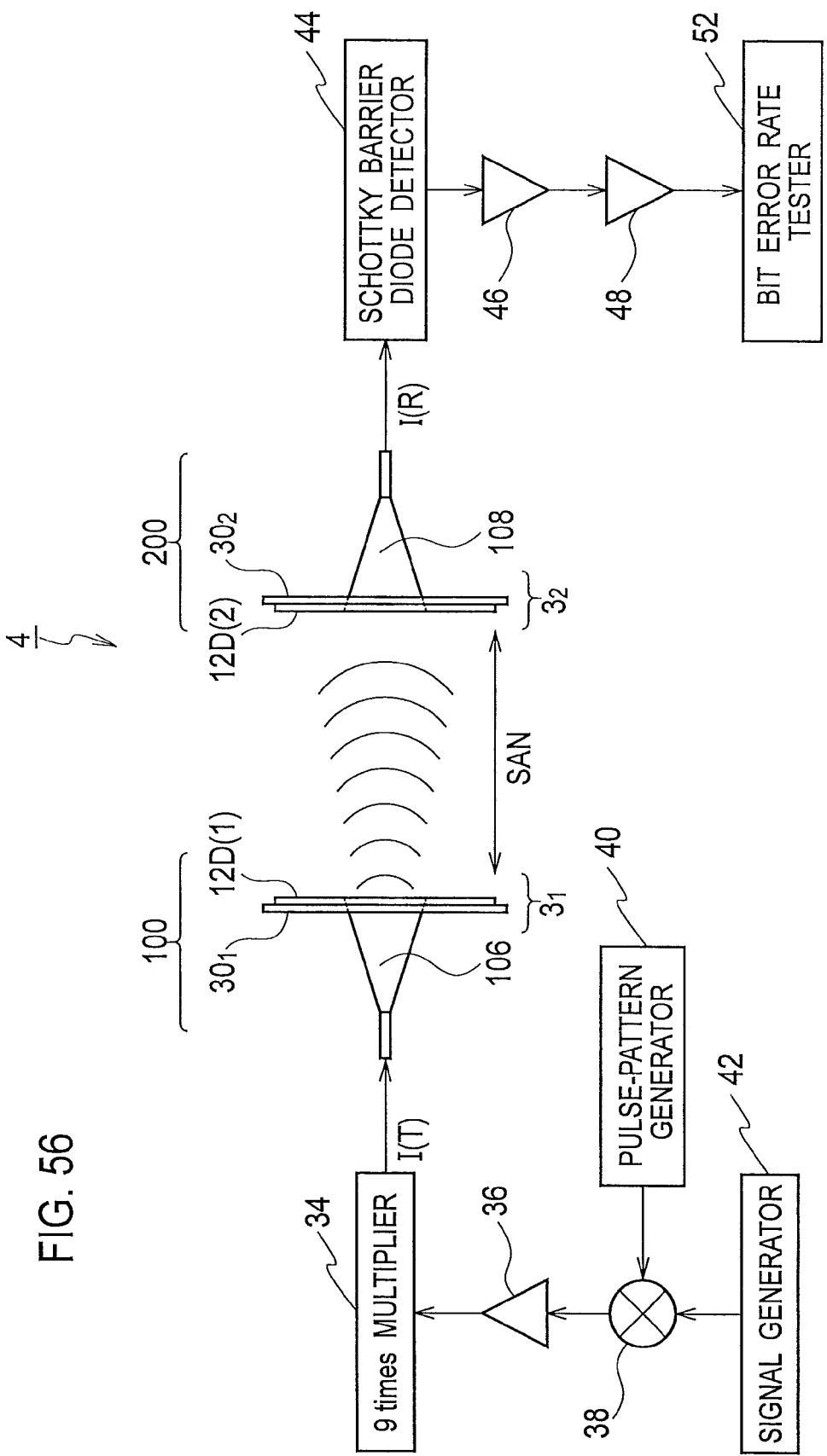
FIG. 56 shows a schematic block configuration diagram of the proximity wireless communication system between the transmitter and the receiver to which the PC slab absorber according to the second embodiment is applied.

FIG. 56 shows a schematic block configuration of the proximity wireless communication system 4 between the transmitter 100 and the receiver 200 to which the PC slab absorber according to the second embodiment is applied. The lattice points for forming resonant-state 12A are arranged on the 2D-PC slabs 12D(1), 12D(2). The electromagnetic wave IT) transmitted through an antenna for transmitter 106A is received as the electromagnetic wave I(R) through an antenna for receiver 108A.

The transmitter 100A as the comparative example includes: a metal plate 30A, and an antenna for transmitter 106A arranged so as to pass through a center portion of the metal plate 30A, as shown in FIG. 55A. Moreover, the receiver 200A as the comparative example includes: a metal plate 30B, and an antenna for receiver 108A arranged so as to pass through a center portion of the metal plate 30B, as shown in FIG. 55A.

In this case, although a horn antenna was used for the antenna for transmitter 106A and the antenna for receiver 108A on account of the experiment, ordinary antennas including a flat antenna is also applicable other than the horn antenna. For example, there are applicable a slot antenna, a patch antenna, a dipole antenna, a monopole antenna, a bow tie antenna, a Yagi-Uda antenna, a spiral antenna, a loop antenna, an array antenna, a phased array antenna, a parabolic antenna, a lens antenna, etc.

In the proximity wireless communication system 4A between the transmitter 100A and the receiver 200A as the comparative example, a standing wave STW is generated between the transmitter 100A and the receiver 200A, as shown in FIG. 55A. For example, if the position of the receiver 200A approaches to a node of the standing wave STW, sufficient communication will become impossible because the received power becomes weak.

As shown in FIGS. 55B and 56, the transmitter 100 to which the PC slab absorber according to the second embodiment is applied includes: a first PC slab absorber $3_1$; and a horn antenna 106 for transmitter disposed so as to pass through the first PC slab absorber $3_1$. In this case, the first PC slab absorber $3_1$ includes: a 2D-PC slab 12D(1) composed of semiconducting materials; a lattice point for forming resonant-state 12A periodically arranged in the 2D-PC slab 12D(1), the lattice point for forming resonant-state 12A which can capture an electromagnetic wave incident from an outside by resonating an electromagnetic wave in a band edge of a photonic band structure of the 2D-PC slab 12D(1) in the plane of the 2D-PC slab 12D(1); and a reflecting mirror $30_1$ arranged at the back side surface of the 2D-PC slab 12D(1), the reflecting mirror $30_1$ reflecting an electromagnetic wave transmitted in the 2D-PC slab 12D(1). In this case, the 2D-PC slab 12D(1) is doped with impurities and can absorb the captured electromagnetic wave in the band edge resonant frequency. Moreover, the reflected electromagnetic wave can be made incident on the back side surface of the 2D-PC slab 12D(1).

As shown in FIGS. 55B and 56, the receiver 200 to which the PC slab absorber according to the second embodiment is applied includes: a second PC slab absorber $3_2$; and a horn antenna 108 for receiver disposed so as to pass through the second PC slab absorber $3_2$. In this case, the second PC slab absorber $3_2$ includes: a 2D-PC slab 12D(2) composed of semiconducting materials; a lattice point for forming resonant-state 12A periodically arranged in the 2D-PC slab 12D(2), the lattice point for forming resonant-state 12A which can capture an electromagnetic wave incident from an outside by resonating an electromagnetic wave in a band edge of a photonic band structure of the 2D-PC slab 12D(2) in the plane of the 2D-PC slab 12D(2); and a reflecting mirror $30_2$ arranged at the back side surface of the 2D-PC slab 12D(2), the reflecting mirror $30_2$ reflecting an electromagnetic wave transmitted in the 2D-PC slab 12D(2). In this case, the 2D-PC slab 12D(2) is doped with impurities and can absorb the captured electromagnetic wave in the band edge resonant frequency. Moreover, the reflected electromagnetic wave can be made incident on the back side surface of the 2D-PC slab 12D(2).

In the proximity wireless communication system 4 between the transmitter 100 and the receiver 200 to which the PC slab absorber 3 according to the second embodiment is applied, a phenomenon in which the standing wave is generated between the transmitter 100 and the receiver 200 is not observed, as shown in FIGS. 55B and 56.

In the proximity wireless communication system 4 to which the PC slab absorber according to the second embodiment is applied, the electromagnetic waves I(T) transmitted through the horn antenna 106A for transmitter can be received as the electromagnetic wave I(R) through the horn antenna 108A for receiver, almost without being influenced by the standing wave.

In the present experiment, the experimental system (FIG. 56) proved that the standing waves are reduced due ti the effect of the absorber and the communication can be stabilized as a result, by comparing the case where the surfaces of the transmitter 100A and the receiver 200A is formed as a metallic body (metallic plates 30A and 30B) simulated as the comparative example (FIG. 55A), and the case where the PC slab absorber 3 according to the second embodiment is added to the metal surface thereof.

In the proximity wireless communication system 4 between the transmitter 100 and the receiver 200 to which the PC slab absorber according to the second embodiment is applied, the transmitter 100 and the receiver 200 are disposed so as to be opposed with each other, as shown in FIG. 56. The antenna distance SAN between the transmitter 100 and the receiver 200 is variable in a range from approximately 30 mm to approximately 33 mm, for example.

Moreover, as shown in FIG. 56, the proximity wireless communication system 4 to which the PC slab absorber according to the second embodiment is applied may includes: a signal generator 42; a pulse-pattern generator 40; a mixer 38 for mixing outputs from the signal generator 42 and the pulse-pattern generator 40; a power amplifier 36 for amplifying an output signal from the mixer 38; and a 9 times multiplier 34 for multiplying an output signal from the power amplifier 36. In this case, an output signal from the 9 times multiplier 34 is transmitted through the antenna for transmitter 106 as the electromagnetic wave I(T).

Moreover, the proximity wireless communication system 4 to which the PC slab absorber according to the second embodiment is applied may includes: a Schottky barrier diode detector 44 for detecting the electromagnetic waves I(R) received through the antenna for receiver 108; a signal amplifier 44 connected to the Schottky barrier diode detector 44, the signal amplifier 44 for amplifying a received signal;

a waveform shaping power amplifier 48 connected to the signal amplifier 44, the waveform shaping power amplifier 48 for limiting the received signal amplified in the signal amplifier 44; and a bit error rate tester 52 connected to the waveform shaping power amplifier 48, the bit error rate tester 52 for measuring a bit error rate.

FIG. 57 shows a relationship of the bit error rate with respect to the antenna distance SAN between the transmitter 100 and the receiver 200, in the proximity wireless communication system 4 to which the PC slab absorber 3 according to the second embodiment is applied. In this place, the curved line A denotes the case of providing only the antenna for transmitter 106, the antenna for receiver 108, and the metallic body (reflecting mirrors $30_1$, $30_2$), as the comparative example corresponding to FIG. 55A. On the other hand, the curved line B denotes the case of the configuration including the antenna for transmitter 106 and the antenna for receiver 108, and the metal housing (reflecting mirrors $30_1$, $30_2$) and the 2D-PC slabs 12D(1), 12D(2), as the second embodiment corresponding to FIGS. 55B and 56.

In the case of the metallic body is simulated as the comparative example, as shown in FIG. 57, the bit error rate becomes larger for every half wavelength, i.e., the antenna distance SAN is 0.5 mm. This result indicates the effect of the standing wave. On the other hand, in the case of introducing the 2D-PC slabs 12D(1), 12D(2), even if the antenna distance SAN is varied, varying of the bit error rate is not observed, and the standing waves are reduced due to the effect of the absorber. That is, the availability of the PC slab absorber 3 according to the second embodiment is proved by the real system.

The PC slab absorber 3 according to the second embodiment is also applicable to the high-frequency circuit 2, in the same manner as the first embodiment. An undesired mode (radiation) which occurs in the circuit can be reduced by using the PC slab absorber 3 according to the second embodiment for the substrate in the high-frequency circuit 2.

The PC slab absorber 3 according to the second embodiment is also applicable to various electronic components, in the same manner as the first embodiment. The PC slab absorber 3 according to the second embodiment is applicable to thin and flat type THz wave electromagnetic wave absorbers, THz-wave filters which can be flexibly designed, THz-wave modulators, THz-wave delay lines, input/output interfaces to the THz-wave IC, highly sensitive THz-wave detectors, etc., for example.

The periodic structure of a lattice point for forming resonant-state 12A of the 2D-PC slab 12D applicable to the PC slab absorber 3 according to the second embodiment is similarly illustrated as that of the first embodiment. More specifically, arrangement examples of a square lattice, a triangular lattice, a rectangular lattice, and a rhombic lattice (face-centered rectangle lattice) are similarly illustrated as shown in FIGS. 45A, 46A, 47A and 48A, and band structures of 2D-PC slab 12 corresponding thereto are similarly illustrated as shown in FIGS. 45B, 46B, 47B and 48B.

The lattice point for forming resonant-state 12A may be arranged in any one selected from the group consisting of a square lattice, a rectangular lattice, a face-centered rectangle lattice, and a triangular lattice.

Moreover, the lattice point for forming resonant-state 12A is arranged in a square lattice or a rectangular lattice, and can resonate the electromagnetic wave in a Γ point, an X point, or an M point in the photonic band structure of the photonic crystal layer in the PC slab plane.

Moreover, the lattice point for forming resonant-state 12A is arranged in a face-centered rectangle lattice or a triangular lattice, and can resonate the electromagnetic wave in a Γ point, an X point, or a J point in the photonic band structure of the photonic crystal layer in the PC slab plane.

Moreover, the lattice point for forming resonant-state 12A may be provided with any one of the polygonal shape, circular shape, oval shape, or ellipse shape.

As mentioned above, according to the present invention, there can be provided the thin and flat type PC slab absorber having high capturing and absorption effects and the easy processability, and the high-frequency circuit, the electronic component to which such a PC slab absorber is applied.

Moreover, according to the present invention, there can be provided the PC slab absorber which can increase the absorptivity and absorption bandwidth by introducing the reflecting mirror into the PC slab absorber, and adjusting the distance between the reflecting mirror and the photonic crystal.

Moreover, according to the present invention, there can be provided the transmitter, the receiver, and the proximity wireless communication system to which the PC slab absorber which introduces the reflecting mirror is applied.

[Other Embodiments]

The present invention has been described by the embodiments, as a disclosure including associated description and drawings to be construed as illustrative, not restrictive. This disclosure makes clear a variety of alternative embodiments, working examples, and operational techniques for those skilled in the art.

Such being the case, the present invention covers a variety of embodiments, whether described or not. Therefore, the technical scope of the present invention is determined from the invention specifying items related to the claims reasonable from the above description.

What is claimed is:

1. A photonic-crystal slab absorber comprising:
    a two dimensional photonic crystal slab composed of semiconducting materials; and
    a plurality of lattice points periodically arranged in the two dimensional photonic crystal slab, each lattice point for forming resonant-state which can capture an electromagnetic wave incident from an outside by resonating an electromagnetic wave in a band edge of a photonic band structure of the two dimensional photonic crystal slab in the plane of the two dimensional photonic crystal slab, wherein
    the two dimensional photonic crystal slab is doped with impurities and can absorb the captured electromagnetic wave in the band edge resonant frequency, wherein
    an amount of impurities doping level of a surface portion of the two dimensional photonic crystal slab is higher than an amount of the impurities doping level of a portion of the two dimensional photonic crystal slab other than the surface portion.

2. The photonic-crystal slab absorber according to claim 1, wherein the lattice points for forming resonant-state comprises a vertically symmetric through-hole with respect to a principal surface of the two dimensional photonic crystal slab.

3. The photonic-crystal slab absorber according to claim 1, wherein the lattice points for forming resonant-state comprises a vertically asymmetric non-through hole with respect to a principal surface of the two dimensional photonic crystal slab.

4. The photonic-crystal slab absorber according to claim 3, wherein a depth of the non-through hole is formed relatively shallowly to achieve broader bandwidth for frequency characteristics of transmissivity.

5. The photonic-crystal slab absorber according to claim 4, wherein a thickness of the two dimensional photonic crystal slab is relatively reduced to form the depth of the non-through hole to be relatively shallow.

6. The photonic-crystal slab absorber according to claim 1, wherein adjacent two resonant points of resonant frequencies composed of a resonant frequency in an even mode and a resonant frequency in an odd mode are close to or matched with each other, in order to achieve broader bandwidth for frequency characteristics of transmissivity.

7. The photonic-crystal slab absorber according to claim 6, wherein a lattice constant of the lattice points for forming resonant-state is kept constant, and a diameter of the lattice points for forming resonant-state is formed to be relatively large.

8. The photonic-crystal slab absorber according to claim 1, wherein an impurities doping level to the two dimensional photonic crystal slab is set to a carrier density corresponding to a value of an imaginary part of refractive index so that absorptivity of the two dimensional photonic crystal slab becomes the maximum.

9. The photonic-crystal slab absorber according to claim 1, wherein a lattice constant of the lattice points for forming resonant-state is equal to a wavelength of said electromagnetic wave in the medium, and scaling can be performed according to a wavelength.

10. The photonic-crystal slab absorber according to claim 1, wherein a thickness of the two dimensional photonic crystal slab is not more than $1/5$ of a wavelength of said electromagnetic wave in the medium.

11. The photonic-crystal slab absorber according to claim 1, wherein the lattice points for forming resonant-state is arranged in any one selected from the group consisting of a square lattice, a rectangular lattice, a face-centered rectangle lattice, and a triangular lattice.

12. The photonic-crystal slab absorber according to claim 1, comprising:
a reflecting mirror arranged at a back side surface of the two dimensional photonic crystal slab, the reflecting mirror configured to reflect an electromagnetic wave transmitted in the two dimensional photonic crystal slab, wherein
the reflected electromagnetic wave can be made incident at a back side surface of the two dimensional photonic crystal slab.

13. The photonic-crystal slab absorber according to claim 12, wherein the reflecting mirror is formed of any one of a metallic plate, a substrate on which a metallic thin film is formed, a dielectric multilayer, or a photonic crystal.

14. The photonic-crystal slab absorber according to claim 12, wherein the two dimensional photonic crystal slab and the reflecting mirror are arranged so as to be distanced from each other.

15. The photonic-crystal slab absorber according to claim 14, wherein a separation distance between the two dimensional photonic crystal slab and the reflecting mirror is equal to a wavelength/4 plus or minus wavelength/8 with respect to a wavelength of the electromagnetic wave.

16. A high-frequency circuit comprising the photonic-crystal slab absorber according to claim 1.

17. An electronic component comprising the photonic-crystal slab absorber according to claim 1.

18. A transmitter comprising:
the photonic-crystal slab absorber according to claim 12; and
an antenna for transmitter disposed so as to pass through the photonic-crystal slab absorber.

19. A receiver comprising:
the photonic-crystal slab absorber according to claim 12; and
an antenna for receiver disposed so as to pass through the photonic-crystal slab absorber.

20. A proximity wireless communication system comprising:
the transmitter according to claim 18; and
the receiver according to claim 19, wherein
the transmitter and the receiver disposed so as to be opposed with each other.

* * * * *